US007469861B2

(12) United States Patent
Ferry et al.

(10) Patent No.: US 7,469,861 B2
(45) Date of Patent: Dec. 30, 2008

(54) SEATING SYSTEM AND A PASSENGER ACCOMMODATION UNIT FOR A VEHICLE

(75) Inventors: David Ferry, East Sussex (GB); Adam Bernard Wells, Hertfordshire (GB); Luke Miles, London (GB); Andrew Leslie Lawler, Bucks (GB); David Edward Starkey, Bucks (GB); Simon Frederick Mills, Bucks (GB); Gary Doy, Warwickshire (GB)

(73) Assignee: Virgin Atlantic Airways Limited, Crawley (GB)

( * ) Notice: Subject to any disclaimer, the term of this patent is extended or adjusted under 35 U.S.C. 154(b) by 0 days.

(21) Appl. No.: 11/394,827

(22) Filed: Mar. 31, 2006

(65) Prior Publication Data

US 2007/0069073 A1 Mar. 29, 2007

Related U.S. Application Data

(62) Division of application No. 10/774,244, filed on Feb. 6, 2004.

(30) Foreign Application Priority Data

| | | |
|---|---|---|
| Aug. 9, 2001 | (GB) | 0119459.6 |
| Feb. 1, 2002 | (GB) | 0202389.3 |
| Aug. 9, 2002 | (WO) | PCT/GB02/03701 |

(51) Int. Cl.
*B64D 11/06* (2006.01)

(52) U.S. Cl. ................................ 244/118.6; 244/122 R

(58) Field of Classification Search .............. 244/118.6, 244/122 R; 297/63, 65, 354.13, 232
See application file for complete search history.

(56) References Cited

U.S. PATENT DOCUMENTS 64,044 A 4/1867 Smith (Continued)

FOREIGN PATENT DOCUMENTS

AU 709431 6/1996

(Continued)

OTHER PUBLICATIONS

International Search Report dated Nov. 28, 2002, application No. PCT/GB02/03701.

(Continued)

*Primary Examiner*—Timothy D Collins
(74) *Attorney, Agent, or Firm*—Klarquist Sparkman, LLP

(57) ABSTRACT

A passenger seat assembly for a vehicle, particularly an aircraft, which is adapted to provide self-contained, individual seating and sleeping accommodation for a passenger, said seating assembly includes a supporting structure (42) for supporting said assembly off the floor of a vehicle; one or more movable, passenger-bearing, structural components (71,72); and means for connecting said movable, structural components to said structure such that said components can be selectively moved between a seat configuration, in which a plurality of passenger-bearing surfaces on said one or more structural, movable components (71,71) or said supporting structure form a seat for the passenger, and a bed configuration, in which a plurality of said bearing surfaces (47,48,67, 74,76) are disposed substantially coplanarly and substantially contiguously to form a bed for the passenger; characterized in that at least one of said movable components (72) is double-sided, comprising first and second opposite sides, one of said sides having a first seat surface (73) that forms part of the seat in said seat configuration, and the other side having a second bed surface (74) that forms part of said bed in said bed configuration.

24 Claims, 39 Drawing Sheets

U.S. PATENT DOCUMENTS

| | | | |
|---|---|---|---|
| 177,526 | A | 5/1876 | Lawrence |
| 242,941 | A | 6/1881 | Laeremans |
| 263,329 | A | 8/1882 | Flagg |
| 336,387 | A | 2/1886 | Child |
| 426,782 | A | 4/1890 | Dom |
| 449,419 | A | 3/1891 | Hutton et al. |
| 492,414 | A | 2/1893 | Morrill et al. |
| 543,487 | A | 7/1895 | Kilgore |
| 567,491 | A | 9/1896 | Murphy |
| 597,665 | A | 1/1898 | Andren |
| 754,536 | A | 3/1904 | Billmyer |
| 878,889 | A | 2/1908 | Miller |
| 1,427,280 | A | 8/1922 | Gahm |
| 1,703,969 | A | 3/1929 | Syvrud |
| 1,767,488 | A | 6/1930 | Stout |
| 2,081,529 | A | 5/1937 | Canney |
| 2,092,655 | A | 9/1937 | Page, Jr. |
| 2,124,003 | A | 7/1938 | McDonnell, Jr. et al. |
| 2,208,683 | A | 7/1940 | Page, Jr. |
| 2,247,546 | A | 7/1941 | Donoho |
| 2,280,065 | A | 4/1942 | Roode |
| 2,310,573 | A | 2/1943 | Burton |
| 2,332,841 | A | 10/1943 | Burton et al. |
| 2,382,402 | A | 8/1945 | Roode |
| 2,600,706 | A | 6/1952 | Tully et al. |
| 2,608,366 | A | 8/1952 | Jergenson |
| 2,611,420 | A | 9/1952 | Diehl |
| 2,629,425 | A | 2/1953 | James |
| 2,775,996 | A | 1/1957 | Millar |
| 2,947,349 | A | 8/1960 | Kryter |
| 2,953,103 | A | 9/1960 | Bohannon et al. |
| 2,969,107 | A | 1/1961 | Naxon et al. |
| 2,997,340 | A | 8/1961 | Poskin |
| 3,025,106 | A | 3/1962 | Evans et al. |
| 3,041,108 | A | 6/1962 | Cohn |
| 3,476,495 | A | 11/1969 | Church |
| 3,666,314 | A | 5/1972 | Makinen et al. |
| 3,695,689 | A | 10/1972 | Barecki |
| 3,751,998 | A | 8/1973 | Vasilatos |
| 3,804,460 | A | 4/1974 | Leffler |
| 3,883,173 | A | 5/1975 | Shephard et al. |
| 3,898,704 | A | 8/1975 | Gallaher et al. |
| 3,934,929 | A | 1/1976 | Rabinowitz |
| 3,934,931 | A | 1/1976 | Matsui et al. |
| 4,071,210 | A | 1/1978 | Mutke |
| 4,099,275 | A | 7/1978 | Pallan |
| 4,157,797 | A | 6/1979 | Fox |
| 4,213,593 | A | 7/1980 | Weik |
| 4,227,736 | A | 10/1980 | Lebault et al. |
| 4,366,983 | A | 1/1983 | Klueting et al. |
| D268,880 | S | 5/1983 | Palmgren |
| D268,972 | S | 5/1983 | White |
| D268,973 | S | 5/1983 | White |
| 4,382,628 | A | 5/1983 | Palmgren |
| D269,652 | S | 7/1983 | McKean et al. |
| 4,394,047 | A | 7/1983 | Brunelle |
| 4,402,096 | A | 9/1983 | Atimichuk |
| 4,402,547 | A | 9/1983 | Weston et al. |
| 4,410,215 | A | 10/1983 | McKean et al. |
| 4,416,488 | A | 11/1983 | Wall |
| D273,157 | S | 3/1984 | Staub |
| 4,440,439 | A | 4/1984 | Szabo |
| D273,642 | S | 5/1984 | Marrujo |
| D276,859 | S | 12/1984 | Kramer et al. |
| D277,239 | S | 1/1985 | White |
| 4,492,407 | A | 1/1985 | Broadhead |
| D277,526 | S | 2/1985 | White |
| 4,536,027 | A | 8/1985 | Brennan |
| 4,543,675 | A | 10/1985 | Shrock |
| 4,585,272 | A | 4/1986 | Ballarini |
| 4,589,612 | A | 5/1986 | Halim |
| 4,620,335 | A | 11/1986 | Dodgen |
| 4,625,934 | A | 12/1986 | Ryan et al. |
| 4,672,696 | A | 6/1987 | Horenkamp |
| D290,664 | S | 7/1987 | Strousse et al. |
| 4,685,719 | A | 8/1987 | Hanemaayer |
| 4,685,730 | A | 8/1987 | Linguanotto |
| D293,516 | S | 1/1988 | Schultz |
| 4,718,720 | A | 1/1988 | Braun et al. |
| 4,756,034 | A | 7/1988 | Stewart |
| 4,756,502 | A | 7/1988 | Egan |
| 4,856,738 | A | 8/1989 | Martin |
| 4,860,393 | A | 8/1989 | Schefthaler |
| 4,865,387 | A | 9/1989 | Lipparin et al. |
| 4,881,702 | A | 11/1989 | Slettebak |
| 4,890,885 | A | 1/1990 | Grossmann |
| 4,898,426 | A | 2/1990 | Schulz et al. |
| 4,932,816 | A | 6/1990 | Ligensa |
| 4,936,620 | A | 6/1990 | Francois et al. |
| 4,962,963 | A | 10/1990 | Robinson |
| 5,058,954 | A | 10/1991 | Kan-Chee |
| 5,086,996 | A | 2/1992 | Roeder et al. |
| 5,108,148 | A | 4/1992 | Henke |
| 5,112,109 | A | 5/1992 | Takeda et al. |
| 5,161,765 | A | 11/1992 | Wilson |
| 5,169,091 | A | 12/1992 | Beroth |
| 5,178,346 | A | 1/1993 | Beroth |
| 5,180,120 | A | 1/1993 | Simpson et al. |
| 5,183,313 | A | 2/1993 | Cunningham |
| 5,199,764 | A | 4/1993 | Robinson |
| D336,379 | S | 6/1993 | Veneruso |
| 5,224,755 | A | 7/1993 | Beroth |
| D340,813 | S | 11/1993 | Liu |
| D341,491 | S | 11/1993 | Martin |
| 5,269,588 | A | 12/1993 | Kunz et al. |
| D343,069 | S | 1/1994 | Trudo et al. |
| 5,282,665 | A | 2/1994 | Beroth |
| 5,284,379 | A | 2/1994 | Arnold et al. |
| 5,328,238 | A | 7/1994 | Yamazaki |
| 5,333,818 | A | 8/1994 | Brandt et al. |
| 5,337,979 | A | 8/1994 | Bales et al. |
| 5,368,355 | A | 11/1994 | Hayden et al. |
| 5,383,704 | A | 1/1995 | Granados et al. |
| 5,425,516 | A | 6/1995 | Daines |
| D361,972 | S | 9/1995 | Ney et al. |
| D364,508 | S | 11/1995 | Pryor et al. |
| 5,509,722 | A | 4/1996 | Beroth |
| D371,008 | S | 6/1996 | Stulik |
| D371,465 | S | 7/1996 | Stulik |
| 5,531,404 | A | 7/1996 | Marechal |
| 5,542,744 | A | 8/1996 | Bathrick |
| 5,553,923 | A | 9/1996 | Bilezikjian |
| 5,558,399 | A | 9/1996 | Serber |
| D374,993 | S | 10/1996 | Emoto |
| 5,560,681 | A | 10/1996 | Dixon et al. |
| 5,560,683 | A | 10/1996 | Penley et al. |
| 5,597,139 | A | 1/1997 | Beroth |
| 5,611,503 | A | 3/1997 | Brauer |
| 5,615,928 | A | 4/1997 | Penley |
| 5,628,547 | A | 5/1997 | Matsumiya |
| 5,636,898 | A | 6/1997 | Dixon et al. |
| D381,524 | S | 7/1997 | Gabriel |
| 5,651,514 | A | 7/1997 | Grilliot et al. |
| 5,653,502 | A | 8/1997 | Kimura et al. |
| D383,320 | S | 9/1997 | Gilbertson |
| 5,669,799 | A | 9/1997 | Moseneder et al. |
| D385,709 | S | 11/1997 | Gryp |
| D387,914 | S | 12/1997 | Beermann et al. |
| D388,966 | S | 1/1998 | Beermann et al. |
| 5,707,103 | A | 1/1998 | Balk |
| D390,367 | S | 2/1998 | Demski et al. |
| D391,086 | S | 2/1998 | Catchings et al. |
| D391,087 | S | 2/1998 | Sacco et al. |
| D391,088 | S | 2/1998 | Sacco et al. |

5,716,026 A 2/1998 Pascasio et al.
D391,410 S 3/1998 Tomforde et al.
D392,116 S 3/1998 Tomforde et al.
5,722,726 A 3/1998 Matsumiya
5,740,989 A 4/1998 Daines
5,741,046 A 4/1998 Leuchtmann et al.
D394,756 S 6/1998 Gryp et al.
D395,558 S 6/1998 Gryp et al.
D396,152 S 7/1998 Beermann et al.
5,788,183 A 8/1998 Marechal
5,816,534 A 10/1998 Schumacher
D402,125 S 12/1998 Dryburgh et al.
5,842,743 A 12/1998 Wright et al.
5,847,745 A 12/1998 Shimizu et al.
D404,927 S 2/1999 Blomdell et al.
D405,275 S 2/1999 Dryburgh et al.
D405,281 S 2/1999 Blomdell et al.
5,868,470 A 2/1999 Hyder et al.
5,868,472 A 2/1999 Grilliot et al.
D409,010 S 5/1999 Papaioannou et al.
D411,689 S 6/1999 Papaioannou et al.
D411,691 S 6/1999 Sacco et al.
D411,922 S 7/1999 Granados
5,947,559 A 9/1999 Williams
5,954,401 A 9/1999 Koch et al.
D414,948 S 10/1999 Slanec et al.
5,979,964 A 11/1999 Ban et al.
5,988,749 A 11/1999 Williams
5,992,798 A 11/1999 Ferry
6,000,659 A 12/1999 Brauer
6,022,074 A 2/2000 Swedenklef
D421,593 S 3/2000 Papaioannou et al.
D421,948 S 3/2000 Dryburgh et al.
D422,801 S 4/2000 Tremont et al.
D425,318 S 5/2000 Koncar
D425,711 S 5/2000 Desombre
D425,712 S 5/2000 Kelderman
6,056,239 A 5/2000 Cantu et al.
6,059,364 A 5/2000 Dryburgh et al.
D426,392 S 6/2000 Ott et al.
D428,276 S 7/2000 Mitjans
D428,719 S 8/2000 Fick et al.
D430,739 S 9/2000 Palumbo
D430,741 S 9/2000 Natuzzi et al.
D430,742 S 9/2000 Lewis et al.
D431,117 S 9/2000 Hutton
6,119,980 A 9/2000 Ferry
D431,378 S 10/2000 Natuzzi et al.
D431,916 S 10/2000 Natuzzi et al.
D431,917 S 10/2000 Natuzzi et al.
D434,233 S 11/2000 Frankel et al.
6,155,519 A 12/2000 Rajasingham
6,170,786 B1 1/2001 Park et al.
6,173,921 B1 1/2001 Neumann et al.
RE37,043 E 2/2001 Yamazaki
D437,495 S 2/2001 Gibson
D439,063 S 3/2001 Round et al.
D439,420 S 3/2001 Natuzzi et al.
D439,425 S 3/2001 Park et al.
D439,752 S 4/2001 Natuzzi et al.
D439,753 S 4/2001 Natuzzi et al.
D440,056 S 4/2001 Natuzzi et al.
D440,062 S 4/2001 Tsay
6,209,956 B1 4/2001 Dryburgh et al.
D441,552 S 5/2001 McCarthy
D442,376 S 5/2001 Norman
D442,787 S 5/2001 Hutton
6,227,489 B1 5/2001 Kitamoto et al.
6,237,872 B1 5/2001 Bar-Levav
6,237,994 B1 5/2001 Bentley et al.
D443,990 S 6/2001 Beroth
D444,007 S 6/2001 Wu
6,241,188 B1 6/2001 Simpson et al.
D445,266 S 7/2001 Leon et al.
D446,029 S 8/2001 Hutton
D446,395 S 8/2001 Hutton
6,270,141 B2 8/2001 Moon et al.
6,276,635 B1 8/2001 Ferry et al.
D447,880 S 9/2001 Lewis et al.
6,305,644 B1 10/2001 Beroth
D451,688 S 12/2001 Cramer
D452,385 S 12/2001 Denton
D453,425 S 2/2002 Clarke
6,352,309 B1 3/2002 Beroth
D455,276 S 4/2002 Hutton
D455,391 S 4/2002 Granzeier et al.
D456,338 S 4/2002 Granzeier et al.
6,375,119 B2 4/2002 Park et al.
6,394,393 B1 5/2002 Mort
D458,465 S 6/2002 Boulay et al.
D459,095 S 6/2002 Lewis et al.
6,398,164 B1 6/2002 Fasse
D460,279 S 7/2002 Moburg
6,412,870 B1 7/2002 Higgins et al.
D461,321 S 8/2002 Figueras Mitjans
D462,533 S 9/2002 Popham et al.
D463,357 S 9/2002 Granzeier et al.
6,450,579 B1 9/2002 Nylander et al.
D465,344 S 11/2002 Siegert
6,481,798 B2 11/2002 Romca et al.
D467,088 S 12/2002 Haney et al.
6,494,404 B1 12/2002 Meyer
D468,917 S 1/2003 Veneruso
D469,264 S 1/2003 Natuzzi et al.
D471,021 S 3/2003 Lewis et al.
D471,369 S 3/2003 Khavari
D473,723 S 4/2003 Pesso
6,547,332 B2 4/2003 Pejathaya
D475,542 S 6/2003 Pfeiffer et al.
6,578,795 B2 6/2003 Romca et al.
6,588,837 B1 7/2003 Schultz et al.
D478,221 S 8/2003 Pfeiffer et al.
6,601,798 B2 8/2003 Cawley
D479,497 S 9/2003 Bailey
6,616,099 B2 9/2003 Sankrithi
D480,567 S 10/2003 Ricci
D480,882 S 10/2003 Ricci
D480,883 S 10/2003 Williams et al.
6,629,732 B1 10/2003 Ursel et al.
6,631,954 B2 10/2003 Amorin et al.
D481,873 S 11/2003 Velten et al.
D482,535 S 11/2003 Williams et al.
6,641,214 B2 11/2003 Veneruso
6,644,593 B2 11/2003 Lambiaso
6,648,395 B2 11/2003 Hoshino
D482,881 S 12/2003 Murphy
D482,882 S 12/2003 Murphy
D483,191 S 12/2003 Murphy
6,663,173 B1 12/2003 Corfitsen
6,669,141 B2 12/2003 Schmidt-Schaeffer
6,669,143 B1 12/2003 Johnson
D485,445 S 1/2004 De Maina
D485,446 S 1/2004 Stulik
D485,687 S 1/2004 Natuzzi
D486,652 S 2/2004 Nemeth
6,688,691 B2 2/2004 Marechal et al.
6,692,069 B2 2/2004 Beroth et al.
6,698,836 B1 3/2004 Veneruso
D487,981 S 4/2004 Ludeke et al.
D487,985 S 4/2004 Yu
D488,628 S 4/2004 Natuzzi
D488,629 S 4/2004 Giasson
D489,188 S 5/2004 Ricci
D489,908 S 5/2004 Ricci
6,729,689 B2 5/2004 Habedank
6,739,552 B2 5/2004 Sankrithi et al.

| | | | |
|---|---|---|---|
| 6,739,651 | B1 | 5/2004 | Barefoot |
| 6,742,842 | B2 | 6/2004 | Dowty |
| D493,294 | S | 7/2004 | Newson |
| D501,095 | S | 1/2005 | Zydko Hoyas et al. |
| D505,796 | S | 6/2005 | Johnson |
| D510,816 | S | 10/2005 | Lee |
| 7,083,235 | B2 | 8/2006 | Grimm et al. |
| 7,108,326 | B2 | 9/2006 | Schurg |
| 7,156,462 | B2 | 1/2007 | Verny et al. |
| 7,178,871 | B1 | 2/2007 | Round et al. |
| 2001/0000639 | A1 | 5/2001 | Park et al. |
| 2001/0001526 | A1 | 5/2001 | Moon et al. |
| 2001/0003962 | A1 | 6/2001 | Park et al. |
| 2001/0015566 | A1 | 8/2001 | Park et al. |
| 2001/0052722 | A1 | 12/2001 | Amorin et al. |
| 2002/0017810 | A1 | 2/2002 | Dryburgh et al. |
| 2002/0033432 | A1 | 3/2002 | Mikosza |
| 2002/0070314 | A1 | 6/2002 | Schmidt-Schaeffer |
| 2002/0079730 | A1 | 6/2002 | Schuhmacher et al. |
| 2002/0096921 | A1 | 7/2002 | Pejathaya |
| 2002/0113478 | A1 | 8/2002 | Kasahara |
| 2002/0140270 | A1 | 10/2002 | Hoshino |
| 2002/0145324 | A1 | 10/2002 | Metzler et al. |
| 2002/0167211 | A1 | 11/2002 | Nishi |
| 2003/0025371 | A1 | 2/2003 | Veneruso |
| 2003/0067202 | A1 | 4/2003 | Alampi |
| 2003/0075964 | A1 | 4/2003 | Piaulet et al. |
| 2003/0085597 | A1 | 5/2003 | Ludeke et al. |
| 2004/0035980 | A1 | 2/2004 | McDonnell |
| 2004/0036336 | A1 | 2/2004 | Veneruso |
| 2004/0041452 | A1 | 3/2004 | Williams |
| 2004/0051363 | A1 | 3/2004 | Wagner et al. |
| 2004/0066067 | A1 | 4/2004 | Wagner et al. |
| 2004/0080201 | A1 | 4/2004 | Verny et al. |
| 2004/0135413 | A1 | 7/2004 | Zund |
| 2006/0097553 | A1 | 5/2006 | Spurlock et al. |

FOREIGN PATENT DOCUMENTS

| | | | |
|---|---|---|---|
| AU | 133396 | S | 4/1998 |
| AU | 134155 | S | 6/1998 |
| AU | 134442 | S | 7/1998 |
| AU | 135069 | S | 9/1998 |
| AU | 137052 | S | 4/1999 |
| AU | 717706 | | 8/1999 |
| AU | 717708 | | 8/1999 |
| AU | 140765 | S | 6/2000 |
| AU | 146970 | S | 3/2002 |
| AU | 146971 | S | 3/2002 |
| AU | 155761 | S | 6/2004 |
| CA | 951765 | | 7/1974 |
| CA | 2165097 | | 6/1996 |
| CH | 445758 | | 10/1967 |
| CN | ZL 96306580.7 | | 6/1996 |
| CN | 1066406 | C | 5/2001 |
| CN | ZL 03353049.1 | | 7/2003 |
| CN | 1482980 | A | 3/2004 |
| DE | 2051271 | | 4/1972 |
| DE | 3603891 | A1 | 10/1986 |
| DE | 29702660 | U1 | 5/1997 |
| DE | 29702660 | U1 | 6/1997 |
| EP | 0463757 | A2 | 6/1991 |
| EP | 0291894 | B | 11/1991 |
| EP | 0957025 | A2 | 11/1999 |
| EP | 0980825 | | 2/2000 |
| EP | 1057725 | | 12/2000 |
| EP | 1057725 | A2 | 12/2000 |
| EP | 1097864 | | 5/2001 |
| EP | 1099627 | | 5/2001 |
| EP | 1099627 | A1 | 5/2001 |
| EP | 1116652 | | 7/2001 |
| EP | 1162138 | A | 12/2001 |
| EP | 1247478 | A | 10/2002 |
| EP | 1495908 | A1 | 12/2005 |
| FR | 647.809 | | 12/1928 |
| FR | 987.559 | | 8/1951 |
| FR | 2761833 | | 10/1998 |
| GB | 1220768 | A | 1/1971 |
| GB | 1278501 | A | 6/1972 |
| GB | 1337586 | A | 11/1973 |
| GB | 1354190 | | 5/1974 |
| GB | 1354190 | A | 5/1974 |
| GB | 1436968 | A | 5/1976 |
| GB | 2078504 | A | 1/1982 |
| GB | 2027229 | | 11/1992 |
| GB | 2050442 | | 9/1995 |
| GB | 2050443 | | 9/1995 |
| GB | 2050444 | | 9/1995 |
| GB | 2295962 | | 6/1996 |
| GB | 2070694 | | 5/1997 |
| GB | 2073659 | | 4/1998 |
| GB | 2074059 | | 4/1998 |
| GB | 2326824 | A | 1/1999 |
| GB | 2083667 | | 5/1999 |
| GB | 2083668 | | 5/1999 |
| GB | 2093450 | | 5/1999 |
| GB | 2331237 | | 5/1999 |
| GB | 2088223 | | 11/1999 |
| GB | 2097752 | | 6/2000 |
| GB | 2355180 | | 4/2001 |
| GB | 2355180 | A | 4/2001 |
| GB | 2362095 | A | 11/2001 |
| GB | 2396103 | A | 6/2004 |
| GB | 2 405 790 | A | 3/2005 |
| GB | 2 406 269 | A | 3/2005 |
| GB | 2405791 | A | 3/2005 |
| GB | 2412310 | A | 9/2005 |
| HK | 9811274 | | 10/1998 |
| HK | 1016850 | | 11/1999 |
| HK | 1053961 | | 11/2003 |
| JP | 52076020 | U | 6/1977 |
| JP | 59002634 | U | 1/1984 |
| JP | 60188646 | | 9/1985 |
| JP | 513838 | | 2/1993 |
| JP | 07148047 | A | 6/1995 |
| JP | 08-258796 | A | 10/1996 |
| JP | 8258796 | A | 10/1996 |
| JP | 10236397 | A | 9/1998 |
| JP | 11152094 | A | 6/1999 |
| JP | 1049843 | | 9/1999 |
| JP | 11301323 | A | 11/1999 |
| JP | 1064101 | | 3/2000 |
| JP | 1074748 | | 6/2000 |
| JP | 2001-17260 | | 1/2001 |
| JP | 1095557 | | 1/2001 |
| JP | 2001-087074 | | 4/2001 |
| JP | 2001-245740 | A | 9/2001 |
| JP | 1143254 | | 6/2002 |
| NZ | 27452 | | 9/1995 |
| NZ | 29003 | | 9/1995 |
| NZ | 28979 | | 5/1997 |
| NZ | 29691 | | 4/1998 |
| NZ | 511409 | | 10/1998 |
| NZ | 297049 | | 4/1999 |
| NZ | 400198 | | 5/1999 |
| SG | 9701368-4 | | 6/1997 |
| SG | 9800090-4 | | 3/1998 |
| SG | 9905358-9 | | 12/1999 |
| SG | 200102081-7 | | 5/2001 |
| SG | 200104928-7 | | 9/2001 |
| SG | D2001/988 | F | 10/2001 |
| SG | D2002/1650 | I | 5/2003 |
| SG | D2003/1116 | B | 11/2003 |
| WO | WO96/18537 | | 6/1996 |
| WO | WO 98/36967 | | 8/1998 |
| WO | WO 99/07574 | | 2/1999 |

| | | |
|---|---|---|
| WO | WO 00/21831 | 4/2000 |
| WO | WO00/21831 A2 | 4/2000 |
| WO | WO 00/48862 | 8/2000 |
| WO | WO 02/24527 | 3/2002 |
| WO | WO 02/32266 | 4/2002 |
| WO | WO 02/12015 | 5/2002 |
| WO | WO 02/51703 | 7/2002 |
| WO | WO 02/074133 A1 | 9/2002 |
| WO | WO03013903 | 2/2003 |
| WO | WO 02/32264 | 8/2003 |
| WO | WO 2006/059118 | 6/2006 |

OTHER PUBLICATIONS

Examination Report dated Jul. 22, 2005, application No. GB0403260.3 (published as GB 2396103 A).
Search Report dated Jan. 20, 2005, application No. GB0420882.3 (published as GB 2406269 A).
Search Report dated Jan. 6, 2005, application No. GB0420872.4 (published as GB 2405790 A).
Search report dated Jan. 7, 2005, application No. GB0420901.1 (published as GB 2405791 A).
Notice of Opposition to a European Patent No. 1,417,113 ("the Opposed Patent") and Opposition thereto by Premium Aircraft Interiors UK Limited ("the Opponent") stamped Aug. 14, 2006.
BOAC First Class Seats; Contour Premium Aircraft Seating 1933-50; Contour Premium Aircraft Seating 2005.
Narrow Boats; Canal Holiday Cruisers; The Wyvern Shipping Co. Ltd; Rothschild Road, Linslade, Leighton Buzzard, Bedfordshire LU7 2TF; published in the Notice of Opposition dated Sep. 11, 2005.
Our 1963 Split screen Volkswagen Camper Story Part Two; 2003-2006 Aidan O'Rourke-all rights reserved.
Saab 96 (1960-80) Brochure.
Saab 93 (1956-59) Brochure.
Austin Maxi Brochures (1969-81); Copyright 2002-2003; Keith Adams.
Austin Princess (1947-81 Inc. Leyland Princess) Torcars Princess Estate.
Peugeot 505 (1978-92) from Wikipedia; Jul. 8, 2006.
Citroen DS (1955-76); Malcolm Bobbitt; Veloce Publishing 2005, 33 Trinity Street, Dorchester DTI ITT, England.
MGB GT (1965-74) by Anders Ditley Clausager; Photography by John Colley; Published by MBI Published Co; 729 Prospect Avenue, P.O Box 1, Osceola, WI 54020-0001 USA.
Trade Document for Peugeot 504 (1972 & 1974).
Trade Document for Volkswagen Multivan (1998).
Trade Document for Volkswagen Caravelle (2003).
Trade Document for Ford Falcon (1988-91).
Trade Document for Lancia Beta HPE (1972-84).
The role of the cabin interior designer; Aircraft Technology Engineering & Maintenance-Aug./Sep. 1999.
First Revolution; Ian Dryburgh, Design Acumen, UK; Aircraft Interiors International; Sep. 2000.
High Flyers; Design Week; Apr. 1997; May 1997.
Planes, boats and trains; FX May 1997.
The Daily Telegraph; Feb. 25, 1997.
World Engineering; a call to the bar; Jan./Feb. 1997 Issue 17.
Britain's Design Industry; A local & global resource; Jan. 1997.
The Irish News; Global edition http://www.irishnews.com; Edition 38,306; Tuesday Oct. 29, 1996.
The Times; Design in Business; A weight off high-fliers' backs; Oct. 28, 1996.
News; Design Business Week; The Journal of the Design Counsel; Oct. 25, 1996.
Hotel + Leisure; The big sleep; FX Jun. 1996.
Engineering; Up and away; Apr. 1996.
Financial Times; Jan. 27/28, 1996, Or stretched out in comfort on a flying bed.
Aircraft Technology Dec. 1995; Hold on to your seats; pp. 46 to 54.
British Airways News; Flying bed a real winner; No. 1132 Oct. 25, 1996.
Boat International; Dec. 1995.
Directions Winter 95; London/Gatwick; Update for Business Traveller No. 19.
The Wall Street Journal Europe; 1995 Dow Jones & Company. Inc.; A Bed Aloft; Nov. 28, 1995.
Design Week; Sep. 22, 1995.
The Daily Telegraph; Sep. 19, 1995; Testing the mile-high snooze club.
The Guardian; Sep. 19, 1995; BA to bring back flying beds By Keith Harper.
Independent; Sep. 19, 1995; BA gets up to snoozing altitude again By Christian Wolmar.
The Times; Sep. 19, 1995; BA offers first-class flyers beds and pyjamas By Harvey Elliott.
Financial Times; Sep. 19, 1995; BA dreams of blanket success in first class By Michael Skapinker.
Daily Express; Sep. 19, 1995; BA's bed in the sky is simply first class By Stephen Kahn.
Daily Mail, Sep. 19, 1995; A good flight's sleep By John Hamshire.
The Sun, Sep. 19, 1995; Get a Good Flight's KIP By Isabelle Murray.
Financial Times; Sep. 18, 1995; BA's revolution in the cabin.
The Daily Telegraph; Sep. 18, 1995, Flying first class? Have a lie down; By Joe Saumarez Smith.
http://www.biztravelbrokers.com/pages/sleepseats.html (cited by Examiner in an Office Action dated Jun. 6, 2007 in related U.S. Appl. No. 29/219,657).
http://www.virgin-atlantic.com/en/us/whatsonboard/upperclass/cabin/index.isp (cited by Examiner in an Office Action dated Jun. 6, 2007 in related U.S. Appl. No. 29/219,657).
http://www.web.archive.org/web/20041119150329/http://www.virgin-atlantic.com/en/us/whatson (cited by Examiner in an Office Action dated Jun. 6, 2007 in related U.S. Appl. No. 29/219,657).
Notice of Opposition to Indian Patent Application No. 500/CHENP/2004 dated Jul. 25, 2007.

SEATING SYSTEM AND A PASSENGER ACCOMMODATION UNIT FOR A VEHICLE

CROSS REFERENCE TO RELATED APPLICATIONS

This application is a divisional application of U.S. patent application Ser. No. 10/774,244, filed Feb. 6, 2004, hereby incorporated by reference.

FIELD OF THE INVENTION

The present invention relates to a novel seating system for a passenger vehicle, particularly an aircraft. The present invention also relates to a passenger accommodation unit for a vehicle, which accommodation unit is adapted to provide individual, self-contained seating and sleeping accommodation for a passenger. The accommodation unit of the present invention may be adapted for use on any passenger vehicle, including omnibuses, coaches, ferries and railway carriages, but is particularly suited for use on aircraft. The present invention also comprehends improvements in or relating to passenger seats for vehicles, particularly aircraft.

BACKGROUND OF THE INVENTION

A conventional passenger seat for an aircraft comprises a back-rest and a seat-pan that are supported off the floor of the vehicle by means of a suitable supporting structure that is anchored to a pair of seat tracks in the floor. The seat defines a notional longitudinal seat axis, as viewed from the perspective of a passenger using the seat, and a plurality of such seats are adapted to be arranged in rows in a passenger accommodation cabin within the fuselage of an aircraft, each row extending transversely across the cabin, one behind another, with the notional seat axis of each seat substantially aligned with the longitudinal axis of the fuselage such that each seat faces forwards. Usually, the back-rest of the seat is capable of reclining from an upright position to a reclined position for the comfort of a passenger using the seat during the course of a flight. Some prior art passenger seats, particularly seats for use in business-class and first-class of sections of aircraft, where the pitch between adjacent rows of seats is greater than in an economy-class cabin, also comprise a leg-rest which is hinged to the front of the seat-pan and is capable of movement between a lowered or stowed position, in which the leg-rest depends from the seat-pan generally vertically towards the floor, and a raised or deployed position in which the leg-rest extends forwardly of the seat-pan to bear the passenger's legs off the floor. Thus, it is possible with conventional aircraft passenger seats to obtain a fair degree of comfort by reclining the back-rest and elevating the leg-rest, when fitted.

Whilst the above-described arrangement of conventional aircraft passenger-seats is generally satisfactory for short-haul flights having a duration of up to three or four hours, it is not satisfactory for use on longer flights during which passengers typically wish to go to sleep. Even in the reclined position described above, a passenger using the seat remains in a general sitting position. Many passengers find it difficult to sleep properly, if at all, when sitting. In recent years there has been a significant increase in the number of passengers who regularly make long-haul flights, and there has been a trend in the art to devise passenger seats which allow passengers to adopt further reclined positions during the course of a flight to facilitate sleeping. This is particularly important for passengers who travel for business purposes for whom it is desirable that they arrive at their destinations feeling refreshed and alert.

One possibility that has been disclosed in the art for increasing the degree to which an aircraft passenger seat can be reclined comprehends simply increasing the extent to which the back-rest can be reclined backwards and the leg-rest elevated. In the extreme, it is possible to form a substantially flat bed using such a technique in which the back-rest is reclined and the leg-rest raised, each to such an extent that they are disposed substantially co-planarly with the seat-pan and each other. A disadvantage of such a system is that the pitch between adjacent rows of seats must be increased substantially to accommodate the full height of a passenger. Whilst this is sometimes possible in the first-class area of an aircraft cabin, it is generally uneconomic for a business-class cabin. Furthermore, whilst it is possible to form a generally flat surface which is disposed substantially horizontally, the surface is still not ideal, because the foam or other padding on the seat is generally sculptured for use as a seat, whereas for a bed, it is desirable to have a substantially flat surface.

GB 2326824 A discloses a seating unit for a first class aircraft cabin comprising a secondary seat positioned to face a primary seat, the secondary seat having a seating portion positioned to cooperate with a leg-rest of the primary seat to form a continuous, flat sleeping surface when the back-rest of the primary seat is reclined to a horizontal position. The seating unit defines a notional, longitudinal seat axis, and a plurality of such seating units may be arranged within the cabin side-by-side in a longitudinally offset relation with respect to the longitudinal axis of each seat, with each seating unit being oriented at an acute angle to the longitudinal axis of the aircraft fuselage, so as to define a generally triangular or trapezoidal space to the front or rear of each seating unit (according to whether the seating units face outwards or inwards relative to the cabin). The space is used to accommodate a counter-top to one side of an adjacent seating unit and optionally a cupboard or other storage space. The seating unit of GB 2326824 A has the advantage that by incorporating an additional, secondary seat in the flat sleeping surface together with back-rest, seating portion and leg-rest of the primary seat, it is possible to form a long sleeping surface which is able to accommodate comfortably passengers having a height of greater than 6 ft (1.83 m). However, the seating unit of GB 2326824 A represents an even greater overhead in turns of cabin space than the conventional system described above and, moreover, still suffers from the disadvantage that the seat cushioning is designed principally for use as a seat and not a bed. A disadvantage of the seat of GB 2326824 A is that it occupies a very large floor area within the cabin and, in view of its overall length, the seating unit of GB 2326824 A is wholly unsuitable for use in a business class section of an aircraft.

WO 00/21831 A2 discloses a seating unit which can be converted into a bed for use principally in a business-class section of aircraft cabin. The seating unit of WO 00/21831 A2 comprises a pair of seats facing in opposite directions, each seat comprising a seating space for the seated body of an occupant and an extension space in which the legs of an occupant may be placed. The seats are positioned each side of a notional dividing axis with the seating space of one extending over the axis into the extension space of the other. When installed in an aircraft cabin, one of the seats faces substantially forwards and the other faces substantially aft. Each seat of the seating unit of WO 00/21831 A2 comprises a primary seat that is substantially the same as the primary seat of GB 2326824 A described above, but without a leg-rest, and a secondary unit spaced forwardly of the primary seat. Each seat thus comprises a primary seat having a reclinable back-rest and seat-pan and a secondary unit comprising an elevated pad which serves as a foot-rest. The primary seat can be reclined such that as the back-rest is reclined, the seat-pan moves forwardly to meet the secondary unit to form a continuous surface therewith which serves as a sleeping surface for a passenger. As with GB 2326824 A, the seating unit of WO 00/21831 A2 therefore has the advantage of providing a substantially horizontal sleeping surface for a passenger during long-haul flights. However, the seating unit of WO 00/21831 A2 is still extravagant in terms of the space available within a typical business-class cabin and also suffers from the disadvantage that when configured as a bed, each seat is unable to accommodate comfortably tall passengers. As with the other prior art seats described above, each of the seats of the seating unit of WO 00/21831 A2 also suffers from the disadvantage that the seat cushioning is not specifically designed for use as a bed surface, but is contoured for use principally as a seating surface.

Another attribute of a passenger seat for use in a first-class aircraft cabin is a generous seat width. A further disadvantage associated with the seating unit of WO 00/21831 A2 is that in order to accommodate a maximal head count within a business class cabin, the seat width is reduced, which many passengers find to be uncomfortable. Whilst the seating unit of WO 00/21831 A2 has the undeniable benefit of providing a substantially flat sleeping surface for a passenger in-flight, its overall dimensions are such that passengers of above average height and/or weight find the accommodation somewhat cramped. Furthermore, privacy screens are provided between adjacent seating units which, in combination with the total number of seating units provided in the limited space afforded by a business class cabin, result in the cabin as a whole having a somewhat crowded appearance.

FR 987559 A discloses a seating installation for public transport vehicles such as motor cars, auto buses and the like comprising a row of seats, each seat comprising a supporting structure for supporting the seat off the floor of a vehicle, a seat-pan and a back-rest. Said row defines an aisle between two adjacent seats. The seat-pan of one of the seats adjacent the aisle can be removed and slung in an inverted orientation between the supporting structures of the two seats adjoining the aisle to form an additional seat in the aisle. The back-rest of the one seat can then be rocked forwards into the space formerly occupied by the seat-pan to provide a replacement seat-pan for the one seat. The back-rest of the one seat thus has front and rear surfaces which can both serve as part of a seat. Optionally the entire row of seats could support a mattress to form a couchette. However, the installation of FR 987559 A is not suitable for use on a passenger aircraft where the aisles must be kept unobstructed at all times and, furthermore, a plurality of adjacent seats are used to provide support for a single couchette. Thus the installation of FR 987559 A is not able to provide one couchette per seat.

JP 5-13838 A discloses a seating system for vehicles such as buses and trains comprising a plurality of seats. Each seat comprises a seat-pan and a back-rest that can rock between an upright position and a reclined position, and the seats are positioned within a cabin at an angle with respect to a centre-line of the cabin and face outwardly to define a generally triangular space between each seat and a wall of the cabin. Said space accommodates a box comprising a foot-rest for an adjacent seat.

FR 647809 A discloses a seating system for a sleeping car in which a plurality of seats are arranged at an angle to the longitudinal axis of the sleeping car, facing inwardly to define a generally triangular space to the rear of each seat which is used to accommodate a small table for an adjacent seat.

SUMMARY OF THE INVENTION

An embodiment of the present invention provides improved passenger accommodation for a business-class section of a passenger aircraft. In particular, an embodiment of the invention provides such accommodation which incorporates a flat sleeping surface of maximal length and preferably also of maximal width.

Another embodiment of the present invention provides an improved passenger accommodation unit for a vehicle, particularly an aircraft, which accommodation unit is adapted to provide self-contained, individual seating and sleeping accommodation for a passenger, particularly for use in the business-class section of an aircraft where the pitch between adjacent rows of seats is typically in the range of 50-60 inches (1.27 to 1.52 meters).

Yet another embodiment of the present invention provides a passenger accommodation unit which can be converted into a bed having maximal length to accommodate tall passengers, particularly those having height greater than 6 ft (1.83 meters).

Yet another embodiment of the present invention provides a passenger accommodation unit for a vehicle having a seating surface which may be especially adapted for use as a seating surface and a bed surface that may be especially adapted for use as a bed surface.

A different embodiment of the present invention provides a passenger accommodation unit which can be converted into a bed and which promotes or contributes to a first cabin ambience when configured as a seat and a second, different cabin ambience when configured as a bed. Thus, yet another embodiment of the invention provides a seating system for a vehicle cabin comprising a plurality of passenger accommodation units which can be converted into beds and which, when all or a majority of the units are configured as seats, gives the cabin a particular first overall visual appearance and, when all or a majority of the units are configured as beds, gives the cabin a second overall appearance or ambience.

Yet another embodiment of the present invention provides a seating system for a passenger vehicle, particularly an aircraft, which optimises the use of space within a passenger cabin.

Yet another embodiment of the present invention provides a seating system for a cabin of a passenger vehicle which has a substantially uncrowded appearance.

Further embodiments of the invention will be apparent to those skilled in the art from the following description of the invention and specific embodiments of the invention.

According to one embodiment of the present invention there is provided a passenger accommodation unit for a vehicle, particularly an aircraft, which is adapted to provide self-contained, individual seating and sleeping accommodation for a passenger, said accommodation unit comprising: supporting structure for supporting said assembly off the floor of a vehicle; one or more movable passenger-bearing, structural components; and means for connecting said movable, structural components to said structure such that said components can be selectively moved between a seat configuration, in which a plurality of passenger-bearing surfaces on said one or more of said structural, movable components or said supporting structure form a seat for the passenger, and a bed configuration, in which a plurality of said bearing surfaces are disposed substantially coplanarly and substantially contiguously to form a bed for the passenger; characterised in that at least one of said movable components is double-sided, comprising first and second opposite sides, one of said sides having a first seat surface that forms part of the seat in said seat configuration, and the other side having a second bed surface that forms part of said bed in said bed configuration.

The double-sided, movable, structural component may comprise an internal, load-bearing diaphragm having first and second opposite faces and first and second outer cushioning layers adapted to be supported by said diaphragm on said first and second faces respectively. Thus, said one side of said double-sided movable component may, for example, carry a layer of foam padding having a contoured surface that is shaped for use as a seat component, and said other side may carry a layer of foam padding having a substantially flat surface for use as part of a bed. Said first side of said double-sided, movable component may have a first appearance that contributes to or promotes an overall cabin appearance that is suitable for a seating environment. For instance, said first surface may have a leather or simulated leather seat covering. Said second surface may have a visual appearance which contributes to or promotes an overall cabin ambience that is appropriate for a sleeping environment. Thus, said second surface may be upholstered in fabrics or other materials having an appearance that is usually associated with bedding materials.

Preferably, said double-sided component is a back-rest component. Said back-rest component may be connected to the supporting structure such that it can be selectively pivoted between a first generally upright position, in which the first surface is arranged to form part of the seat, and a second prone position in which said second surface is arranged to form part of the bed. Preferably, the second bed surface of the back-rest component is generally horizontal in the second prone position.

In some embodiments, one or more of said passenger-bearing surfaces may define a seat-pan. Said back-rest component may be connected to the structure such that, in the second prone position, the back-rest component overlays the seat-pan. Thus, in accordance with the present invention, said seat-pan may have a dedicated seating surface which is shaped and upholstered specifically for use as a seat. In the bed configuration, the seat-pan may be wholly or partially concealed by the back-rest component in the second prone position such that the seating appearance of the seat-pan is hidden by the back-rest.

In some embodiments, said seat-pan may comprise one or more of said moveable components which are connected to said supporting structure for movement in a direction having a vertical component between an upper deployed position and a lower stowed position, and seat-pan moving means may be provided for moving the seat-pan from the upper deployed position to the lower stowed position when the back-rest component is moved from the upright position to the prone position. Thus, in said second prone position, the back-rest component may occupy the space that is normally occupied by the seat-pan in the upper deployed position, the seat-pan being displaced to its lower stowed position in the bed configuration. This feature of the invention allows the bed surface of the seat assembly to be provided at a relatively low-level off the floor of the vehicle to make it easy for a passenger to climb in to and out of the bed.

In preferred embodiments of the present invention, one or more of said passenger-bearing surfaces comprise a bed extension surface, which bed extension surface is positioned or deployable to be positioned forwardly or rearwardly of the seat in said seat configuration. Said back-rest component may be connected to the structure such that in said prone position said second bed surface and said bed extension surface form a substantially continuous surface. Said bed extension surface may be positioned or may be deployable to be positioned forwardly of the seat-pan component such that, in the seat configuration, said bed extension surface may serve as a foot-rest. Said accommodation unit may therefore not have a leg-rest component that is connected to and deployable from the seat-pan. Thus, in place of such a conventional leg-rest, the accommodation unit of the present invention may include a separate foot-rest surface at a position spaced forwardly of the seat-pan.

In some embodiments, one or more of said passenger-bearing surfaces may comprise a rear extension surface behind said back-rest component, and said back-rest component may be connected to the structure such that in said prone position said second bed surface and said extension surface are substantially coplanar.

In some embodiments, said back-rest component may be spaced forwardly of said rear extension surface in said prone position, and a movable infill component may be provided that is connected to said structure such that it is movable between a stowed position and a deployed position, which infill component comprises a passenger-bearing infill surface that extends between said back-rest component and said rear extension surface when said infill component is deployed, such that said rear extension surface, infill surface and second bed surface form a substantially continuous surface, and means may be provided for moving the infill component from said stowed position to said deployed position when the back-rest component is moved from the upright position to the prone position. Said infill component may be mounted pivotably behind the back-rest component intermediate the rear extension surface, such that in the stowed position the infill component may be angled to the horizontal and, upon deployment, may be pivoted to the deployed position. Thus, in bed configuration, the bed may be constituted by a rear extension surface, an infill surface and a foot-rest surface as well as the second surface of the back-rest component.

The bed in accordance with the present invention may have an overall length of at least 78" (1.98 meters) and, in some embodiments, may have a length in excess of 85" (2.16 meters).

Preferably, said back-rest component is connected to the structure for selective movement between an upright position and a fully reclined position in which the back-rest component is rocked rearwardly relative to the upright position. In some embodiments, one or more of said movable components may comprise a seat-pan which is connected to the supporting structure such that it can be pivoted relative to the supporting structure between a first position and a second position, and means may be provided for pivoting the seat-pan progressively from the first position to the second position as the back-rest component is pivoted rearwardly from the upright position to the fully reclined position.

It has been found surprisingly that a plurality of passenger accommodation unit according to embodiments of the present invention may be arranged within a business-class section of an aircraft cabin without significantly reducing the number of seats. Each seat defines a notional longitudinal axis that extends fore-and-aft relative to the normal manner of using the seat. It has been found that a maximal number of the passenger accommodation units according to the present invention may be accommodated within an aircraft cabin if each unit is arranged with its notional axis to subtend an angle in the range of 35 to 550 with the longitudinal axis of the aircraft.

Thus, according to another embodiment of the invention, there is provided a seating system for a passenger vehicle, particularly an aircraft, comprising a plurality of seat units, each seat unit defining a notional longitudinal seat axis and comprising a supporting structure adapted for attaching the seat unit to a floor of a vehicle and means forming or being configurable for forming a seat comprising a seat-pan and a back-rest; characterised in that said seat units are arranged to form a column defining a notional longitudinal column axis, in which column said seat-units are arranged side-by-side in longitudinally offset relation at an acute angle to the notional column axis, thereby defining to the rear of each seat, each seat unit further comprising means forming or being configurable for forming a substantially flat bed, a major proportion of which bed is disposed forwardly of the position of the seat, which bed extends rearwardly into said space to extend the flat-bed.

Preferably said space to the rear of each seat is generally triangular or trapezoidal.

Said acute angle is typically in the range 30-60°, preferably 40-50°, e.g. 40°, 45° or 50°. Normally, the seat units are installed in an accommodation cabin of said vehicle, which cabin defines a notional longitudinal cabin axis. Said notional column axis may be substantially parallel to or subtend an acute angle with said cabin axis. Thus, within an aircraft cabin, seat units according to embodiments of the present invention may be positioned in a "herringbone" arrangement.

Said seat units may be disposed adjacent a side wall of the vehicle and face inwardly. Preferably, said accommodation cabin comprises two opposing side walls, and a column of seat units may be positioned contiguously or closely adjacent to each wall such that each seat faces into the cabin, with an extension surface behind the back-rest of the seat disposed adjacent the wall. The seats may thus have their backs to the vehicle wall, giving the cabin as a whole an uncrowded appearance.

Where cabin space permits, one or more additional columns of seat units may be provided towards the centre of the cabin. If it is possible to accommodate two central columns of seats in any given cabin, then preferably those columns are arranged generally back-to-back.

Preferably each seat unit further comprises a foot-rest that is positioned forwardly of the seat. Said foot-rest can thus be used by an occupant of the seat to support his or her feet in-flight in an elevated position and/or by another passenger to sit on whilst visiting the occupant. Provided that such a foot-rest is provided, it has been found that passengers do not require the seat unit to incorporate a movable leg-rest as part of the seat-forming means.

In some embodiments, each seat unit may further comprise a first privacy screen that is positioned forwardly of said foot-rest.

Said seat forming means and said bed forming means may comprise one or more movable passenger-bearing elements which are selectively configurable to form, in a seat mode, at least part of the seat for a passenger or, in a bed mode, at least part of said flat bed, and advantageously the flat bed in the bed mode is disposed at substantially the same level as the seat-pan in the seat mode.

Preferably, each seat unit optionally comprises a first, preferably fixed, passenger-supporting element in said space to the rear of the seat, which first passenger-supporting element is disposed substantially coplanarly with said one or more movable elements when said movable elements are configured in the bed mode and is adapted to form part of said flat bed. Said first passenger-supporting element may be generally triangular or trapezoidal. It will be appreciated that the first passenger-supporting element is only used by a passenger when the seat unit is arranged in the bed configuration, and accordingly the seat unit may be arranged such that the first passenger-supporting element extends into a lateral recess defined by the concave cabin side wall to maximise the use of space in the cabin.

Advantageously, each seat unit optimally further comprises a second, preferably fixed, passenger-supporting element to one side of the seat, which second passenger-supporting element is disposed substantially coplanarly with said first passenger supporting element and is adapted to form part of said flat bed when the movable elements are configured in said bed mode, thereby to extend said flat bed laterally. Said second passenger-supporting element may be generally triangular or trapezoidal. Said first fixed element of one seat unit may be disposed substantially contiguously to the second fixed element of an adjacent seat unit, and said first and second elements may be divided from one another by a second privacy screen. Said first and second elements may occupy substantially all of the space to the rear of the seat.

An embodiment of the present invention thus provides a seating system which is particularly suited for a business-class cabin of a passenger aircraft. The seating system of the present invention provides individual seat units having back-rests and seat-pans and optional foot-rests to allow passengers to rest their legs in an elevated position during a flight. Each seat unit is provided with self-contained means for forming a substantially flat bed, and the use of space within the cabin is optimised by positioning the flat bed to extend rearwardly behind the seat into a space defined by the arrangement of the seat units. Surprisingly, it has been found that in accordance with an embodiment of the present invention it is possible to provide flat beds within a business-class section of a passenger aircraft having a length of up to 7 ft (2.13 meters) without substantially sacrificing head-count. Furthermore, the applicants have found that the seat units of an embodiment of the present invention can be positioned to give the cabin a substantially uncrowded appearance.

Said supporting structure may be manufactured from any suitable, aviation standard, lightweight material that is known to those skilled in the art and may be equipped with suitable anchoring means for anchoring the seat unit to seat tracks in an aircraft passenger cabin. Preferably, the supporting structure comprises a pallette or splinth which is adopted to be attached to said seat tracks.

In accordance with another embodiment of the present invention there is provided a seat module for a passenger vehicle, said seat module comprising a seat portion, a foot-rest portion, a unitary supporting structure for supporting said seat portion and said foot-rest portion off the floor of the vehicle and attaching means for attaching said supporting structure to a pair of seat tracks in a floor of the vehicle; characterised in that said attaching means comprise two spaced fixings for fixing the supporting structure to one of the tracks of the pair at two spaced points and a single third fixing for fixing the supporting structure to the other track, thereby to provide a 3-point fixing between the seat module and the seat tracks; the arrangement being such that a plurality of said seat modules can be attached to a pair of seat tracks, one adjacent another, thereby to form a plurality of seat units, each seat unit comprising the seat portion of one module and the foot-rest portion of another, adjacent module.

It has been found that the use of a 3-point fixing between a unitary seat supporting structure and a pair of seat tracks in accordance with the present invention allows the two seat tracks forming the pair a greater degree of flexibility to move relative to one another in the event of undue stresses being applied to the aircraft infrastructure such, for example, as in the event of an emergency or crash landing, thus reducing the likelihood of the structure becoming detached from the seat tracks at one or more of the fixing points under such conditions.

According to yet another embodiment of the present invention there is provided a passenger seat assembly for a passenger vehicle, particularly an aircraft, which assembly is adapted to provide seating and sleeping accommodation for a passenger, said assembly comprising:

a supporting structure adapted for supporting the assembly off the floor of the vehicle;

a plurality of seat elements including a seat-pan element and a back-rest element, said back-rest element comprising first and second opposite sides, one of said sides having a first seat surface and the other side having a substantially flat second bed surface;

one or more auxiliary accommodation elements connected to or forming part of said supporting structure and being positioned or being deployable to be positioned juxtaposed said seat, the or each auxiliary accommodation element having an auxiliary, substantially flat, passenger-bearing surface; and a seat movement mechanism adapted for connecting the seat elements to the supporting structure, said seat movement mechanism including a seat conversion sub-mechanism adapted to allow and control movement of the seat elements such that the seat elements can be selectively moved between a seat configuration adapted to provide a seat for the passenger and a bed configuration adapted to provide a bed for the passenger, the seat conversion sub-mechanism being adapted for controlling movement of the back-rest element such that said back-rest element is pivotable from a first upright position, in which said first seat surface of the back-rest element cooperates with said seat-pan element for forming the seat, to a second prone position in which the second bed surface is disposed substantially coplanarly and contiguously with one or more of said auxiliary passenger-bearing surfaces for forming the bed.

Thus, in accordance with an embodiment of the present invention, a passenger seat assembly is provided having a plurality of moveable seat elements which are adapted to form a seat. The seat assembly can also be converted into a bed configuration in which the back-rest element and one or more of the auxiliary elements form a sleeping surface for a passenger. The embodiment is characterised in that the back-rest element has a first face that is specifically adapted for use as a seating surface and second opposite face that is specifically adapted for use as sleeping surface.

Preferably, said seat movement mechanism is adapted to control movement of said seat-pan element and said back-rest element in relation to each other. Said seat conversion sub-mechanism may be adapted to control movement of said back-rest element such that as the back-rest element is moved from the first position to the second position said back-rest element rocks forwardly over the seat-pan element, and said back-rest element in the second prone position is superposed over the seat-pan element. Advantageously, therefore neither the seat-pan element nor the first seat surface of the back-rest element forms part of the bed surface in the bed configuration and may therefore be upholstered with materials especially suitable for use on a seat. Similarly the second bed surface of the back-rest is not used to form part of the seat in the seat configuration, and accordingly said bed surface may be upholstered in a manner especially suitable for use as a bed. Moreover, the materials used to upholster the seat elements used respectively in the seat configuration and bed configuration may be differently coloured and/or textured and/or patterned from one another so as to create a first ambience or a "mood" in an aircraft cabin when all or a majority of such passenger assemblies according to the present invention are configured in one of said configurations, and second different ambience or "mood" when all or a majority of the assemblies are configured in the other configuration. Said one face of the back-rest element may carry a layer of foam padding having a contoured first surface that is adapted to form a back-rest or part of a back-rest of a seat, and the other face may carry a layer of foam padding having a substantially flat second surface that is adapted to form part of the bed.

Said seat conversion sub-mechanism may be adapted to control movement of the seat-pan element such that as the back-rest element is moved from the first upright position to the second prone position said seat-pan element is caused to move downwardly relative to the supporting structure. Thus, the bed surface of the seat assembly may be provided at a relatively low-level off the floor of the vehicle to make it easy for a passenger to climb in to and out of the bed.

Preferably, suitable motor means are provided for automatically moving the back-rest element between the upright and prone positions and user-operable control means are provided for controlling operation of the motor means.

Preferably said seat movement mechanism further comprises a seat reclining sub-mechanism which is adapted to allow said seat to be selectively reclined from an upright position to a fully reclined position, said seat reclining mechanism being adapted to control movement of the back-rest element such that as the seat is reclined from the upright position to the fully reclined position, said back-rest element is rocked rearwardly from the first upright position to a third fully reclined position. Said seat reclining sub-mechanism may advantageously be further adapted to control movement of said seat-pan element such that as the back-rest element is rocked rearwardly from the first upright position to the third fully reclined position said seat-pan element is caused to tilt rearwardly. Thus, in the fully reclined position, the back-rest element and seat-pan element may be respectively oriented to provide an ergonomically comfortable sitting position for a passenger using the seat assembly. Both the reclining action of the back-rest element and the tilting action of the seat-pan element may be motorised under the control of said user-operable control means.

Preferably, one or more of said auxiliary accommodation elements are positioned or deployable to be positioned forwardly or rearwardly of the seat. In some embodiments, one or more of said auxiliary accommodation elements may comprise a foot-rest positioned or deployable to be positioned forwardly of said seat, and in said second position the second bed surface of the back-rest element may be disposed substantially coplanarly and contiguously with said foot-rest.

One or more of said auxiliary elements may comprise a fixed, rear extension surface positioned rearwardly of the seat. In some embodiments, said seat assembly may further comprise a movable infill element, and said seat conversion sub-mechanism may be adapted to allow movement of said infill element between a lower, stowed position and a raised, deployed position in which said infill element extends substantially coplanarly and contiguously with said second surface of said back-rest element in said second prone position and said rear extension surface, thereby to form a substantially flat, extended bed surface. Said seat conversion sub-mechanism may be further adapted to control movement of said infill element such that said infill element is caused to moved from said stowed position to said deployed position when the back-rest element is moved from said first upright position to said second prone position. Said infill element may be pivotably connected to the lower end of the back-rest element, such that as the back-rest element is moved from the first position to the second position, the infill element is caused to move from the stowed position to the deployed position.

Said seat conversion sub-mechanism may comprise a seat holding device that is pivotably connected to the supporting structure for rocking movement between a first seat position and second bed position. Said back-rest element may be mounted on the holding device, such that back-rest element can be pivoted from the first upright position to the second prone position by rocking the holding device from said first position to said second position, and releasable locking means may be provided for selectively locking the holding device in the first and second positions. In some embodiments, said seat holding device may comprise two opposing rocker plates. Said rocker plates may be interconnected by one or more torque tubes.

Said seat-pan element may be pivotably mounted on the holding device, the arrangement being such that when the holding device is rocked from the first position to the second position, the seat-pan element is caused to move downwardly from an upper deployed position to a lower stowed position and the back-rest elements is caused to rock forwardly over the seat-pan element such that in the second prone position, the back-rest element overlays the seat-pan element. The seat-pan element may comprise a front end and a rear end relative to the back-rest element, and the seat-pan element may be pivoted to the holding device at or towards said rear end.

Conveniently, the seat movement mechanism further comprises a seat-pan supporting device for supporting the front end of the seat-pan element. Said seat-pan supporting device may comprise a slideway disposed beneath the seat-pan element, a leg member having two opposing ends, one of said ends being pivotably connected to the front end of the seat-pan element, the other end being slidably engaged in said slideway, and a drag-strut connecting the other end of the leg member to the holding device, the arrangement being such that as the holding device is rocked from the first position to the second position, the drag-strut is moved to cause or allow said other end of leg-member to slide in the slideway, the slideway having a profile such that as the holding device moves from the first position to the second position, the leg member is moved downwardly, thereby causing or allowing the front end of the seat-pan element to move progressively downwardly. Said leg member may be pivoted to the seat-pan element at said one end and pivoted to said slideway at said other end. In some embodiments, the front end of the seat-pan element may be supported by two leg-members, each leg-member being slidably engaged in a respective slideway juxtaposed a respective lateral side of the seat.

Preferably, the seat movement mechanism further comprises a seat reclining sub-mechanism adapted to allow said seat element to be selectively moved between an upright position and a fully reclined position, when said holding device is disposed in the first seat position.

Said seat reclining sub-mechanism may comprise a curvilinear track attached to or formed in the holding device and having two opposing track-ends and a plurality of spaced track followers attached to said back-rest element, said track-followers being adapted to engage in and slide along the track, the track being configured such that as the track-followers slide along the track from one end to the other, the back-rest element is caused to rock progressively rearwardly from the first upright position to a third fully reclined position. Said seat reclining sub-mechanism may further comprise a selectively operable bi-directional driving means for translationally moving said back-rest element relative to the holding device, the arrangement being such operation of said driving means causes the track-followers to slide along the curvilinear track, thereby causing the back-rest element to rock progressively between said first and third positions.

Advantageously, the driving means may comprise a linear actuator connected between the back-rest element and said holding device. A linear actuator such, for example, as a linear screw or ball screw may be stopped at any intermediate position between the first and third positions, thereby allowing the back-rest element to be reclined continuously between the first and third positions and to be stopped at any desired intermediate position.

In some embodiments, said linear actuator may comprise a linear screw or ball screw fixedly secured to the holding device, a screw-engaging device pivotably connected to the back-rest element and a selectively operable bi-directional motor carried by said holding device for rotatably driving the linear or ball screw. Said seat-pan element may have a front end and rear end relative to the back-rest element, and said linear actuator may be pivotably connected between the holding device and the seat element, said linear actuator being attached to the seat-pan element at or towards said rear end for driving said seat-pan element progressively downwards relative to the supporting structure from a first upper position when the back-rest element is in said first upright position to a second lower position when the back-rest element is in said third fully reclined position, and said seat movement mechanism may further comprise a seat-pan supporting device for supporting the front end of the seat-pan element as the rear end of the seat-pan element is driven downwardly, thereby causing the seat-pan to tilt progressively rearwardly as the back-rest element rocks rearwardly. Thus, in the upright position, the back-rest element may be oriented substantially upright and the seat-pan element may be disposed generally horizontally. In the fully reclined position, the back-rest element is rocked rearwardly relative to the upright position, and the seat-pan element is tilted rearwardly relative to the upright position to form a comfortable lounge seat position. Preferably, the profile of the curvilinear track, the length and position of the linear actuator, the positions of the pivots between the linear actuator and the back-rest and seat-pan elements and the configuration of the seat-pan supporting device are such that as the seat is progressively reclined from the upright position to the fully reclined position, it moves through a series of predetermined, ergonomically comfortable seating positions. Intermediate said predetermined positions, the profile of the curvilinear track, etc., may be determined by interpolation. In some embodiments, the linear actuator may be connected to the back-rest element through a lost motion device to allow a small degree of relative translational movement between the seat-pan and back-rest elements in order to allow the back-rest and seat-pan elements to adopt the aforesaid ergonomically comfortable positions.

Said seat conversion sub-mechanism may comprise a selectively operable bi-directional actuator for locking said holding device between said first seat position and said second bed position. Said actuator may comprise a four-bar double-rocker linkage, said linkage comprising a rocker and coupler link connected intermediate said holding device and said rocker, and selectively operable bi-directional rotary drive means for operating said rocker, the arrangement being such that operation of the rocker causes rocking of said holding device between said first and second positions. Said rotary drive means may comprise a motor, a worm-gear and a worm-wheel, wherein the worm-wheel is fixedly secured to the rocker. A worm-gear/worm-wheel device is a non-reversible device, and advantageously, therefore, undue forces applied to the holding device, for example, in the event of a heavy passenger sitting heavily into the seat, are not transmitted through the worm-gear/worm-wheel device to the motor. Furthermore, the rotary drive means are locked in said first and second positions.

However, in order to allow the holding device to be rocked manually when desired between said first and second positions, for example, in the event of a failure of said motor or of the power supply in an aircraft cabin, the worm-gear may be disengagable from the worm-wheel.

Said actuator may be attached to the supporting structure of the seat assembly beneath said seat elements. Said holding device may comprise two spaced side members disposed respectively to opposing sides of the back-rest element. Said coupler link may be connected to the side members below the pivot point between the holding device and said supporting structure.

The present embodiment thus provides a passenger seat assembly for use on a vehicle, particularly an aircraft, in which a back-rest element is mounted on a supporting structure such that it can be reclined rearwardly from an upright position to a reclined position for passenger comfort and can be pivoted forwardly to a substantially horizontal prone position over the top of a seat-pan element. The seat-pan element and a first surface of the back-rest element are upholstered in a manner suitable for use as a seat. The second reverse surface of the back-rest element however is adapted for use as a bed surface. The seat may comprise one, and preferably two, fixed or deployable the auxiliary extension surfaces behind and/or in front of the seat, and the back-rest element is pivoted to the support structure such that, when pivoted to the second prone-position, it meets one of the extension surfaces to form a substantially continuous surface therewith. A moveable infill element may be provided to fill-in the space between the back-rest element and the other extension surface where provided. The seat assembly of the present invention can thus be converted from a seat into a bed which is capable of accommodating even tall passengers.

Advantageously, the seat assembly of the invention may be oriented at an angle of between 35 and 55°, preferably 40 to 50°, relative to the longitudinal axis of an aircraft cabin such that an extension surface behind the back-rest element extends into a recess defined by a typical concave aircraft cabin interior wall. Whilst the area of the cabin juxtaposed the concave cabin wall is not suitable, and has insufficient headroom, to accommodate the back-rest element in the upright position, it can be used in accordance with the present invention to accommodate the rear extension surface which forms part of the bed surface in the bed configuration. The extension surface(s), infill element and second surface of the back-rest element are preferably upholstered with foam padding or any equivalent material specifically for use as a bed. Thus, the bed surface of the seat assembly of the present invention may have a substantially flat surface which is oriented substantially horizontally when deployed.

It will further be appreciated that when the seat assembly is arranged in the seat configuration, with the back-rest element upright, the rear extension surface behind the seat is substantially concealed and forms a useful storage space. Conveniently, the storage space can be used for storing bedding materials which are required only when the seat assembly is converted into the bed configuration. For example, the storage space defined by the rear extension surface behind the back-rest element can be used for storing a duvet and/or a blanket and one or more pillows. Advantageously, such bedding materials may be concealed when the seat assembly is in the seat configuration, giving the cabin an overall tidy appearance. When the seat assembly is converted into the bed configuration, the back-rest element is rocked forwardly over the top of the seat-pan element to reveal the rear extension surface and to allow easy access to the bedding materials stored on the rear extension surface which can be manually deployed on the bed surface.

According to yet another embodiment of the present invention there is provided a recliner seat assembly, particularly for use on a vehicle such, for example, as an aircraft, comprising a fixed supporting portion adapted for supporting the assembly of a floor of the vehicle, a reclinable seat portion comprising a seat-pan and a back-rest and seat connecting means adapted for connecting said seat portion to said supporting portion, said connecting means including a seat reclining mechanism adapted for allowing and controlling movement of said seat portion between a first upright position and a second fully reclined position and selectively operable, bi-directional motor means adapted for driving said seat portion between said first and second position; wherein said seat reclining mechanism comprises a non-reversible linear actuator connected between said motor means and said seat portion.

Said non-reversible linear actuator may comprise a lead screw drive or a ball screw drive or any other, equivalent, non-reversible device. The use of such a non-reversible actuator for driving the seat portion between the first upright and second fully reclined positions has the advantage that unduly strong or sudden forces applied to the seat portion are not transmitted to the motor, thereby reducing the risk of damage to the motor and thus prolonging its life. For example, in the event that a heavy passenger drops suddenly into his or her seat portion, thus applying a sudden, strong force to the seat portion, that strong force is not transmitted through the non-reversible linear actuator to the motor means.

The linear actuator may comprise a linear screw or ball screw attached to one of said supporting portion (or a part connected thereto) and said seat portion and a screw-engaging device attached to the other of said seat portion and said supporting portion (or a part connected thereto). In some embodiments, the linear actuator may be connected to the seat-pan for driving the seat-pan along a predetermined linear path between a first position and a second position relative to the supporting portion.

Said seat-pan may have a front end a rear end relative to the back-rest, and the linear actuator may be pivotably connected to the seat-pan at or towards the rear end and may be arranged for driving the rear end of the seat-pan downwardly as its moves from the first position to the second position. Said seat reclining mechanism may further comprise a supporting device for supporting the front end of the seat-pan as the rear end of the seat-pan is driven downwardly, thereby causes the seat-pan to tilt rearwardly as the back-rest rocks rearwardly.

The linear actuator may alternatively or additionally be connected to the back-rest for driving the back-rest translationally between a first upright position and a second reclined position. Said seat reclining mechanism may further comprise a guiding device for rocking said back-rest progressively rearwardly relative to the supporting portion as the back-rest is moved from the first upright position to the second fully reclined position. Said guiding device may comprise a curvilinear track attached to the supporting portion or a part connected thereto and a plurality of spaced track-followers attached to the back-rest, said track-followers being adapted to engage in and slide along said track.

Advantageously, the linear actuator may be pivotably connected to the seat-pan and may be pivotably connected to the back-rest through a lost-motion device to allow relative pivoting and translational movement between the seat-pan and the back-rest in order to allow a degree of freedom of movement between the back-rest and seat-pan to allow those seat components to adopt a plurality of relative, predetermined, ergonomically comfortable positions.

In yet another embodiment of the present invention there is provided a seat having a reclinable back-rest, said seat comprising a fixed supporting portion adapted for supporting the seat off the floor, a seat portion comprising a reclinable back-rest and seat connecting means adapted for connecting said seat portion to said supporting portion, said connecting means including back-rest reclining mechanism adapted for allowing and controlling movement of the back-rest between a first upright position and a second fully reclined position; wherein said back-rest comprises a first lower back-rest member having an upper end and a second upper back-rest member that is superposed on said back-rest member and is pivotably connected at or towards the upper end thereof in such a manner as to transmit translational movement therebetween, and wherein said back-rest reclining mechanism comprises first and second elongate guide tracks attached to the supporting portion or a part connected thereto, said first track having two opposing track-ends, a plurality of first spaced track-engaging follower members attached to the first back-rest member and adapted to engage and slide in first said track and a second track-engaging follower member attached to the second back-rest member or a part connected thereto and adapted to engage and slide in said second track, said first track being curvilinear such that as the first track-engaging follower members slide along the first track from one end to the other, the back-rest member is caused to rock progressively relative to the supporting portion between the first upright position and the second fully reclined position, and said second track having a profile such that as said second track-engaging follower member is caused to slide along said second track, the second back-rest member is caused to rock progressively with respect to the first back-rest member.

Advantageously therefore, the upper and lower back-rest members may have different relative dispositions in the upright and fully reclined positions. Furthermore, the relative dispositions of the upper and lower back-rest members may be adjusted continuously between the upright and fully reclined positions. Preferably, in the first upright position, the upper and lower back-rest members are disposed substantially co-planarly to one another to form a generally flat back-rest surface. In the second fully reclined position, the upper and lower back-rest members may subtend an obtuse angle such that the lower back-rest member is inclined at a greater angle to the vertical than the upper back-rest member. The lower back-rest member may thus form a lumbar support for a person using the seat.

Said back-rest reclining mechanism may comprise a rocker lever having two arms which subtend an obtuse angle, which rocker lever is pivoted to the first back-rest member at a point intermediate said two arms, one of said arms carrying said second track-engaging follower member, and a connecting lever having two opposite ends, one of said ends being pivoted to the other arm of said rocker lever and the other end being fixedly secured to the second back-rest member; the arrangement being such that as the second follower member is caused to slide along said second track, the rocker lever is caused to rock about its pivot to the first back-rest member, thereby causing said connecting lever to pivot about its pivot to the other arm of the rocker lever, thereby causing the second back-rest member to pivot about its pivot to the first back-rest member. Said back-rest reclining mechanism may further comprise means for limiting movement of the rocker lever and/or connecting lever.

Said seat connecting means may further comprise a selectively operable bi-directional linear actuator connected between the supporting portion or a part connected thereto and said back-rest for moving the back-rest translationally relative to the supporting portion, the arrangement being such that as the back-rest is caused to move translationally relative to the supporting portion, the first follower members on the first back-rest member are caused to slide progressively along the first track, thereby causing the back-rest to rock progressively between the first upright and second fully reclined positions.

Said seat portion generally comprises a seat-pan. Said linear actuator may be connected to the seat-pan for moving said seat-pan along a predetermined linear path from between a first position and second position. Said linear actuator may be pivotably connected to the seat-pan. Advantageously, the linear actuator may be pivotably coupled to the back-rest by a lost motion device.

BRIEF DESCRIPTION OF THE DRAWINGS

Following is a description by way of example only with reference to the accompanying drawings of embodiments of the present invention.

In the drawings:

In FIG. 2, one of the seat units is shown in an upright seating configuration, another is shown in a reclined seating configuration, and the third is shown in a bed configuration.

DETAILED DESCRIPTION OF THE INVENTION

Figure 1:
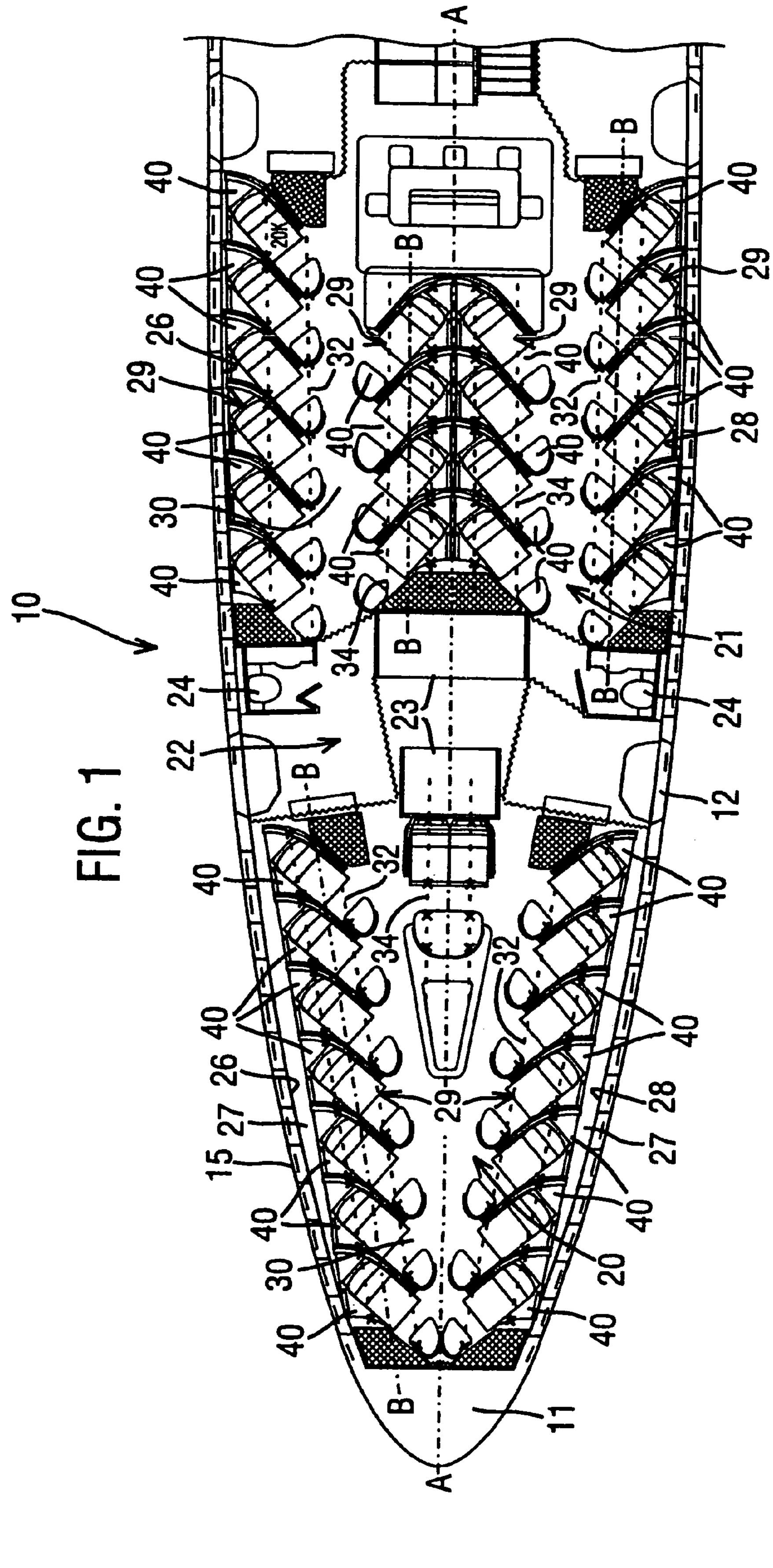
FIG. 1 is a sectional, schematic plan view of a front portion of an aircraft fuselage showing a seating system in accordance with the present invention comprising a plurality of individual seat units.

A passenger aircraft generally comprises a hollow, spindle-shaped fuselage having a front end and a rear end. A front end portion 12 of a typical aircraft fuselage 10, which is disposed towards the front end 11, is shown in FIG. 1 of the accompanying drawings, by way of example. Said fuselage 10 defines a longitudinal aircraft axis indicated by the chain-dot-line A-A in FIG. 1 between the front and rear ends, and the fuselage 10 tapers towards the front end 11 to form a nose portion 15.

The fuselage 10 accommodates many of the functions and facilities of the aircraft, including one or more passenger accommodation cabins 20, 21. The number and size of the passenger cabins 20, 21 provided on a given aircraft depends on the space available within the fuselage for passenger accommodation and on the desired configuration of the passenger accommodation. The present invention is not limited to the use of any particular shape, size or number of passenger cabins. However, in FIG. 1, which is given by way of example only, two cabins 20, 21 are shown in the front portion of the fuselage 12, a first cabin 20 being located within the nose portion 15 of the aircraft, and a second cabin 21 being disposed behind the first cabin 20, with a utilities area 22 being provided between the two cabins 20, 21. Said utilities area 22 may include a galley 23 and one or more passenger toilets 24 as shown in FIG. 1.

As shown in FIG. 1, an aircraft passenger cabin 20, 21 is generally defined by two opposing surface portions 26, 28 of the interior surface of the fuselage 10. Said opposing surface portions 26, 28, in effect, constitute opposing side walls of the cabin 20, 21. The cabin 20, 21 also comprises a floor or deck 30 which is supported by suitable infra-structure (not shown) within the fuselage and a ceiling (also not shown) that extends between the opposing side walls above the floor 30. Said opposing side walls 26, 28 are usually lined with a plurality of pre-fabricated, composite panels to give the interior of the cabin attractive appearance and to provide thermal insulation between the cabin 20, 21 and the outside of the aircraft.

Embedded within the floor 30, the infra-structure of the fuselage 10 comprises a plurality of pairs of seat tracks 32, 34 of the kind well known to those skilled in the art and indicated in FIG. 1 by dotted lines. Each seat track pair is substantially linear and comprises a pair of substantially parallel tracks for fixedly securing to the aircraft infra-structure a plurality of seats or other fixtures. Generally, an aircraft passenger cabin 20, 21 comprises two outer pairs of seat tracks 32, each being disposed adjacent a respective one of the two opposing cabin side walls 26, 28. Where space permits, a cabin 20, 21 may also include one or more central pairs of seat tracks 34 disposed intermediate the outer seat track pairs 32. As shown in FIG. 1, the first cabin 20 comprises a single central pair of seat tracks 34, whilst the second cabin 21 comprises two juxtaposed central pairs of seat tracks 34. Typically, a central seat track pair 34 extends substantially parallely to the longitudinal aircraft axis A-A. Where a passenger cabin 21 is positioned towards a central portion of the fuselage 10, away from the front and rear ends of the aircraft, such, for example, as the second cabin 21 in FIG. 1, the opposing side walls 26, 28 of the cabin 21 extend substantially parallely to the longitudinal axis A-A of the aircraft, and the outer seat track pairs 32 follow the line of the side walls 26, 28 and thus also extend substantially parallely to the longitudinal aircraft axis A-A. However, towards the nose portion 15 of the aircraft, the opposing side walls 26, 28 are arcuate and converge towards the front end 11. Accordingly, in such cases, the outer seat track pairs 32 are angled with respect to the longitudinal aircraft axis A-A to subtend an acute angle therewith.

Each cabin 20, 21 accommodates a plurality of seat units 40. As shown in FIG. 1, within each cabin 20, 21 the seat units 40 are arranged to form a plurality of columns 29 as described in more detail below. Each column 29 is fixedly secured to a respective pair of seat tracks 32, 34 and extends substantially parallely thereto to define a notional column axis indicated by the lines B-B in FIG. 1. As shown in FIG. 1, the first cabin 20 comprises two columns 29 of seat units 40, each of said columns 29 being fixedly secured to a respective one of the outer pairs of seat tracks 32. As the outer pairs of seat tracks 29 in the first cabin 20 are inclined with respective to the longitudinal axis A-A of the aircraft, the notional column axis B-B of each of the columns 29 of seat units 40 in the first cabin also subtends an acute angle with the longitudinal aircraft axis A-A. The second cabin 21 comprises two outer columns 29 of seat units 40 and two mutually juxtaposed central columns 29 of seat units 40. Each of the outer columns 29 is attached to a respective one of the outer pairs of seat tracks 32, and each of the central columns 29 is attached to a respective one of central pairs of seat tracks 34. As described above, the central pair of seat tracks 34 extends substantially parallely to the longitudinal aircraft axis A-A, and accordingly each of the central columns 29 of seat units 40 also extends substantially parallely to the longitudinal aircraft axis A-A. In the second cabin 21, each of the outer pairs of seat tracks 32 also extends substantially parallely to the longitudinal aircraft axis A-A, and accordingly each of the outer columns 29 of the second cabin 21 extends substantially parallely to the aircraft axis A-A.

Figure 1A:
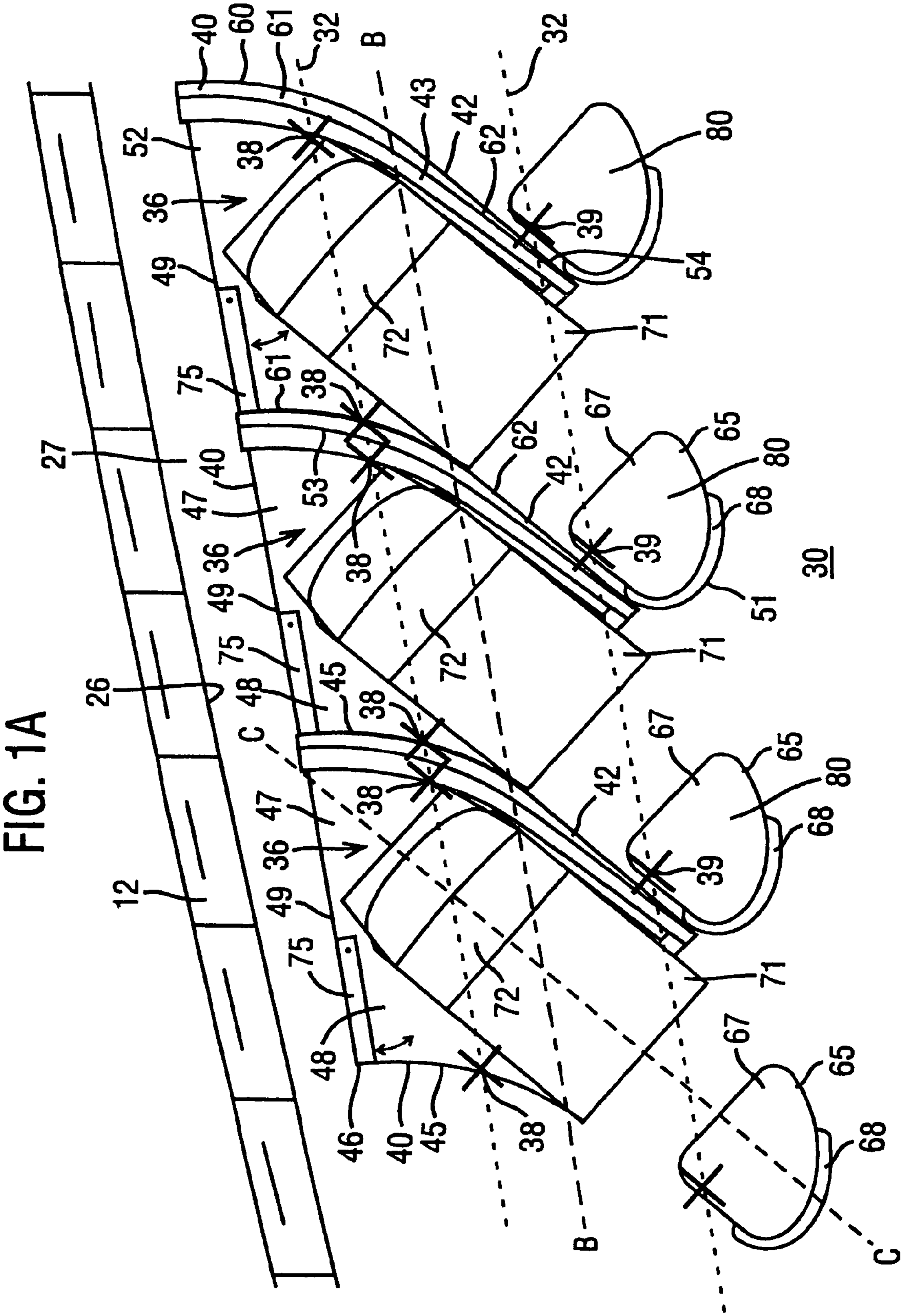
FIG. 1A is an enlarged view of part of FIG. 1 showing three adjacent seat units.
Figure 2:
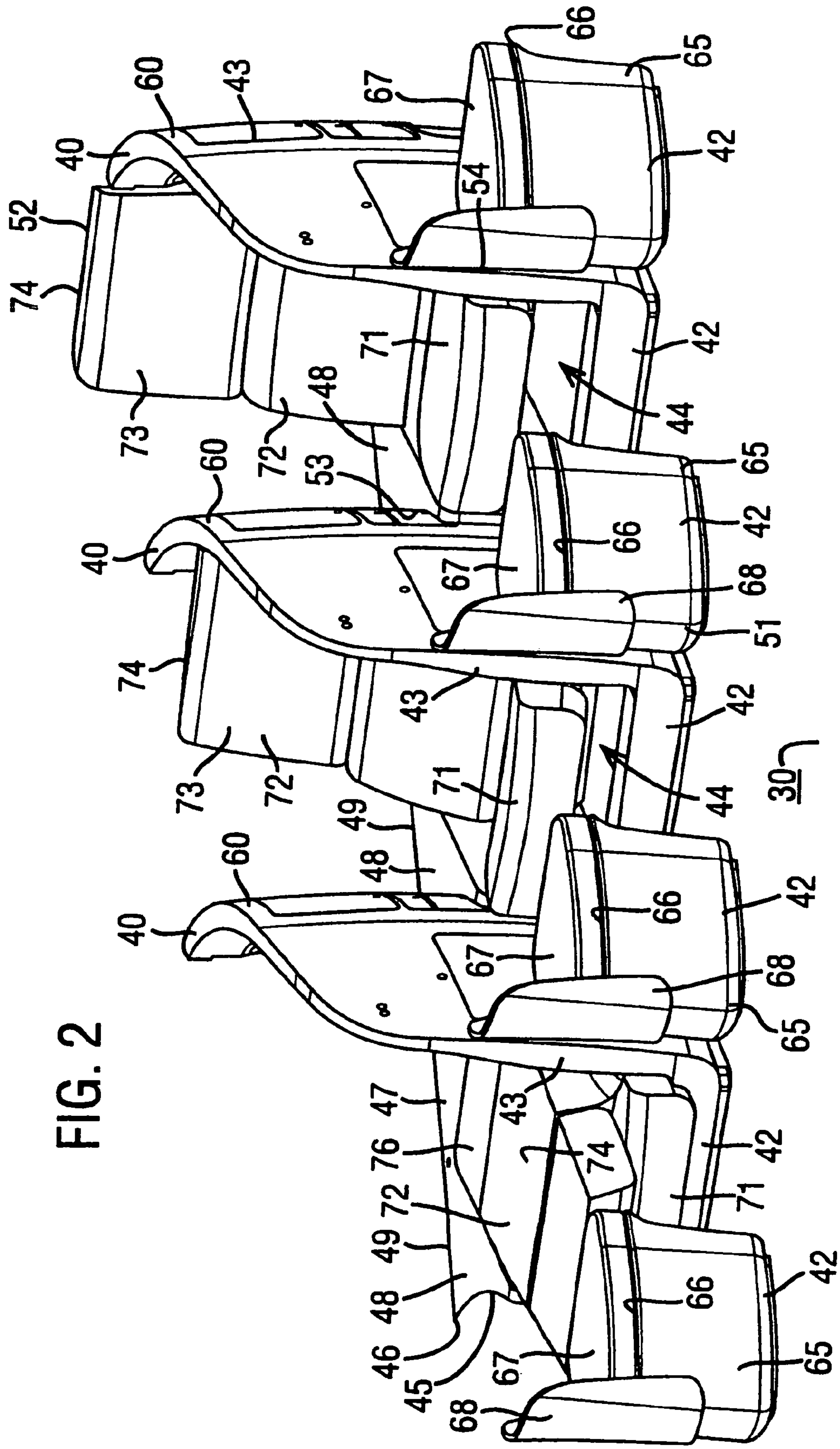
FIG. 2 is an isometric view of the three adjacent seat units of FIG. 1A.
Figure 2A:
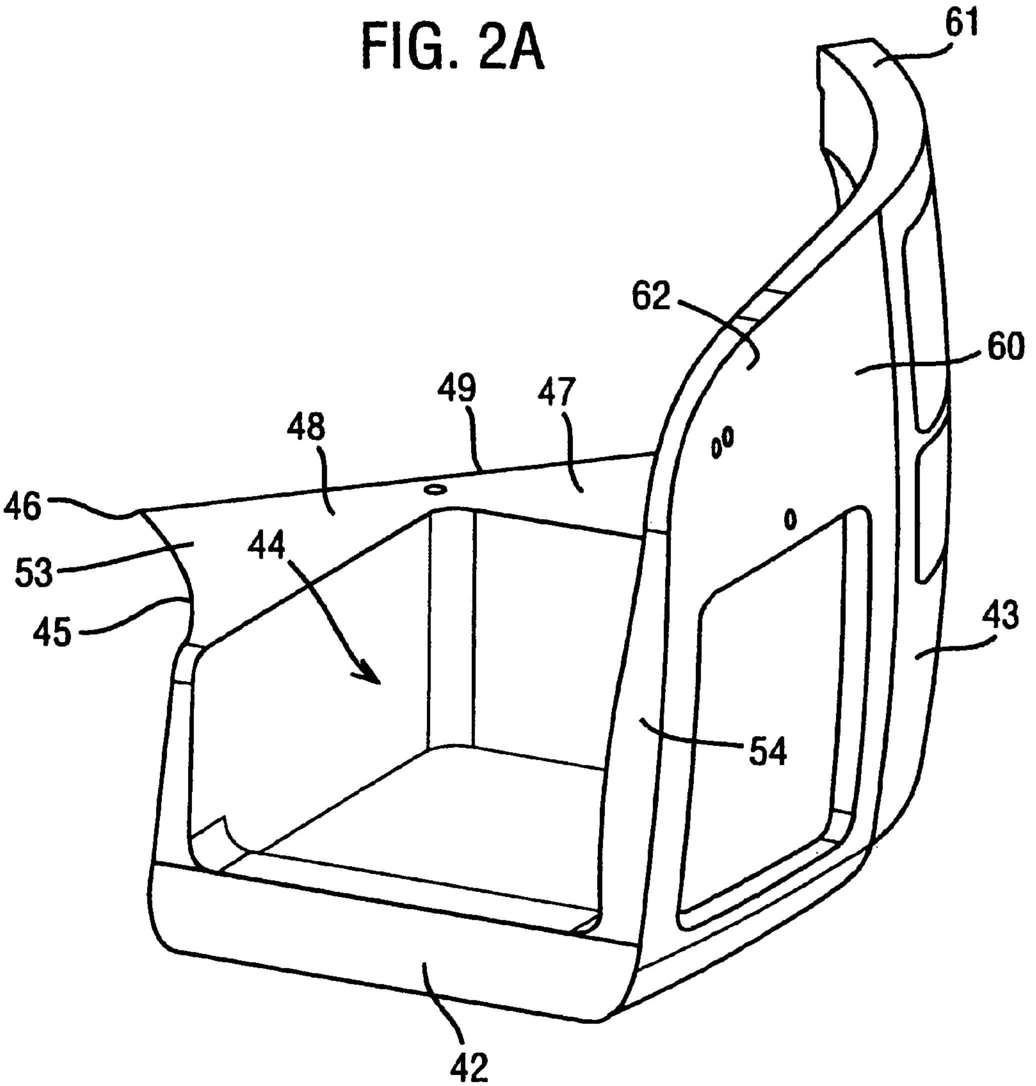
FIG. 2A shows a portion of a supporting structure of an individual seat unit of the kind shown in FIG. 2, with the movable seat elements removed.

FIGS. 1A and 2 show three adjacent seat units 40 forming part of one of the columns 29 of FIG. 1. Each seat unit 40 comprises supporting structure 42 for attaching the seat unit to the floor 30. Said supporting structure 42 may be fabricated in any suitable manner known to those skilled in the art, but preferably comprises a load-bearing, aerospace grade steel sub-frame (not shown), clad with one or more shaped composite panels. Each seat unit 40 has a front end 51, a rear end 52 and two opposing sides 53, 54. Juxtaposed the rear end 52, the supporting structure 42 comprises a seat housing 43 as shown in FIG. 2A which defines a substantially cuboidal recess 44. To the rear of said recess 44, the supporting structure 42 defines a first, substantially flat, generally triangular surface 47 which, when the seat unit 40 is installed in a cabin 20, 21, extends generally parallely to the floor 30 of the cabin 20, 21, but at a slight incline thereto, as described in more detail below. Juxtaposed a first side 53 of the seat unit 40, the supporting structure 42 defines a second substantially flat, generally triangular surface 48 which is substantially co-planar with the first surface 47 and, in some embodiments, as shown in FIGS. 2 and 2A, may be substantially contiguous with the first surface 47. Each of said first and second surfaces 47, 48 is sufficiently strong to support at least part of the weight of a passenger. Said second surface 48 has a first concave lateral edge 45 which extends from a front end of the seat housing 43 outwardly and rearwardly to a point 46 intermediate the front end of the housing 43 and the rear end 52 of the seat unit 40. Said first and second surfaces 47, 48 define a substantially linear second lateral edge 49 which extends rearwardly and inwardly from said point 46 to the rear end 52 of the seat unit. Said first and second surfaces 47, 48 thus extend to the rear and one side of the cuboidal recess 44 and define the upper extent of said recess 44. Said first and second surfaces 47, 48 are supported at a predetermined height off the floor 30 of the cabin 20, 21 by the supporting structure 42.

At the second side 54 of the seat unit 40, the seat housing 43 comprises an upstanding arcuate screen 60 having a convex rear portion 61 which extends from the rear end 52 of the seat unit 40 to a rear end of the cuboidal recess 44 and a generally linear front portion 62 which extends between the front and rear ends of the recess 44. Said rear convex portion 61 has a curvature in plan view as shown in FIG. 1A which corresponds to the curvature of the first concave lateral edge 45 of the second surface 48. Said screen 60 extends substantially higher than the first and second surfaces 47, 48 and serves as a privacy screen for a passenger using the seat unit 40, around the rear end 52 and second side 54 of the seat unit 40.

Juxtaposed the front end 51 of the seat unit 40, the supporting structure 42 comprises an ottoman which extends upwardly from the floor 30 and has a substantially flat upper surface 66. Said upper surface 66 is adapted to carry a cushion 67 having a thickness such that the cushion 67 is disposed substantially co-planarly with the first and second surfaces 47, 48. Said ottoman 65 is sufficiently strong to support the weight of a passenger such that the ottoman 67 can be used as an auxiliary seat if desired. Said supporting structure 42 further comprises a relatively small, auxiliary privacy screen 68 around the front end 51 of the seat unit 40.

Said cuboidal recess 44 receives a plurality of moveable passenger-bearing elements which are connected to the supporting structure by a seat movement mechanism described in more detail below. Said moveable passenger-bearing elements comprise a seat-pan 71 and a back-rest 72. The seat movement mechanism allows the passenger-bearing elements to be selectively configured to provide a seat for a passenger, as shown in the centre and right-hand seat units 40 of FIG. 2, or a bed as shown in the left-hand seat unit 40 of FIG. 2. In the seat configuration, the moveable passenger-bearing elements 71, 72 are selectively movable between an upright or dining position as shown in the right-hand seat unit 40 of FIG. 2 and a reclined or lounge position as shown in the centre seat unit 40 of FIG. 2.

Said moveable passenger-bearing elements 71, 72 are attached to the supporting structure 42 through the seat movement mechanism such that, in the seat configuration, the seat-pan 71 is accommodated within the cuboidal recess 44 of the housing 43, and the back-rest 72 extends upwardly from the recess 44 to the rear of the seat-pan 71 and extends transversely between the first and second sides 53, 54 of the seat unit 40. As perceived by a passenger using the seat unit 40, therefore, the seat unit 40 defines a notional longitudinal seat axis which extends between the front and rear ends 51, 52 of the seat unit 40 and is indicated in FIG. 1A by the dashed line C-C.

In the fully upright position, the seat-pan 71 is disposed substantially at the same level as the first and second surfaces 47, 48 of the housing 43 and is spaced rearwardly of the ottoman 65, such that the cushion 67 provides a foot-rest for a passenger using the seat unit 40. In the reclined position, the back-rest 72 is reclined rearwardly relative to its position in the upright position, and the seat-pan 71 is tilted slightly rearwardly to provide an ergonomically comfortable lounge seating position. Again, in the lounge position, the cushion 67 of the ottoman 65 provides a foot-rest for the passenger.

Said back-rest 72 comprises a front surface 73 and a rear surface 74. In the upright and reclined positions the front surface 73 of the back-rest cooperates with the seat-pan 71 to form the seat for the passenger. In the bed configuration, as shown in the left-hand seat unit of FIG. 2 the back-rest is rocked forwardly relative to the seat unit and is partly accommodated within the cuboidal recess 44 such that the rear surface 74 of the back-rest 72 is substantially co-planar with the first and second surfaces 47, 48 and with the cushion 67 of the ottoman 65. The rear surface 74 of the back-rest 72 is also substantially continuous with the second surface 48 and cushion 67 in the bed configuration. The seat movement mechanism includes a moveable infill element 76, as shown in FIG. 1A, which is moved from a stowed position to a deployed position when the seat is converted from the seat configuration to the bed configuration. In the bed configuration, the infill element 76 is disposed intermediate and substantially co-planarly and contiguously with the rear surface 74 of the back-rest 72 and said first surface 74. In the bed configuration, the seat unit 40 thus provides an extended bed surface for the passenger, the bed surface being extended rearwardly of the seat by the first surface 47, laterally of the seat by the second surface 48 and forwardly of the seat by the cushion 67 of the ottoman 65.

With reference to FIGS. 1 and 1A, the seat units 40 within each column 29 are attached to the respective pair of seat tracks 32, 34 such that the notional longitudinal seat axis C-C of each seat unit 40 subtends an acute angle with the notional longitudinal column axis B-B, and the seat units 40 are arranged side-by-side in longitudinally off-set relation to each other such that each seat unit 40 defines a generally triangular or trapezoidal space 36 to the rear of each seat 71,72. Said seat units 40 are arranged within the column 29 such that the convex portion 61 of the privacy screen 60 of one seat unit 40 abuts substantially contiguously on the first concave lateral edge 53 of another adjacent seat unit 40. As best seen in FIG. 1A, the space 36 to the rear of the seat 71, 72 of each seat unit 40 is thus occupied by the first surface 47 of one seat and the second surface 48 of the other adjacent seat, said first and second surfaces 47, 48 of the one and other seat units 40 respectively being divided from one another by the privacy screen 60 of the one seat unit 40. The space 36 behind each seat 71, 72 is thus used to extend the length of the bed surface 47, 48, 67, 74, 76 provided by the seat unit 40 in the bed configuration rearwardly of the seat 71, 72 into said space 36.

The acute angle at which the seat units 40 within a column 29 are oriented relative to the notional column axis B-B depends on the desired cabin layout.

However, typically, the acute angle subtended by the notional seat axis C-C of each seat unit 40 and the column axis B-B is in the range of 30° to 60°, preferably 40° to 50°, for example about 40° as shown in FIG. 1. The seat units 40 may be oriented to face inwardly or outwardly with respect to the cabin 20, 21. In the first cabin 20 of FIG. 1, it can be seen that each of the outer columns 29 is disposed adjacent a respective of one of the opposing side walls 26, 28, and the seat units 40 within each column 29 face inwardly. The second lateral edges 49 of the seat units 40 in each column 29 are substantially co-linear to form an elongate column outer edge which extends juxtaposed the side wall 26, 28 of the cabin 20. As a result of the curvature of the side walls 26, 28 in the first cabin 20, there is a small gap 27 between the outer column edge and each side wall 26, 28, and usually the gap 27 is filled using suitable infill panels of the kind well known to those skilled in the art.

In the second cabin 21, the seat units 40 of each outer column 29 also face inwardly and forwardly relative to the cabin 21. It will be seen from FIG. 1 that as the side walls 26, 28 of the second cabin 21 are substantially less curved than the side walls 26, 28 of the first cabin 20, the second edges 49 of the seat units 40 are disposed closer to the sidewalls 26, 28 than in the first cabin 20 and thus there are no or substantially no gaps between the outer column edges of the seat units and the opposing cabin side walls 26, 28. The seat units 40 of the two central columns 29 of the second cabin 21 also face forwardly, but are oriented to face outwardly with respect to the cabin 21. The two central columns 29 are arranged back-to-back such that the second linear edge 49 of each seat unit 40 in one central column 29 is disposed substantially contiguous a corresponding second linear edge 49 of another seat unit 40 in the other central column 29. As with the columns 29 of the first cabin 20, however, the seat units 40 of the columns 29 of the second cabin 21 are arranged such that to the rear of each seat 71, 72, the seat unit 40 defines a generally triangular or trapezoidal space 36 which is occupied by the first surface 47 of one seat unit 40 and the second surface 48 of another adjacent seat unit 40.

A privacy screen may be provided between the two central columns 29 said screen may comprise a movable portion member intermediate each pair of corresponding seats 40 in the two central columns 29, said position member being selectively movable automatically between a deployed position, in which said position member effectively forms a privacy shield between the two seats 40 of the pair, and a stowed and retracted position, in which the position member is removed, such that passengers using the two corresponding seats do not have any boundaries between them in either the bed mode or the seat mode.

It has been found that the seating system in accordance with the present invention allows each seat unit 40, in the bed configuration, to provide a bed surface for a passenger having a length of at least 80 inches (2.032 meters) with a pitch between adjacent seat units 40 within each column 29 of 50 to 60 inches (1.27 to 1.52 meters). In some cases, it is possible to provide an overall bed length in the bed configuration in excess of 85 inches (2.16 meters) with such a pitch.

It will be appreciated that when the movable passenger-bearing elements 71, 72 of a seat unit 40 in accordance with the present invention are disposed in a dining or lounge seat configuration as shown in FIG. 2, the space 36 to the rear of the seat 71, 72 is concealed by the upright or reclined back-rest 72. The space 36 thus provides a useful storage space which, in particular, can be used for storing bedding materials such as pillows, blankets, duvets and the like when the seat unit 40 is being used as a seat. Such bedding materials can be stored within the space 36 behind the seat 71, 72 such that the bedding materials are supported by the first surface 47 to the rear of the seat 71, 72. When a passenger wishes to go to sleep, the moveable passenger-bearing elements 71, 72, 76 can be selectively moved to the bed configuration as shown in FIG. 2, thus exposing the space 36 to the rear of the seat 71, 72 allowing easy access to bedding materials stowed therein. With the moveable seat elements 71, 72, 76 in the bed configuration, the extended bed surface provided by the seat unit 40 can be manually made-up with the bedding materials by a passenger or flight attendant to provide a fully made bed for the passenger.

In the seat configuration, a first passenger using the seat unit can sit on the seat formed by the seat-pan 71 and back-rest 72, and a second passenger who might wish to visit the first passenger can sit on the auxiliary seat provided by the ottoman 65.

As shown in FIG. 1A, the second surface 48 of the seat unit 40 carries a hinged arm rest 75 which is hinged to the supporting structure 42 for swinging movement in the plane of the second surface 48 between a stowed position as shown in FIG. 1A in which the arm rest 75 extends substantially parallely to the second linear edge 49 and a deployed position (not shown) in which the arm rest 75 extends substantially parallely to the notional seat axis C-C between the front and rear ends of the cuboidal recess 44 juxtaposed the seat formed by the seat-pan 71 and back-rest 72, so that a passenger using the seat may rest one of his or her arms on the arm rest 75. Alternatively, the arm rest 75 may be stored within a recess (not shown) formed in said surface 48 and means may be provided for translationally moving the arm-rest vertically between a stored position, in which said arm rest is accommodated within said recess, flush with said head surface 48, and a deployed position in which said arm-rest protrudes from the recess to provide an arm rest for an occupant of the seat. This alternative has the advantage that in the stored position, the arm-rest does not impinge on the available surface area provided by the head surface 48. Another fixed arm rest (not shown) may be carried by the screen 60.

The seating system in accordance with the present invention thus comprises a plurality of self-contained seat units 40 which each provide individual seating and sleeping accommodation for a passenger. Within each column 29, it will be seen that the screen 60 to the second side 54 of one seat unit 40 and the screen 60 of another adjacent seat unit 40 disposed juxtaposed the first side 53 of the one seat unit 40 define a partially enclosed, private space for a passenger using the one seat unit 40.

Each seat unit 40 in accordance with the present invention comprises a seat housing 43 and an ottoman 65, which ottoman 65 is spaced forwardly of the seat housing 43. However, the seat units 40 of the present invention as described above may be conveniently manufactured by integrating the seat housing 43 of one seat unit 40 with the ottoman 65 of another adjacent seat unit 40. Thus, the supporting structure 42 forming the seat housing 43 of the one seat unit 40 may be integral with the supporting structure 42 forming the ottoman 65 of the other adjacent seat unit 40. Thus, the seating system in accordance with the present invention may be constituted by a plurality of seat modules 80 as shown in FIG. 1A, each module 80 comprising the seat housing 43 and moveable seat elements 71, 72, 76 of one seat unit 40 and the ottoman 65 of another adjacent seat unit 40. By attaching a plurality of said seat modules 80 to a pair of seat tracks 32, 34 in a cabin 20, 21, a plurality of seat units 40 can be assembled, each unit 40 comprising the seat housing 43 of one module and the ottoman 65 of another adjacent module 80.

Each seat module 80 is attached to a seat track pair 32, 34 at three points as shown in FIGS. 1 and 1A. In particular, each seat module 80 is attached to one seat track of the pair 32, 34 at two spaced points 38 and to the other seat track of the pair 32, 34 at a single point 39. Each seat module 80, may be attached directly to the seat track pair 32, 34 or, alternatively, the supporting structure 42 of each module 80 may comprise a plinth or palette (not shown), which plinth or palette is attached to the seat tracks 32, 34. In either case, the supporting structure 42 or plinth or palette is attached to the seat tracks 32, 34 using foot fixings of the kind well known to those skilled in the art. The use of a three-point fixing 38, 39 for attaching a seat module 80 to a seat track pair 32, 34 has been found to be advantageous over a conventional four-point fixing. In particular, it has been found that a three-point fixing allows a greater degree of flexibility between the two seat tracks of a pair 32, 34, thus allowing the two seat tracks to move or flex relative to one another in the event of an emergency landing or crash with a reduced risk of the seat modules 80 becoming detached from the seat tracks 32, 34.

The configuration of each seat unit 40, and the arrangement of the seat units 40 within a cabin in accordance with the present invention, allows the occupant of each seat unit 40 easily to gain access to the seat unit 40 from the aisle and vice versa.

Figure 3:
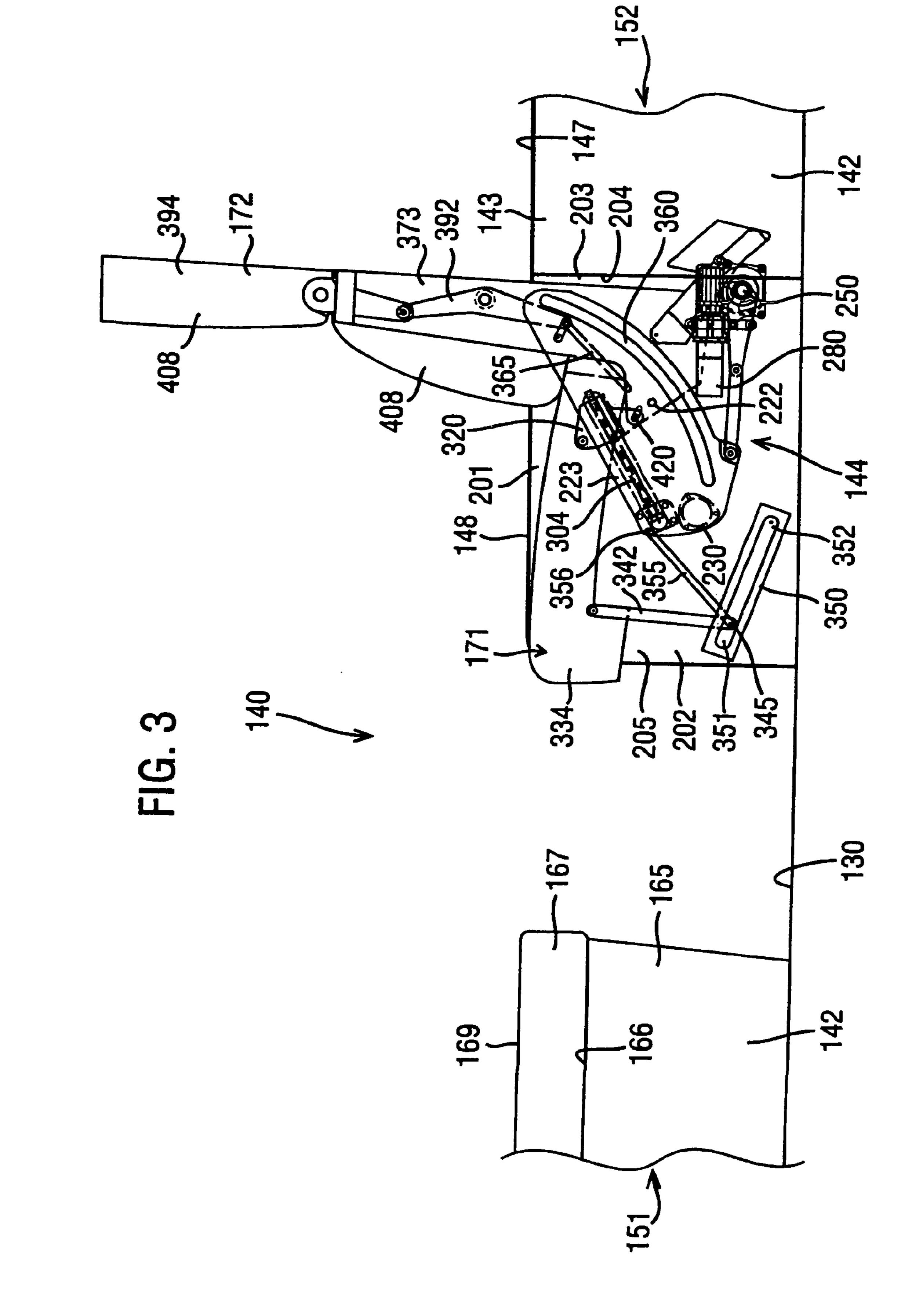
FIG. 3 is a schematic side elevation of a first passenger seat assembly for a vehicle in accordance with the present invention, shown in an upright seating configuration.
Figure 4:
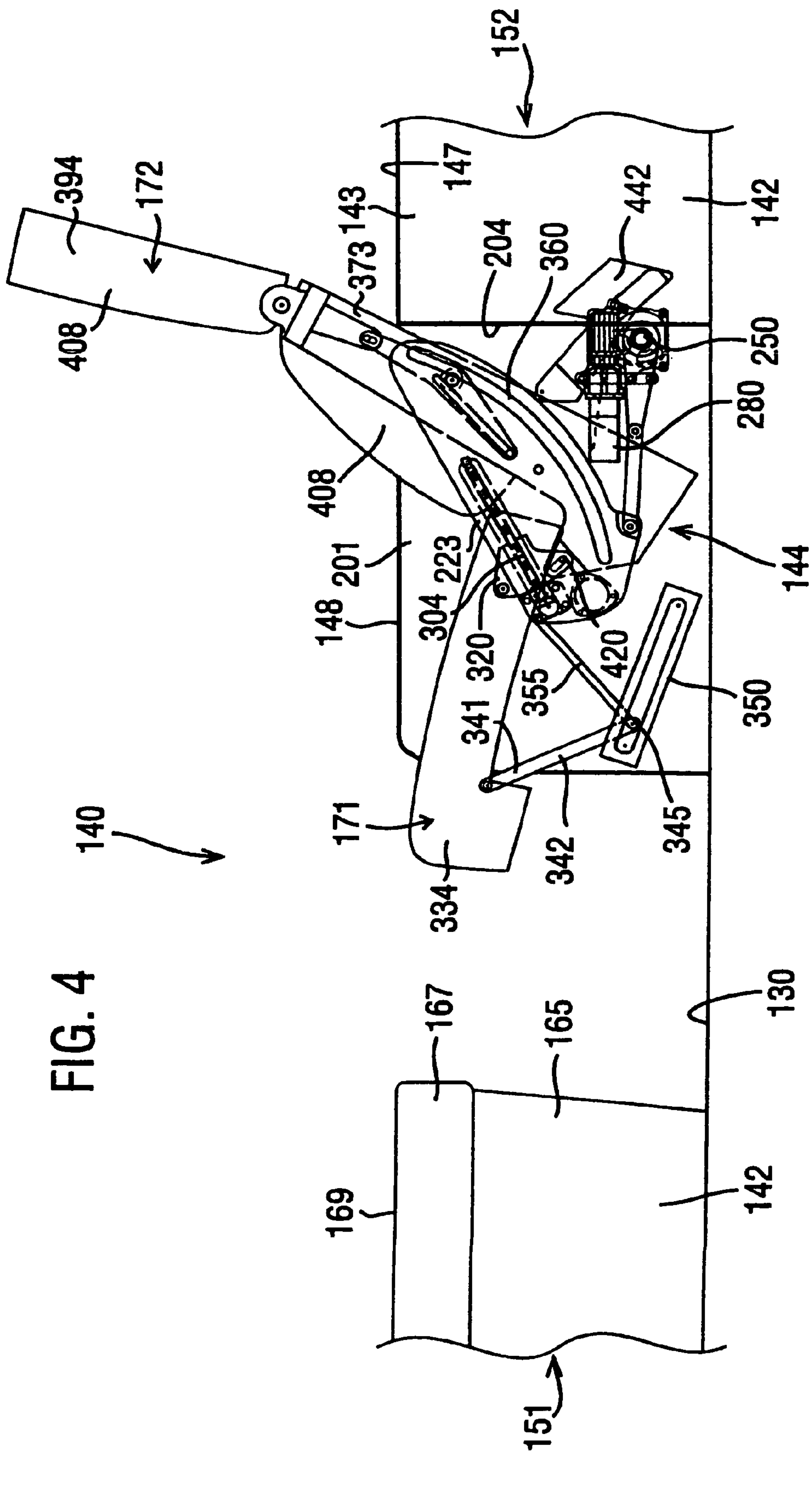
FIG. 4 is another schematic side elevation of the first passenger seat assembly of FIG. 3, shown in a fully reclined seating configuration.
Figure 5:
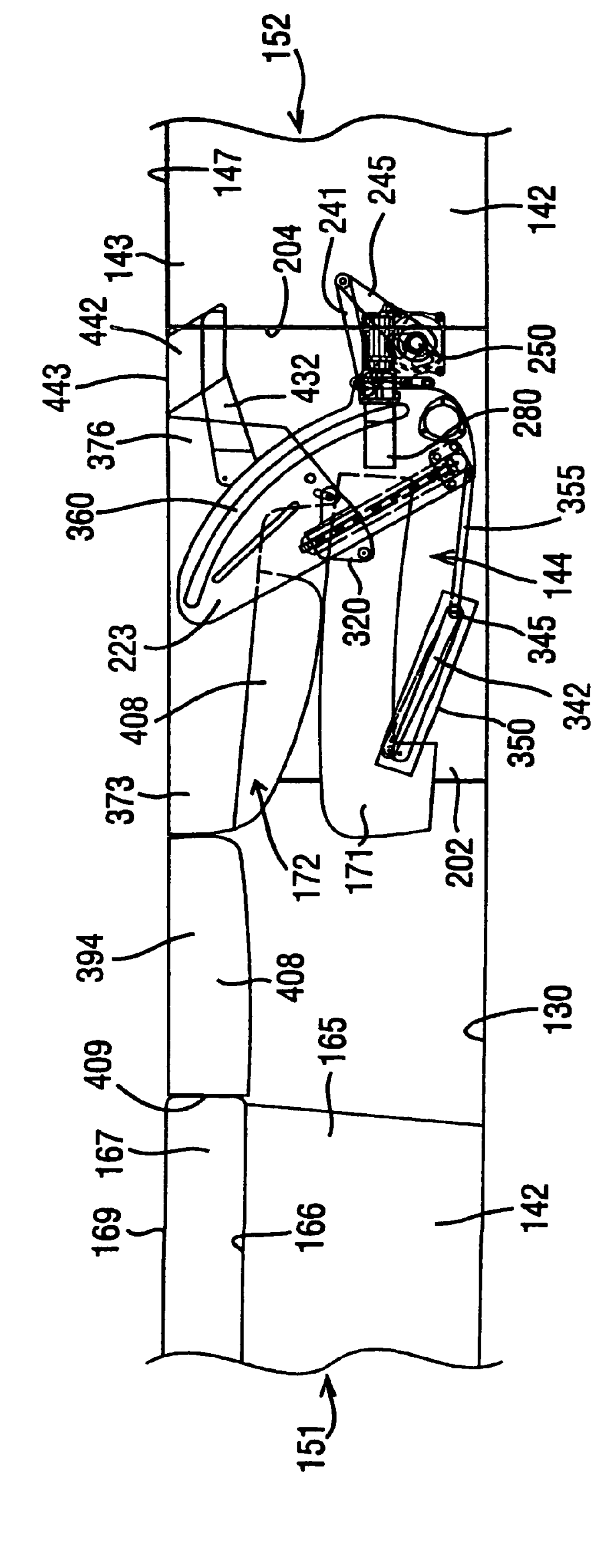
FIG. 5 is yet another schematic side elevation of the first seat assembly of FIGS. 3 and 4, shown in a bed configuration.

A first passenger seat assembly in accordance with the present invention is shown in FIGS. 3 to 5. Said first passenger seat assembly can suitably be used to form a seat unit 40 of the seating system described above with reference to FIGS. 1, 1A, 2 and 2A. However, those skilled in the art will appreciate that the seating system in accordance with the present invention is not limited to the use of the seat assembly of FIGS. 3 to 5. Generally the seating system described above can comprise any seat unit 40 which defines a notional, longitudinal seat axis C-C and comprises a supporting structure 42 for supporting the seat unit off the floor 30 of a vehicle, means 71, 72 forming or being configurable for forming a seat comprising a seat-pan 71 and a back-rest 72 and means 47, 48, 67, 74, 76, forming or being configurable for forming a substantially flat bed, a major proportion of which bed is disposed forwardly of the position of the seat, which bed extends rearwardly behind the seat for extending the flat bed.

In FIGS. 3 to 5, parts of the first passenger seat assembly which correspond to parts of the seat unit 40 of FIGS. 1, 1A, 2 and 2A are indicated by the same reference numerals, with the addition of a preceding numeral "1".

The first passenger seat assembly 140 in accordance with the present invention has a front end 151, a rear end 152 and two opposing sides 153, 154. The seat assembly 140 comprises a supporting structure 142 for fixedly securing the seat assembly 140 to seat tracks embedded in the floor 130 of a vehicle and for supporting the seat assembly 140 off the floor 130. Any suitable foot fixings of the kind known to those skilled in the art can be used for securing the supporting structure 142 to a pair of seat tracks. Whilst the first passenger seat assembly 140 of FIGS. 3 to 5 is particularly suitable for use on a passenger aircraft, it can also be suitably used on other forms of passenger vehicles such, for example, as trains, coaches and water-borne craft, including passenger ships and ferries and hovercraft.

Said supporting structure 142 comprises a seat housing 143 disposed generally towards the rear end 152 of the assembly 140 and an ottoman unit 165 disposed generally towards the front end 151 of the assembly 140. Said seat housing 143 defines a generally rectilinear or cuboidal recess 144 which is open at its upper end 201 and front end 202 and closed at its rear end 203 by a substantially vertically extending rear wall 204 and at each side by two spaced opposing, substantially vertically extending side walls 205, 206. In FIGS. 3 to 5, only one of the sidewalls 205 is visible. To the rear of the recess 144, the seat housing 143 defines a substantially flat first upper surface 147, and intermediate one side of the recess 144 and one side 153 of the assembly, the housing 143 further defines a substantially flat second upper surface 148 which is substantially coplanar, and may also be substantially continuous, with the first surface 147. Said first and second upper surfaces 147, 148 are sufficiently strong to support at least part of the weight of a passenger using the seat assembly 140.

Said ottoman unit 165 is spaced forwardly of the seat housing 143 and has a substantially flat upper surface 166 which carries a cushion 167 having a flat upper surface 169 which is substantially coplanar with the first and second upper surfaces 147, 148 of the seat housing 143. Said ottoman unit 165 is also sufficiently strong to support the weight of a passenger and can be used as an auxiliary seat.

Figure 6:
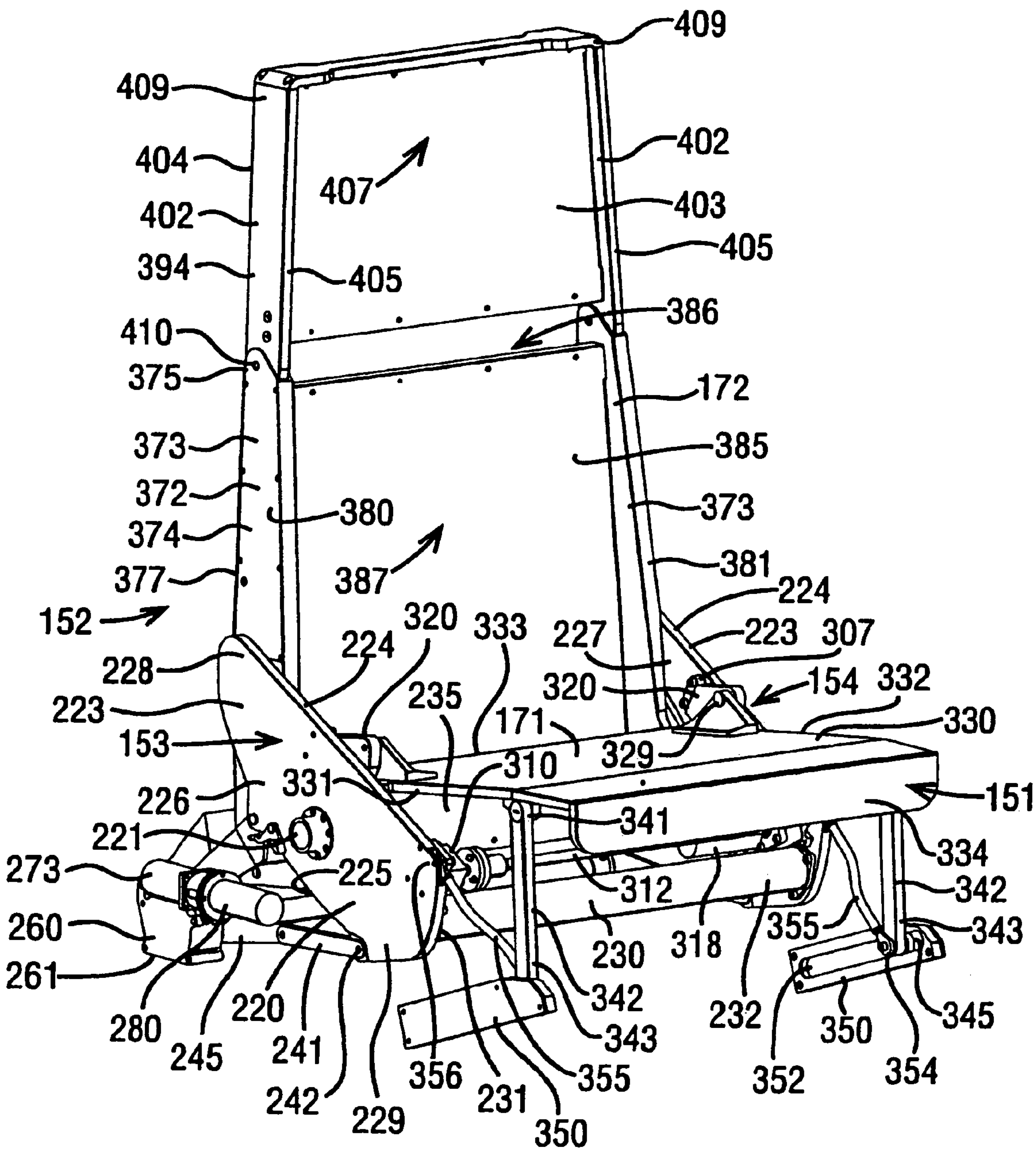
FIG. 6 is an isometric view of part of the first seat assembly of FIGS. 3 to 5 in the upright seating configuration, with the seat upholstery removed.
Figure 7:
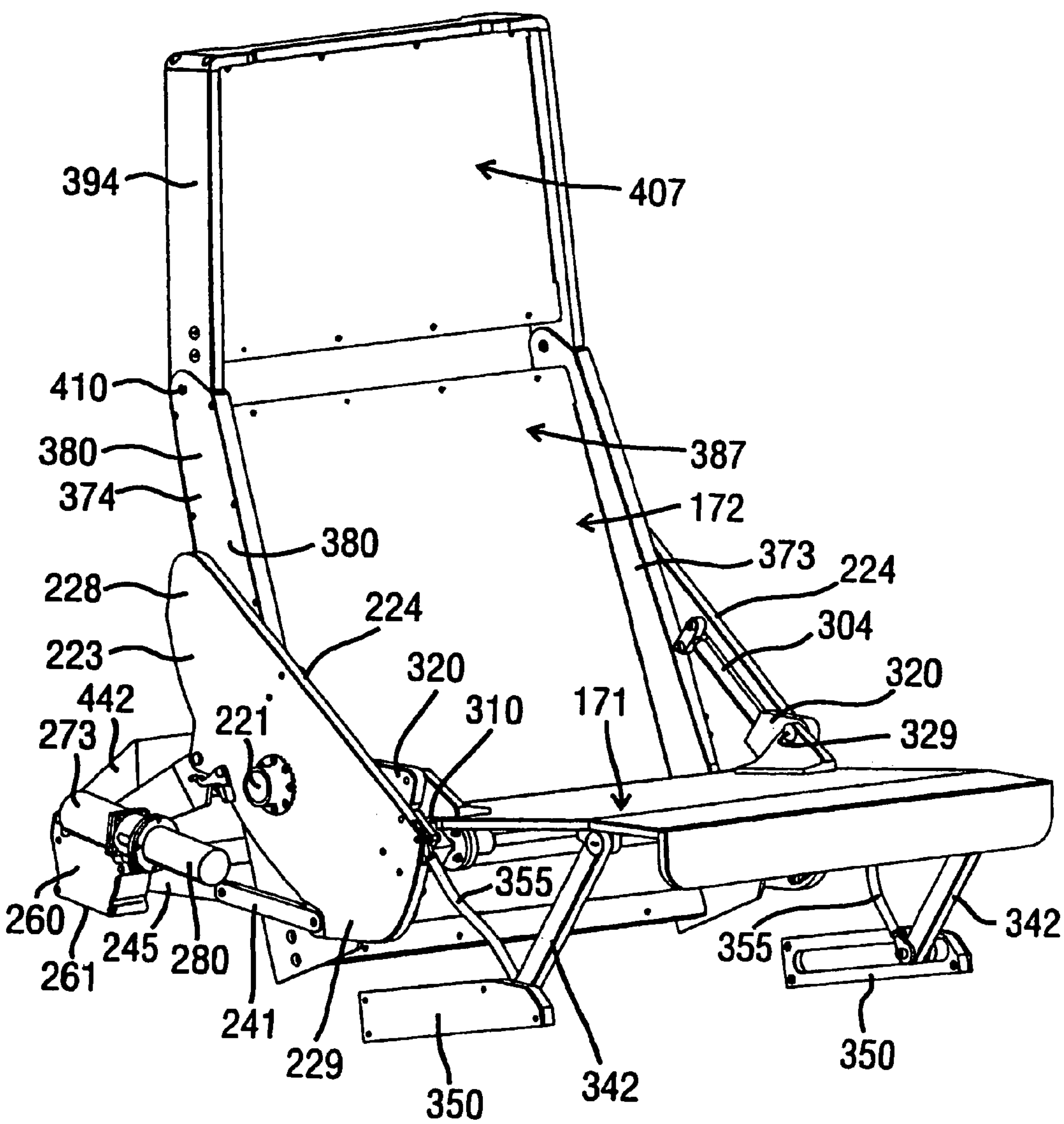
FIG. 7 is another isometric view of the part of the first seat assembly shown in FIG. 6, with the seat assembly in the fully reclined seating configuration.
Figure 8:
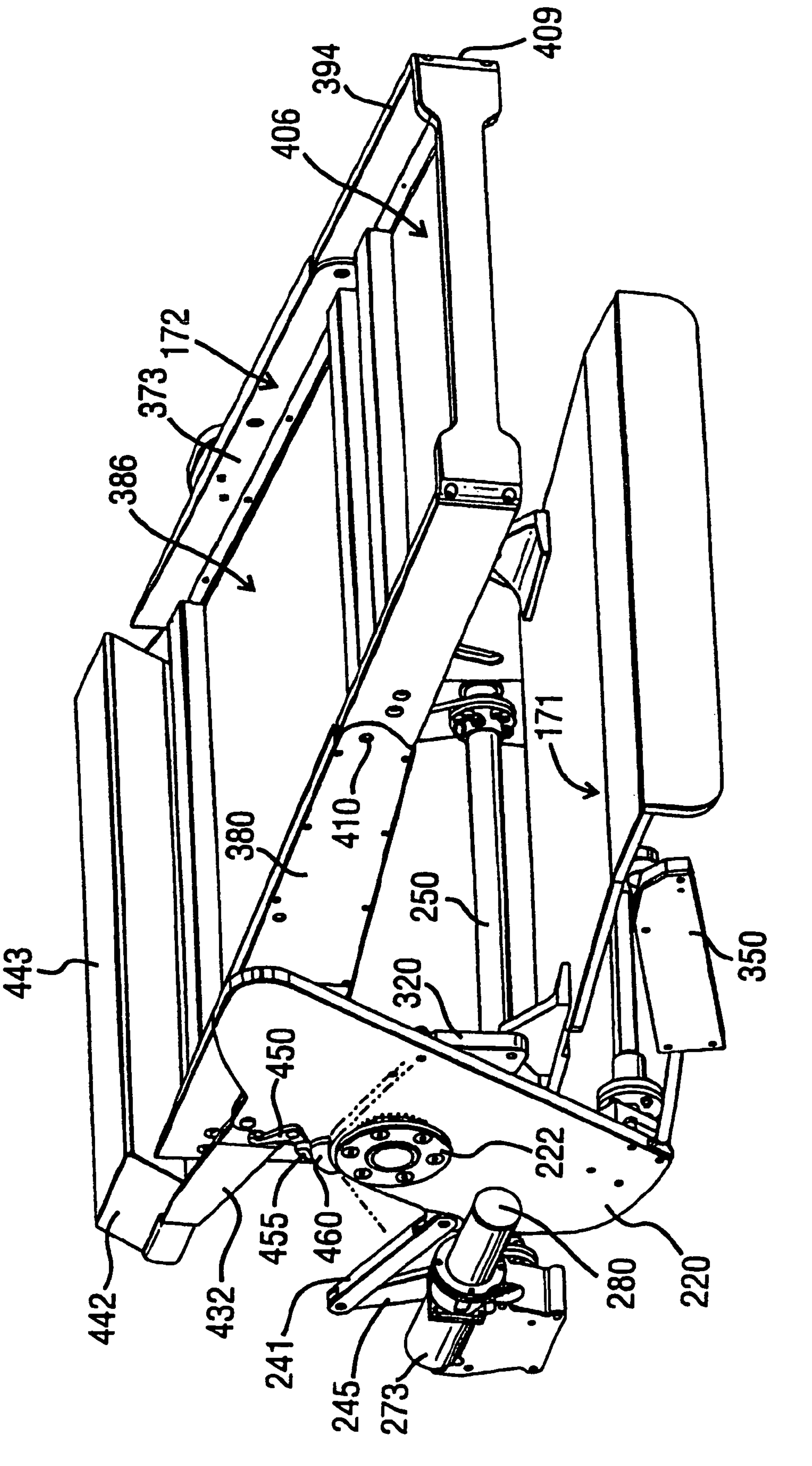
FIG. 8 is yet another isometric view of the part of the first seat assembly of FIGS. 6 and 7, with the seat assembly in the bed configuration.

Each of said side walls 205, 206 of the recess 144 carries a rotary bearing 222. Said rotary bearings 222 are aligned with one another to define a transverse axis which extends transversely across said recess 144 generally parallely to the floor surface 130, but at a slight incline thereto as described in more detail below. Said rotary bearings 222 are disposed at a height above the floor surface 130 approximately mid-way between the floor surface 130 and the first and second upper surfaces 147, 148. Said rotary bearings 222 are also positioned generally rearwardly within the recess 144 towards the rear wall 204. Each of said rotary bearings 222 receives a respective, laterally-extending trunnion 221 of a seat movement mechanism 220 as shown in FIGS. 6 to 8 in which the supporting structure 142 is omitted for clarity.

Figure 9:
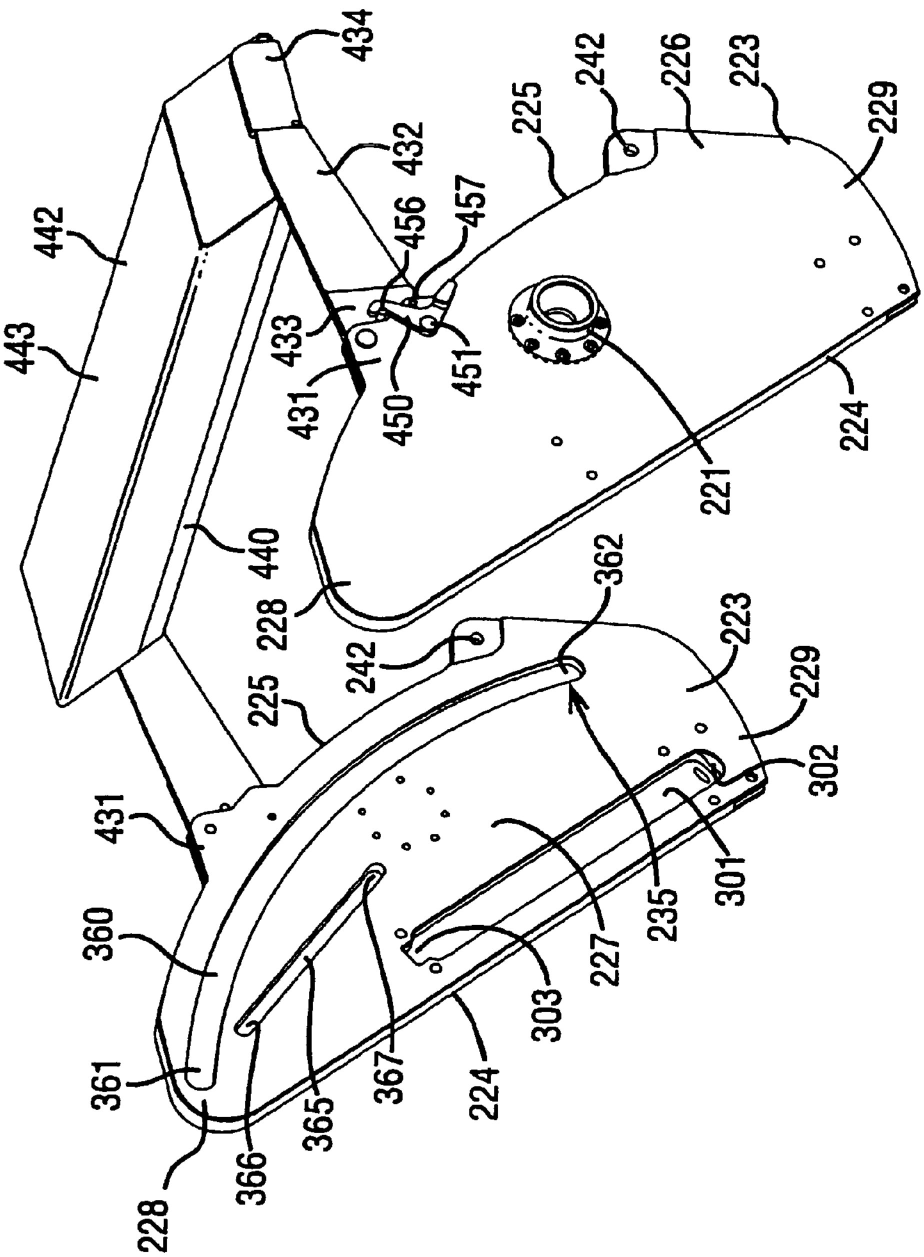
FIG. 9 is an isometric view of part of a seat movement mechanism of the first seat assembly of FIGS. 3 to 8, shown in the bed configuration.
Figure 10:
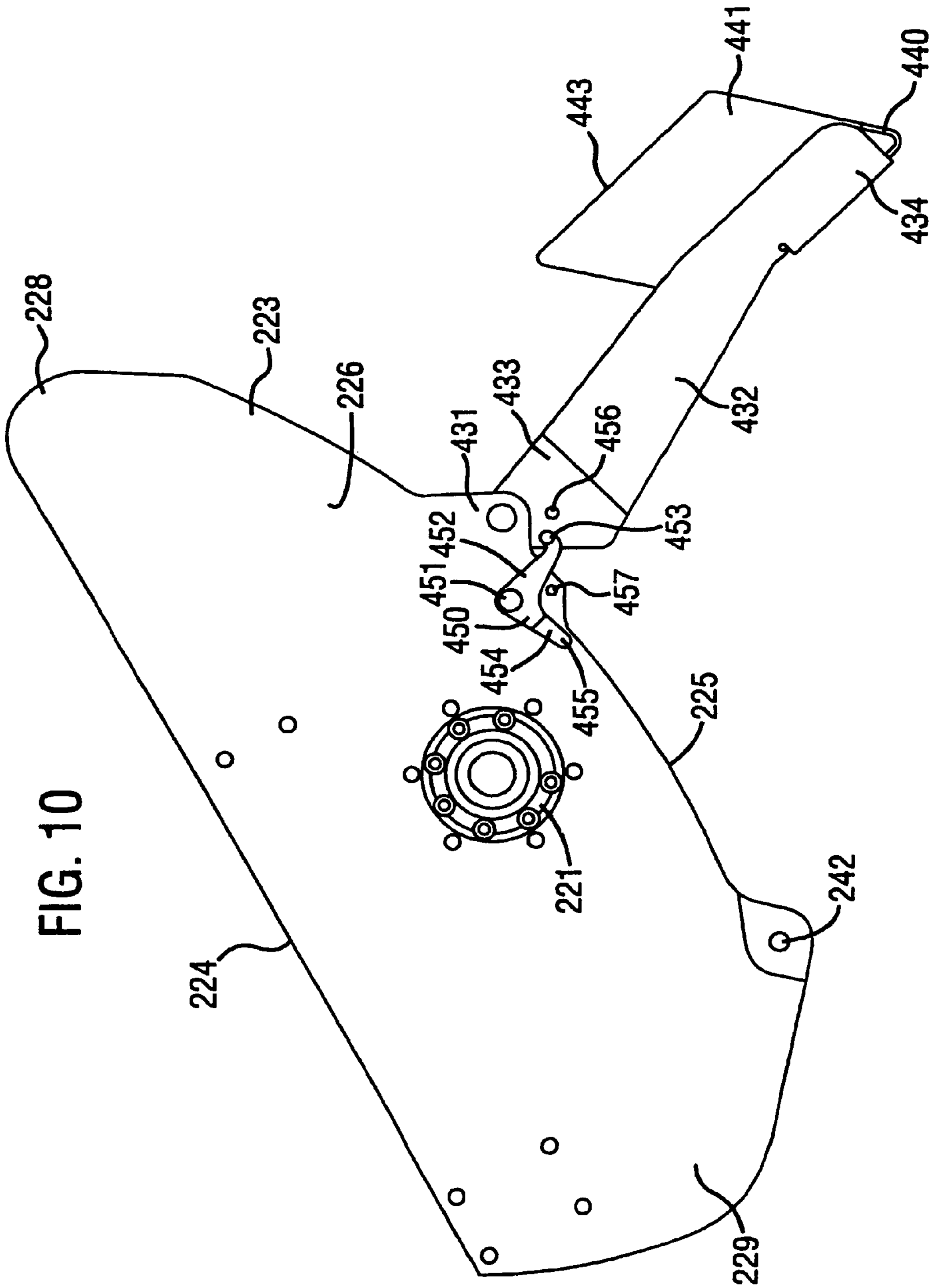
FIG. 10 is a side elevation of the part of the seat movement mechanism of FIG. 9, shown in the seating configuration.
Figure 11:
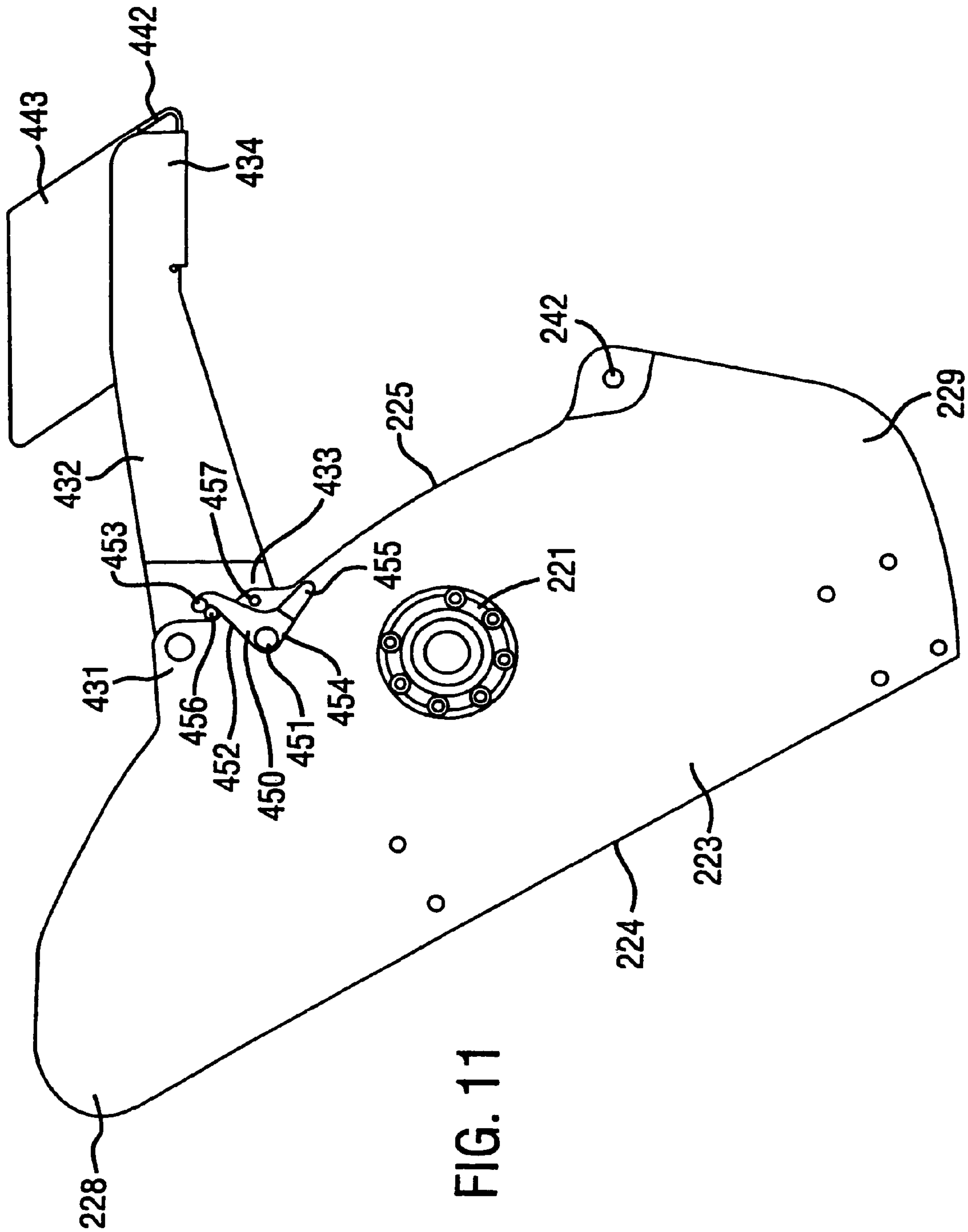
FIG. 11 is another side elevation of the part of the seat movement mechanism of FIGS. 9 and 10, shown in the bed configuration.
Figure 12:
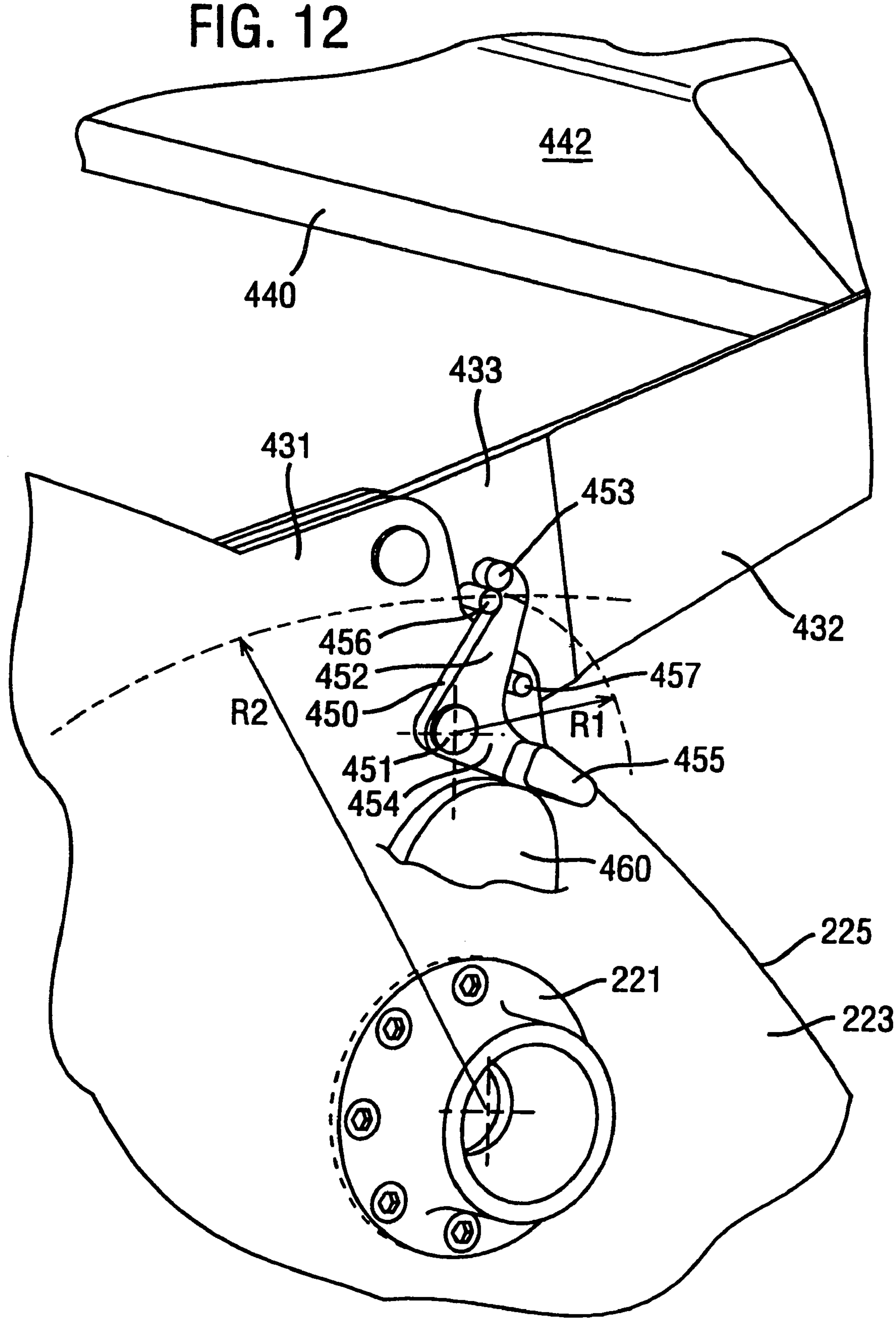
FIG. 12 is an enlarged isometric view of part of the seat movement mechanism of FIGS. 9 to 11.

Each trunnion 221 is attached generally centrally to a substantially flat, outwardly-facing surface 226 of a respective, generally lenticular rocker plate 223. Each rocker plate 223 has a substantially linear first edge 224 and an opposing arcuate second edge 225. FIGS. 9 to 11 comprise detailed views of the rocker plates 223. Each rocker plate has an upper end 228 and lower end 229, and the two rocker plates 223 are fastened together by means of a generally cylindrical, transversely extending first torque tube 230 having two opposing ends 231, 232. Each end 231, 231 of the torque tube 230 is connected to an inner face 227 of a respective one of the rocker plates 223 juxtaposed the lower end 229. The first torque tube 230 thus serves to unite the two rocker plates 223 which define a recess 235 intermediate their respective opposing inner faces 227. The united rocker plates 223 are thus capable of rocking movement relative to the seat housing 143 about the trunnions 221 connected to the rotary bearings 222.

Figure 14:
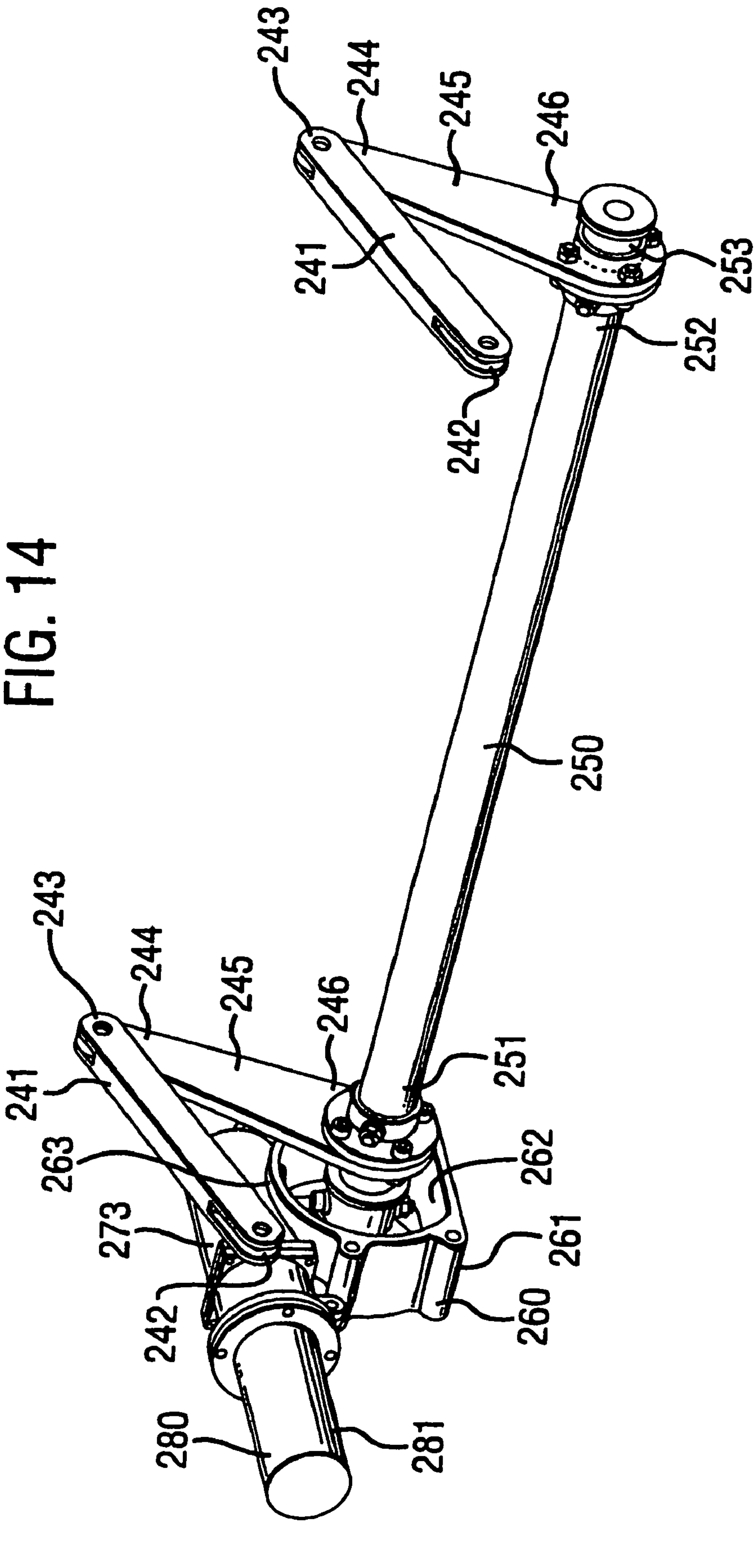
FIG. 14 is an isometric view of part of a seat conversion sub-mechanism of the first seat assembly of FIGS. 3 to 8, shown in the bed configuration.
Figure 15:
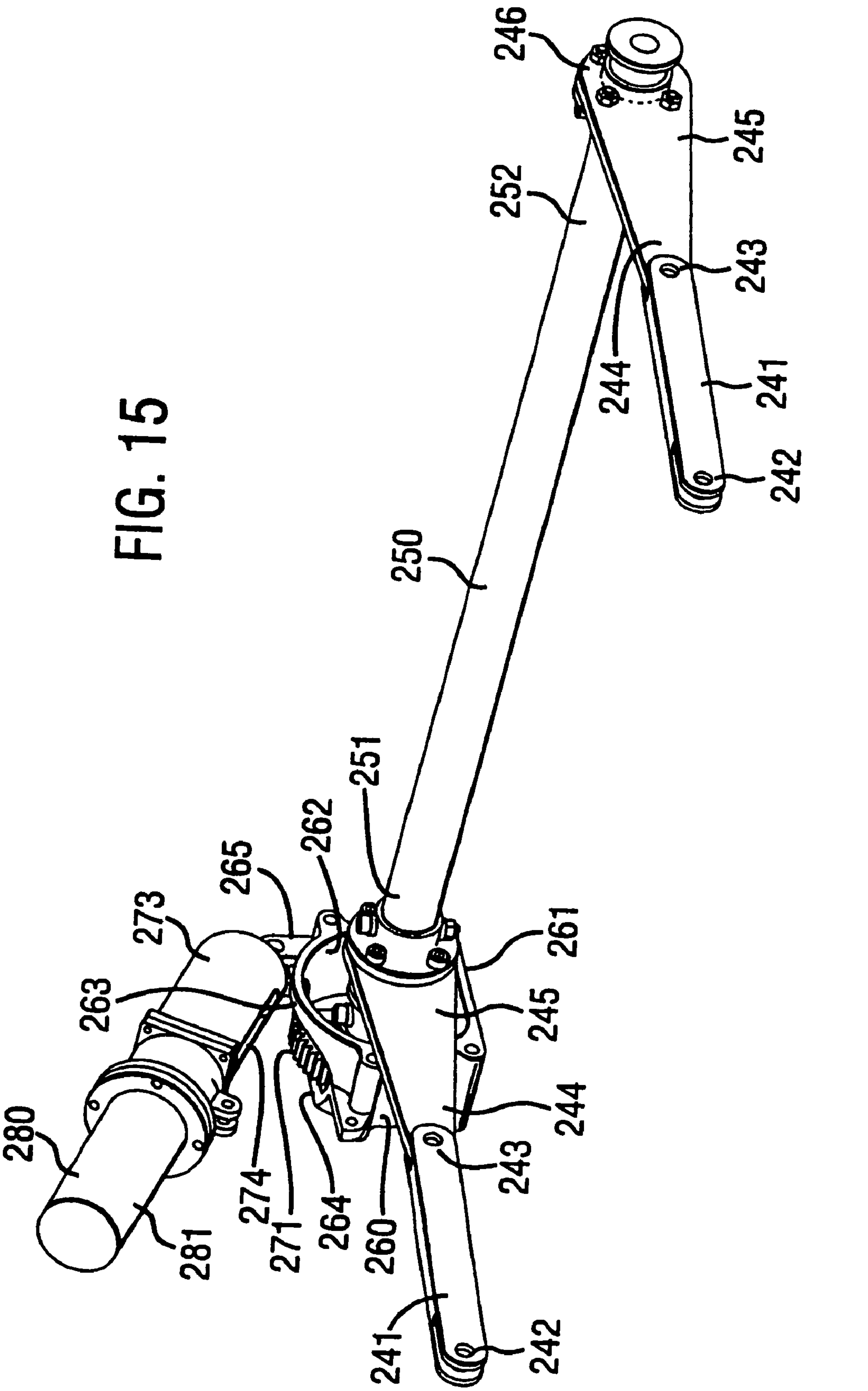
FIG. 15 is another isometric view of the part of the seat conversion sub-mechanism of FIG. 14, shown in the seat configuration with a worm-screw removed from a corresponding worm-gear to allow manual movement of the seat conversion sub-mechanism between the seat and bed configurations.

The arcuate edge 225 of each rocker plate 223 is pivotably connected towards its lower end 229 to one end 242 of a link 241 through a suitable pin joint. The other end 243 of the link 241 is pivotably connected to one end 244 of a rocker arm 245. As shown in FIGS. 14 and 15, the other end 246 of the rocker arm 245 is fixedly secured juxtaposed a respective end 251, 252 of a second rotatable torque tube 250. At one end 251, the second torque tube 250 is rotatably supported within a hollow worm-gear casing 260. At the other end 252, the second torque tube 250 is rotatably mounted in a bearing 253 supported by the second side wall 206 of the recess 144.

Said worm-gear casing 260 has a substantially flat bottom surface 261 and defines a generally cylindrical interior cavity 262 which accommodates the bearing for the one end 251 of the second torque tube 250. Said one end 251 of the second torque tube 250 is fixedly secured coaxially to a worm-gear 271 which is accommodated within said cavity 262. The casing 260 has an upper wall 263 which is partially cut-away as shown at 264 to expose the teeth of the worm-gear 271. Said casing 260 is fixedly secured to the supporting structure 142 of the first seat assembly 140 within a recess (not shown) within the first side wall 205, beneath the second upper surface 148 at the rear of said recess 144, juxtaposed the rear wall 204.

Figure 16:
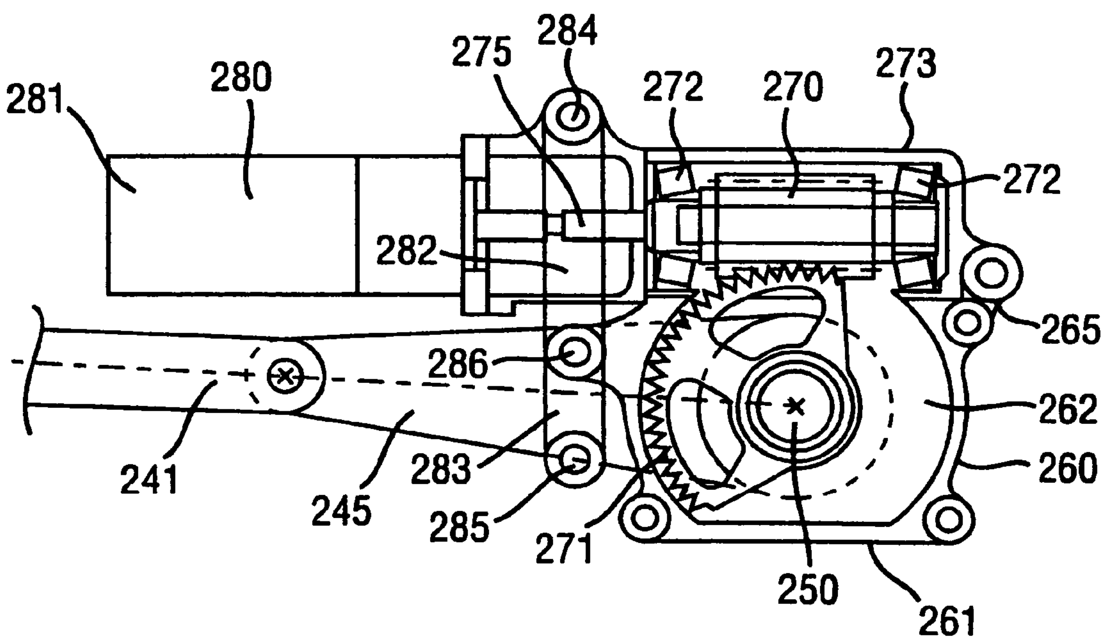
FIG. 16 is an enlarged, sectional side elevation of part of the seat conversion sub-mechanism of FIGS. 14 and 15.

The upper wall 263 of said casing 260 is formed with a generally upwardly extending lug 265, and a generally cylindrical worm-screw housing 273 is hinged to said lug 265 for movement between an engaged position as shown in FIG. 14 and disengaged position as shown in FIG. 15. Said worm-screw housing 273 is shaped such that in the engaged position, the housing 273 mates with the upper wall 263 of the worm-gear casing 260. As shown in FIG. 15, the worm-screw housing 273 is cut-away as shown at 274 to allow the teeth of the worm-gear 271 to extend into the interior of the worm-screw housing 273. As shown in FIG. 16, the worm-screw housing 273 accommodates a worm-screw 270 which is rotatably mounted between two opposing thrust-bearings 272. Said worm-screw 270 is rotatably coupled via a coaxial spindle 275 to an electric motor 280 having a motor housing 281 which is fixedly secured to the worm-screw housing 273. As shown in FIG. 16, the motor housing 281 is connected to the worm-gear casing 260 through two links 282, 283 which form a "break-link" device. One of said links 282 is pivotted to the motor housing 281 at one end 284 and to a first end of the other link 283 at the other end 285. A second end 286 of said other link 283 is pivotted to the worm-gear casing 260. Said one link 282 is substantially larger than the other link 283 and, in the engaged position, the three pivot points 284, 285,286 are co-linear such that the pivot point between the second end of the other link 283 and the worm gear casing 260 is disposed intermediate the pivot point 284 of the one link 282 to the motor housing 281 and the pivot point 285 between the two links 282, 285, such that the worm-screw housing 273 is prevented from disengaging the worm-gear casing 260. Said one link 282 can be selectively rotated clockwise as shown in FIG. 16, causing the other link 283 also to rotate clockwise, "breaking" the alignment of the three pivot points 284, 285, 286. The worm-screw 273 can then disengage from the worm-gear, allowing the rocker arms 245 to rotate freely about the axis defined by said second torque tube 250, the links 282, 283 serving to limit the extent to which the worm-screw housing 273 can be disengaged from the worm-screw casing 260. Alternatively, instead of the break-link device, the worm-screw housing 273 could be releasably secured to the worm-gear casing 260 by means of a removable bolt, for example.

Figure 13:
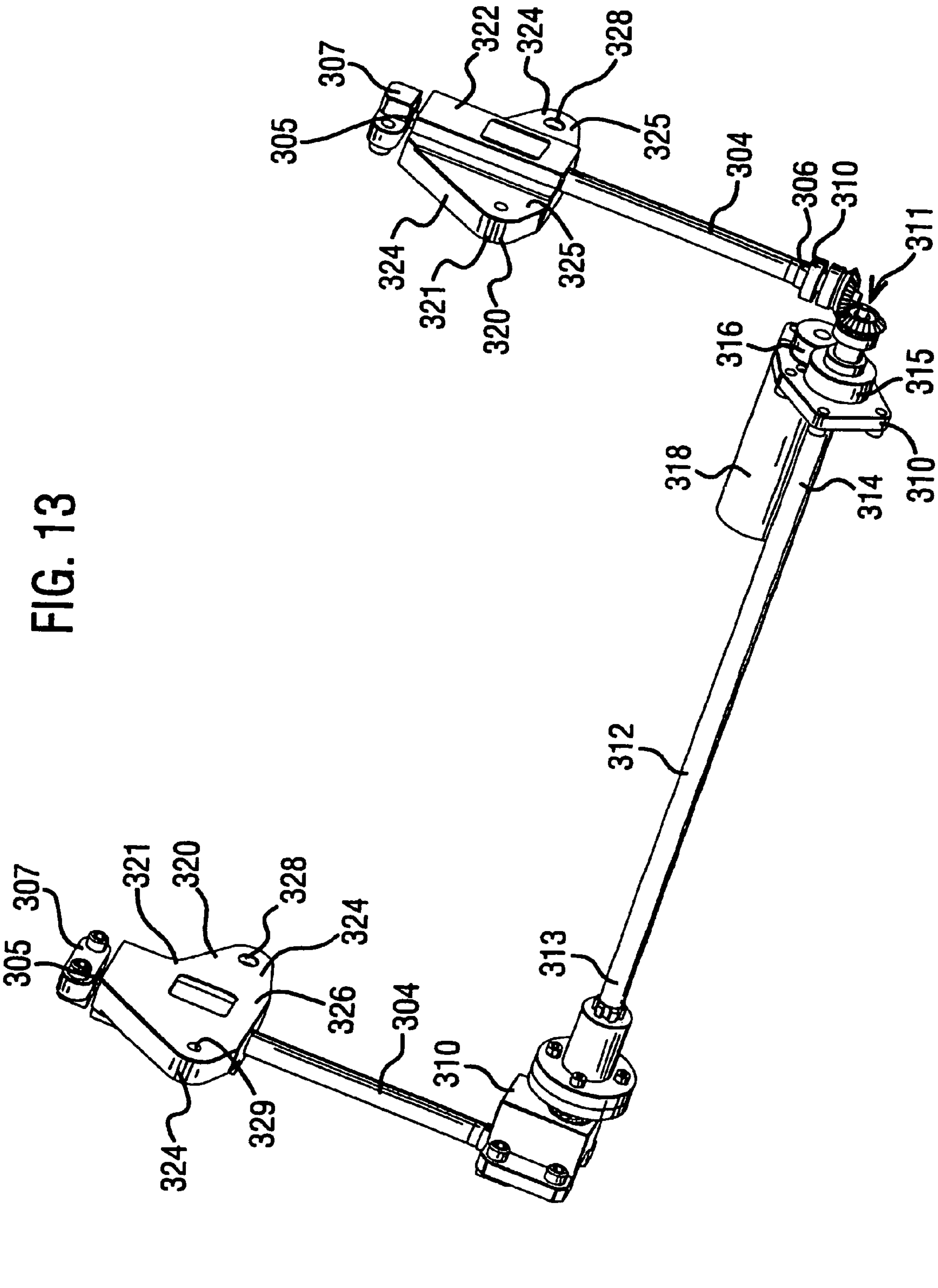
FIG. 13 is an isometric view of part of a seat reclining sub-mechanism of the first seat assembly of FIGS. 3 to 8.

As shown in FIG. 9, the inner face 227 of each rocker plate 223 is fabricated with an elongate, substantially linear recess 301 which is substantially rectilinear in cross-section and extends substantially parallely to said first edge 224 from a lower end 302 juxtaposed the lower end 229 of the rocker plate 223 to an upper end 303 at a point intermediate said upper and lower ends 228, 229 of the plate 223. As shown in FIGS. 3 to 5, said elongate recess 301 accommodates a linear screw 304 having upper and lower ends 305, 306 as shown in FIG. 13. In some embodiments, ball screws or any other suitable, non-reversible linear actuator devices may be used instead of the two linear screws. At its upper end 305, each linear screw 304 is rotatably mounted in a bearing 307, which is fixedly secured to the rocker plate 223 at the upper end 303 of the recess 301. The lower end 306 of each linear screw 304 is accommodated within a gear casing 310 which is fixedly secured to the inner face 227 of the respective plate 223. (In FIG. 13, one of the gear casings 310 is omitted to reveal the detail at the lower end 306 of the linear screw 304). Said lower end 306 is supported by a rotary bearing 308 within the gear casing 310 and is rotatably coupled through a bevel gear 311 to a respective end 313, 314 of a rotary drive shaft 312. At one end 314, the drive shaft 312 is connected through a pair of interengaging pinions 315, 316 to a stepper motor 318 that is mounted to the gear casing 310 such that operation of the motor 318 causes rotation of the shaft 312 and thus rotation of the linear screws 304.

Each linear screw 304 carries a nut 320 comprising a shaped body 321. Said body 321 is generally T-shaped in cross section and comprises a substantially rectilinear slider portion 322 which is shaped to form a close, but free-sliding fit within the linear recess 301 formed in the inner face 227 of the respective rocker plate 223. Said slider portion 322 accommodates the linear screw 304 therein and comprises internal formations (not shown) for engaging the screw 304. Said body 321 further comprises a pair of opposing wing portions 324, each of which has a substantially flat outer face 325, the outer faces 325 of the two wing portions 324 being substantially co-planar to one another. The body 321 has a substantially flat inner face 326. With the slider portion 322 inserted in the linear recess 301 of the respective rocker plate 223, the outer faces 325 of the wing portions 324 lie closely adjacent the inner face is 227 of the rocker plate 223.

With reference to FIG. 6, each of said nuts 320 is connected through a gimbal joint 329 to a respective lateral side edge 331, 332 of a structural diaphragm 330 forming part of a seat-pan element 171 which is disposed in the recess 235 intermediate the two opposing rocker plates 223. Said diaphragm 330 may comprise a light-weight, moulded composite panel or a perforated aluminium sheet. Said seat-pan element 171 has a rear end 333 and a forward end 334, said gimbal joints 329 being fitted to the diaphragm 330 towards said rear end 333 to allow the front end 334 of the seat-pan element 171 to be tilted upwards or downwards relative to the rear end 333 which moves less relative to the rocker plates 223. Said seat-pan element 171 includes suitable cushioning and upholstery which is supported by the diaphragm 330 to provide a comfortable seating surface for a passenger using the seat assembly 140. (The cushioning and upholstery is omitted in FIGS. 6 to 8 for clarity).

Juxtaposed the front end 334, the diaphragm 330 is pivotably connected to an upper end 341 of a depending lever 342. The other end 343 of the lever 342 is pivotably connected to a slider 345 which is slidably retained in an elongate, substantially linear slideway 350 that is fixedly secured to a respective one of the side walls 205, 206 of the seat housing 143 within said recess 144. As best seen in FIG. 3 each slideway 350 is oriented at an angle relative to the floor surface 130 such that the slideway 350 extends forwardly and upwardly within the recess 144 between an upper end 351 and a lower end 352. Said other end 343 of the lever 342 is also pivotably connected to a lower end 354 of a drag strut 355, said drag strut 355 having an upper end 356 that is pivotably connected to the first linear edge 224 of the respective rocker plate 223 juxtaposed the lower end 229 of the rocker plate 223.

With reference to FIG. 9, the inner face 227 of each rocker plate 223 is also formed with an elongate arcuate track 360 which extends juxtaposed the second arcuate edge 225 between an upper end 361 juxtaposed the upper end 228 of the plate 223 and a lower end 362 juxtaposed the lower end 229 of the plate 223. Intermediate the linear recess 301 and arcuate track 360, the inner face 227 of each plate 223 is also formed with a short linear slot 365 which extends from an upper end 366 juxtaposed the upper end 361 of the track 360 to a lower end 367 juxtaposed the upper end 303 of the linear recess 301. As best seen in FIG. 3, the linear slot 365 is angled with respect to the linear edge 224 of the plate 223 such that as the slot is extends downwardly from the upper end 366 to the lower end 367, it extends inwardly of the plate from the linear edge 224 towards the arcuate track 260. It can also be seen that the arcuate track 360 and linear slot 365 diverge from one another from their respective upper ends 361, 366 towards their respective lower ends 362, 367.

Figure 6A:
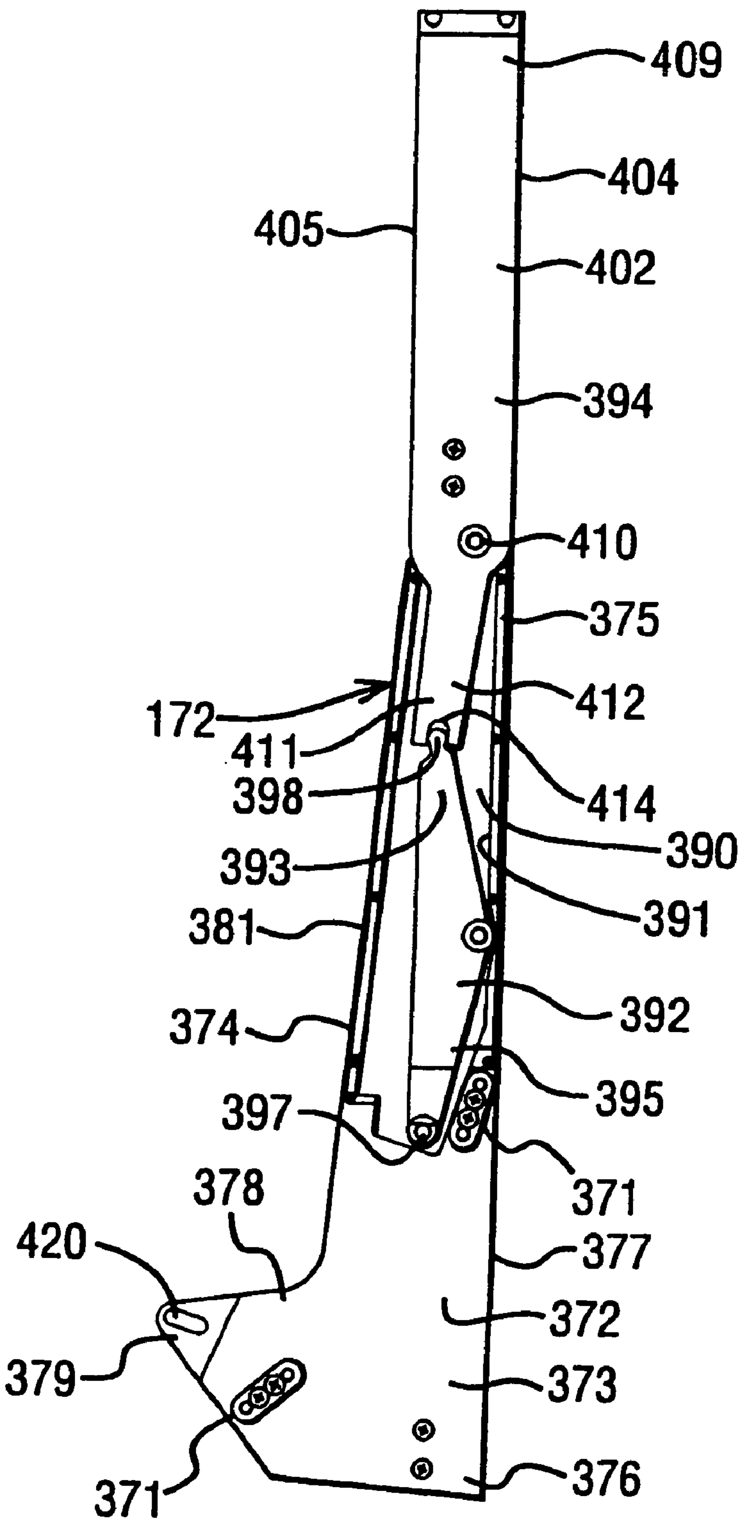
FIG. 6A is a side elevation of a back-rest component forming part of the first seat assembly of FIG. 6.
Figure 6B:
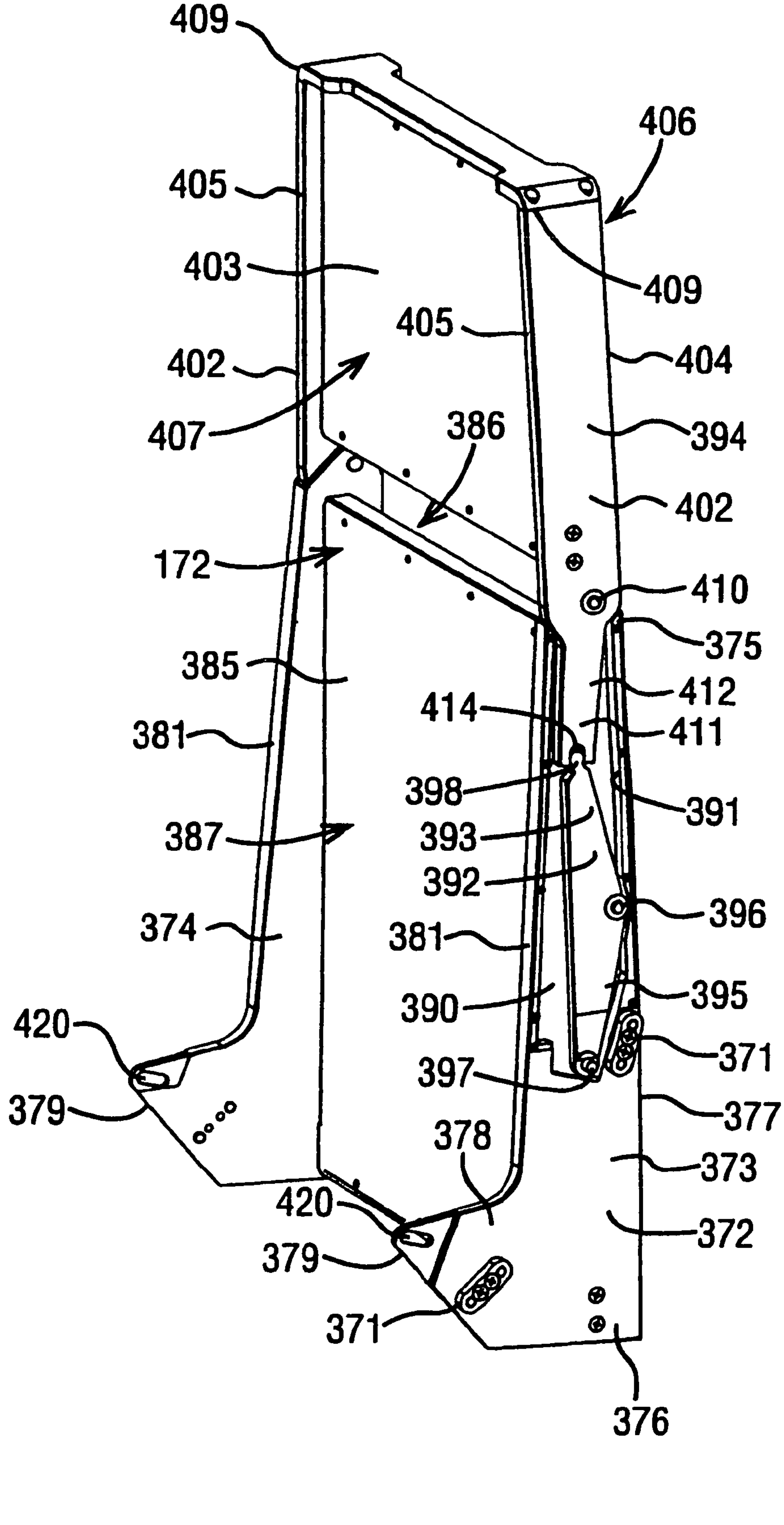
FIG. 6B is an isometric view of the back-rest component of FIG. 6A.

The arcuate track 360 on each rocker plate 223 receives slidably two spaced friction blocks 371 that are fixedly secured to the outer surface 372 of a respective lower side member 373 of a lower back-rest element 374 as shown in FIGS. 6A and 6B. Said lower back-rest element 374, together with an upper back-rest element described in more detail below, forms a back-rest component 172. Each lower side member 373 is generally L-shaped having an upper end 375, a lower end 376 and a substantially linear rear edge 377. At said lower end 376, each lower side member 373 comprises an enlarged foot portion 378 having a forwardly protruding nose 379. Each lower side member 373 has a substantially linear front edge 381 which extends between said upper end 375 and said enlarged foot portion 378 at a slight angle relative to the rear edge 377. As shown in FIGS. 6A and 6B, one of the friction blocks 371 on each lower side member 373 is mounted to said outer face 372 at the lower end 376 of the side member 373 at an angle of about 45° to the rear edge 377. Said other friction block 371 is mounted to said outer face 372 juxtaposed said rear edge 377 at a point intermediate said upper and lower ends 375, 376. The other friction block 371 also subtends an angle with the rear edge 377, but that angle is less than the angle subtended by the one friction block 371 and the rear edge 377.

Intermediate the two lower side members 373, the lower back-rest element 374 comprises a substantially flat diaphragm 385 which is spaced inwardly of both said front and rear edges 377, 381 to form rear and front lower recesses 386 and 387 respectively. Like the seat diaphragm 385 may comprise a moulded composite panel or a perforated metal sheet of the kind well-known in the manufacture of aircraft seats.

The outer face 372 of each side member 373 is further formed with a generally rectilinear, shaped cavity 390 having a peripheral side wall 391. Said cavity 390 is covered by a cover plate 380 (omitted in FIGS. 6A and 6B for clarity) which is fixedly secured to the outer face 372 of the side member 373. Said cavity 390 accommodates a generally triangular rocker lever 392 having an upper limb 393 and a lower limb 395. The rocker lever 392 is pivoted substantially centrally to the side is member 373 at its obtuse apex 396. The lower limb 395 is provided at its extremity with an outwardly directed pin 397, and the upper limb 393 is formed at its extremity with a lug 398. The rocker lever 392 is thus capable of rocking about said pivot 396 with corresponding rocking movement of the upper and lower limbs 393, 395. Movement of the rocker lever 392 is limited by the side wall 391 of the cavity 390 such that the upper limb 393 can rock between one position as shown in FIGS. 6A and 6B in which the lug 398 is disposed fully forwardly and another position (not shown) in which the upper arm 393 is disposed fully rearwardly.

The pin 397 on the lower limb 395 is slidably received in the linear slot 365 formed in the inner face 227 of the respective rocker plate 223. As best seen in FIG. 3, the lower back-rest element 374 extends upwardly of the rear end 333 of the seat-pan element 171 and is pivoted at its upper end 375 to said upper back-rest element 394. Said upper back-rest element 394 comprises two spaced upper side members 402 and a substantially flat upper diaphragm 403 which extends between said upper side members 402. Each of said upper side members 402 has a substantially linear rear edge 404 and a substantially linear front edge 405, and said upper diaphragm 403 is spaced inwardly of both said rear and front edges 404, 405 to define front and rear upper recess 406 and 407 respectively. The lower and upper front recesses 387, 407 accommodate cushioning that is specifically designed to form a comfortable back-rest surface which, in conjunction with the cushioning on the seat-pan element 171, forms a dedicated seat surface for a passenger. The back-rest cushioning is upholstered to match the upholstering on the cushioning on the seat-pan element 171. The cushioning and upholstery of the upper and lower back-rest elements have been omitted in FIGS. 6, 6A, 6B, 7 and 8 for clarity. The upper and lower rear recesses 386, 406 define a substantially continuous recess which receives a substantially flat cushion or mattress suitable for forming a bed surface. Again this is omitted in FIGS. 6, 6A, 6B, 7 and 8 for clarity. In particular, however, the back-rest cushioning provided in the upper and lower front recesses 387, 407 may have a different style or colour of upholstery from the rear cushion or mattress. Furthermore, the cushioning provided on the front and rear surfaces respectively of the back-rest component may have different degrees of resilience as appropriate for seating and bedding purposes.

Each of said upper side members 402 has an upper end 409 and a lower end 411. Each upper side member 402 is pivotably connected to the upper end 375 of the respective lower side member 373 at 410 intermediate said upper and lower ends 409, 411, such that each upper side member 402 extends downwardly from the pivot point 410 to form a leg portion 412 having a generally U-shaped cut-out 414 at said lower end 411. Said U-shaped cut-out 414 slidably accommodates the lug 398 formed on the upper limb 393 of the respective rocker lever 392 for transmitting rocking movement of said arm 392 to the upper side member 402. Thus, rocking movement of the rocker lever 392 about its central pivot point 396 causes corresponding rocking movement of the upper back-rest element 394 about the pivot point 410 between the upper and lower back-rest elements.

With reference to FIG. 3, the nose 379 of each lower side member 373 is connected through a lost motion device 420 to one of the wing portions 325 on the nut 320 mounted on the linear screw 304 of the respective rocker plate 223. Each lost motion device 420 comprises a pin attached to the respective wing portion 325 at 328, which pin is received in a short slot formed in the nose 379 of the lower side member 373.

With reference to FIGS. 9 to 12, the arcuate edge 225 of each rocker plate 223 is formed towards the upper end 228 with a protruding lug 431 which is pivotably connected to one end 433 of an arm member 432 which arm member 432 terminates remote from the lug 431 in another end 434. The two arm members 432 carry a transverse infill diaphragm member 440 which carries a generally rectilinear in-fill cushion 442 having an upper surface 443.

Juxtaposed the lug 431, the outer face 226 of each rocker arm 223 carries a small dog-leg member 450 which is pivoted to the rocker plate 223 at 451 between the lug 431 and the lower end 229 of the plate 223. Said dog-leg member 450 has a first limb 452 provided with a hook 453 at its extremity and a second limb 454 provided with a cam follower 455. Each arm member 432 has an outwardly extending holding pin 456, and the outer surface 226 of each rocker plate 223 is formed with an outwardly extending stop pin 457 which is positioned between the pivot point 451 and the arcuate edge 225 of the plate 223. The dog-leg member 450 is freely rotatable about the pivot 451, and the stop pin 457 serves to limit clockwise rotation of the dog-leg member 450 of the plate 223 as shown in FIGS. 9 to 12. (The stop pin on the other rocker plate 223 limits counter-clockwise movement of the corresponding dog-leg member 450).

The cam follower 455 on the second limb 454 of the dog-leg member 450 engages a cam 460 (see FIGS. 8 and 12) formed on the respective sidewall 205, 206 of the recess 144 for controlling movement of the dog-leg member 450.

As shown in FIG. 3, the first seat assembly 140 as hereinbefore described can be arranged in a upright seat configuration in which the rocker arms 245 extend forwardly relative to the rotary shaft 50 within the recess 144 and the links 241 are substantially co-linear with the rocker arms 245 such that the united rocker plates 223 are oriented in a seat configuration as shown in FIGS. 3, 4, 6, 7, and 10 in which the linear edge 224 of each rocker plate 223 extends upwardly and rearwardly within the recess 144, with the arcuate tracks 360 on the two rocker plates 223 extending generally downwardly and forwardly within the recess 144. As the links 241 and rocker arms subtend an angle of 180° to form a compression strut in the seat position, any loads applied to the rocker plates 223 are applied linearly to the second torque tube 250 and no rotational force is applied to the worm-gear 271. Advantageously, the seat conversion sub-mechanism of the seat assembly is capable of withstanding large forward forces, without the need for any additional disengageable mechanical coupling, such as a shoot-bolt, between the seat movement mechanism and the supporting structure. In the upright seating configuration, the nuts 320 are disposed at the upper ends 305 of their respective linear screws 304 as shown in FIG. 13, and the lower ends 343 of the levers 342 are disposed at the upper ends of the slideways 350 such that the seat-pan element 171 is disposed substantially horizontally within the recess 144, with the upper surface of the seat-pan cushioning at approximately the same level as the first and second upper surfaces 147, 148 on the seat housing 142 and the upper surface 169 of the cushion 167 on the ottoman 165. The friction blocks 371 on the lower side members 373 of the lower back-rest element 374 are disposed at the upper ends 361 of the arcuate tracks 360 on the rocker plates 223, and the pins 397 on the rocker levers 392 are disposed at the upper ends 366 of the linear slots 365 on the rocker plates 223. Accordingly, the upper limbs 393 of the rocker levers 392 are disposed fully forwardly within their respective cavities 390, such that the upper back-rest element 394 is substantially co-linear with the lower back element 373.

In the upright position of FIG. 3, the dog-leg members 450 on the rocker plates 223 are disengaged from the respective cam members 460, and the arm members 432 are disposed, as shown in FIG. 10, in a stowed position with the in-fill cushion 442 disposed generally beneath the first upper surface 147 of the seat housing 143. In the upright position, the cushioning 408 on the upper and lower back-rest elements 373, 394 forms an ergonomically comfortable seat with the cushioning on the seat-pan element 171.

In the upright position, the seat defined by the seat-pan element 171 and back-rest element 172 is generally suitable for dining. The ottoman unit 165 is spaced forwardly of the seat-pan element 171 and may be used as a foot-rest for the passenger.

From the upright position of FIG. 3, the seat assembly may be reclined to a fully reclined position as shown in FIG. 4 as follows. Upon operation of the stepper motor 318, the linear screws 304 on the rocker plates 223 are caused to rotate. As the nuts 320 are restrained from rotation with the linear screws 304, the nuts are driven translationally along the linear screws 304 towards the lower ends 302 of the recesses 301 formed in the opposing inner faces 227 of the rocker plates 223. As the nuts 320 are driven downwardly, the rear end 333 of the seat-pan element 171 is also driven downwardly relative to the front end 334 which is supported by the levers 342.

The rear end 333 of the seat-pan element 171 is thus driven downwardly causing the seat-pan element to tilt rearwardly about the pivot between the upper ends 341 of the levers 342 and the front end 334 of the seat-pan diaphragm 330. As the linear screws 304 extend downwardly and forwardly within the recess 144, the seat-pan element 171 is also driven forwardly, which forwards movement is accommodated by forward rocking of the levers 342 about the pivots between the lower ends 343 of the levers 342 and the sliders 354 in the respective slideways 350.

The front end 334 of the seat-pan element 171 therefore moves downwardly slightly in the recess 144, but not to the same extent as the rear end 333 of the seat-pan element 171. Movement of the sliders 354 rearwardly along the slideway 350 is prevented by the drags struts 355 between the sliders 354 and the rocker plates 223.

Forwards and downwards movement of the nuts 320 also causes corresponding movement of the back-rest element 172 which is connected to the nuts 320 through the lost motion devices 420 on the noses 379 of the lower back-rest elements 373. Movement of the back-rest component 172 causes the friction blocks 371 to slide in their respective arcuate tracks 360 on the opposing inner faces 227 of the rocker plates 223 from the upper ends 361 of the tracks 360 towards the lower ends 362. The relative orientation of the friction blocks 371 as described above and the curvature of the tracks 360 have the result that, as the friction blocks 371 slide along the tracks 360, the lower back-rest element 373 is caused to rock rearwardly as shown in FIG. 4 from the upright position of FIG. 3 to a fully reclined position as shown in FIG. 4.

Contemporaneously, the pins 397 on the rocker levers 392 are caused to slide along the linear slots 365 on the rocker plates 223. As each linear slot 365 diverges from the corresponding arcuate track 360 on the same rocker plate 223, the upper limb of each rocker lever 392 is caused to rock rearwardly in the respective cavity 390. Rearwards movement of the upper limbs 393 of the rocker levers 392 causes the upper side members 402 of the upper back-rest element 394 to rock forwardly relative to the lower back-rest element 373. As the back-rest component 172 is driven forwardly and downwardly by movement of the nuts 320, the upper back-rest element 394 rocks progressively further forwards relative to the lower back-rest element 373 until the rocker levers 392 engage the side walls 391 of the respective cavities 390, preventing further forwards rocking of the upper back-rest element 394. The relative positions and profiles of the recesses 301, tracks 360 and slots 365 formed on the two rocker plates 223 are carefully calculated to ensure that as the seat reclines from the upright position of FIG. 3 towards the fully reclined position of FIG. 4, the seat-pan element 171 and upper and lower back-rest elements 374, 394 move through a plurality of predetermined, ergonomically comfortable positions.

The stepper motor 318 can be controlled such that the nuts 320 can be stopped at any intermediate position between the upper and lower ends 305, 306 of the linear screws 304. Thus, movement of the seat defined by the seat-pan element 171 and upper and lower back-rest elements 374, 394 can be halted in any intermediate position between the upright position of FIG. 3 and fully reclined position of FIG. 4. The angle subtended by the upper and lower back-rest elements 374, 394 in a reclined position has the effect that the lower back-rest element 374 advantageously provides lumbar support for a passenger using the seat assembly 140.

The linear screws 304 are non-reversible linear actuator devices, and thus the seat assembly of the present invention has the added advantage that forces applied to the seat-pan element 171 or back-rest component 172 cannot be transmitted through the nuts 320 and linear screws 304 to the motor 318. This has the advantage that sudden and/or strong forces applied to the moveable seat elements 171, 374, 394 are not "seen" by the stepper motor, thus reducing the risk of damage to the stepper motor 318.

A particular feature of the first seat assembly 140 as hereinbefore described is that it can be converted from the upright position of FIG. 3 to a bed configuration as shown in FIG. 5. In order to convert the seat assembly 140 from the upright configuration to the bed configuration, the motor 280 is operated to cause rotation of the worm-screw 270. With the worm-screw housing 273 in the engaged position on the worm-gear casing 260, rotation of the worm-screw 270 causes corresponding rotation of the worm-gear 271 and thus rotation of the second torque tube 250. Rotation of the torque tube 250 in turn causes rotation of the rocker arms 245 from a seat position as shown in FIG. 15 to a bed position as shown in FIG. 14.

With reference to FIGS. 3 and 5, rotation of the rocker arms 245 rearwardly causes the links 241 to rock the rocker plates 223 forwardly about the trunnions 221. Rocking of the rocker plates 223 forwardly within the recess 144 causes the lower back-rest member 374 to rock forwardly about the trunnions 221. The gimbal joints 329 between the seat-pan element 171 and the nuts 320 also rotate about the trunnions 222, and rocking of the rocker plates 223 causes the drag struts 355 to pull the sliders 354 at the lower ends 343 of the levers 342 rearwardly and downwardly along the slideways 350 from the upper ends 351 of the slideways towards the lower ends 352. The front and rear ends 334, 333, of the seat-pan element 171 are thus caused to descend within the recess 144, such that the back-rest component 172 rocks forwardly over the seat-pan element 171 as shown in FIG. 5.

In the bed configuration of FIG. 5, the seat-pan element 171 is disposed in a lower stowed position within the recess 144, and the cushioning or mattress in the lower and upper rear recesses 386, 406 of the back-rest component 172, is disposed substantially co-planarly with the upper surfaces 147, 148 of the seat housing 143 and of the cushioning 167 on the ottoman unit 165. It can also be seen from FIG. 5 that the upper and lower back-rest elements 374, 394 are dimensioned such that in the bed configuration, the upper ends 409 of the upper side members 402 meet the ottoman unit 165 such that the cushioning or mattress on the rear surface of the backrest component 172 forms a substantially continuous surface with the cushion 167 on the ottoman unit 165 and with the second upper surface 148 on the seat housing 143. Advantageously, the upper end 409 of the upper back-rest element 394 may engage a formation (not shown) on the ottoman unit 165, such that in the bed configuration part of the load applied to the back-rest component 172 is borne in part by the ottoman unit. The engagement of the rocker levers 392 with the side walls 391 of their respective cavities on the lower side members 374 of the lower back-rest element 373 serves to lock the upper and lower back-rest elements 373, 394 together to prevent buckling of the back-rest component 172 under load in the bed configuration.

Movement of the rocker plates 223 from the seat position to the bed position also raises the arm members 432 carrying the in-fill cushioning 443 within the recess 144. In the seat position as shown in FIG. 10, the dog-leg members 450 are disengaged from the cams 460 formed on the side surfaces 205, 206 of the recess 144 and can pivot freely about the pivot points 451. As mentioned above, however, movement of the dog-leg members 450 is limited by the stop pins 457.

As the rocker plates 223 are rocked forwardly towards the bed configuration of FIG. 5, the holding pins 456 on the arms 432 become trapped behind the hooks 453 on the first limbs 452 of the dog-leg members 450. As the rocker plates 223 move towards the bed configuration, the cam followers 455 engage the cams 460, thus locking the dog-leg members 450 in place, trapping the holding pins 456 behind the hooks 453.

As best seen in FIG. 5, the arm members 432, cushioning members 442, holding pins 456, dog-leg members 450 and cams 460 are shaped and positioned such that, in the bed configuration, the upper surface 443 of the in-fill cushioning member 442 fills a space between the lower end 376 of the lower back-rest element 374 and the forward end of the first upper surface 147 of the seat housing 143. The upper surface 443 of the in-fill cushioning member 442 is disposed substantially continuously and substantially co-planarly with the cushioning or mattress on the rear of the back-rest component 172 and the first upper surface 147 to form an extended, is substantially flat bed surface.

The supporting structure 142 of the seat assembly 140 is configured such that, in flight, with the floor surface 130 at an angle of about 1-3° to the horizontal, the bed surface provided by the seat assembly of the present invention is disposed substantially horizontally relative to Earth. In other words, the seat assembly 140 of the present invention compensates for the slight incline of the aircraft in flight.

Advantageously, the worm-gear, worm-screw assembly 271, 270 is non-reversible, and so in the bed and seat configurations, the motor 280 does not “see” undue forces applied to the rocker plates 223. In other words, undue or sudden forces applied to the rocker plates 223 are not transmitted through the worm-gear/worm-screw assembly to the motor 280.

The first passenger seat assembly 140 as hereinbefore described is equipped with user-operable controls mounted conveniently to the supporting structure 142. Said controls comprise means for operating the stepper motor 318, for selectively moving the seat-pan and back-rest moveable elements 171, 374, 394 between the upright position of FIG. 3 and the fully reclined position of FIG. 4, and for operation of the motor 280 for converting the moveable elements 171, 374, 394 between the upright seat configuration of FIG. 3 and the bed configuration of FIG. 5 in which the moveable back-rest elements 374, 394 cooperate with the fixed auxiliary elements of the supporting structure 142, i.e., the ottoman unit 165 and first and second upper surfaces 147, 148 of the seat housing 143 to form an extended, substantially flat bed for the passenger. Said controls comprise control circuitry for ensuring that if a passenger attempts to convert the seat assembly 140 from the seat configuration to the bed configuration when the seat is in a reclined or fully reclined position, the stepper motor 318 is first operated to return the moveable seat elements 171, 374, 394 to the fully upright position before the motor 280 is operated to convert the seat into the bed configuration. In the event of a failure of the motor 280 or of the aircraft cabin power supply, the seat assembly 140 can be returned to the upright position of FIG. 3 by breaking the break-link device 282, 283 as described above and manually rocking the rocker arms 245 forwardly to the seat position of FIG. 15

The first passenger seat assembly 140 in accordance with the present invention as hereinbefore described thus provides self-contained, individual seating and sleeping accommodation for a passenger.

Figure 17:
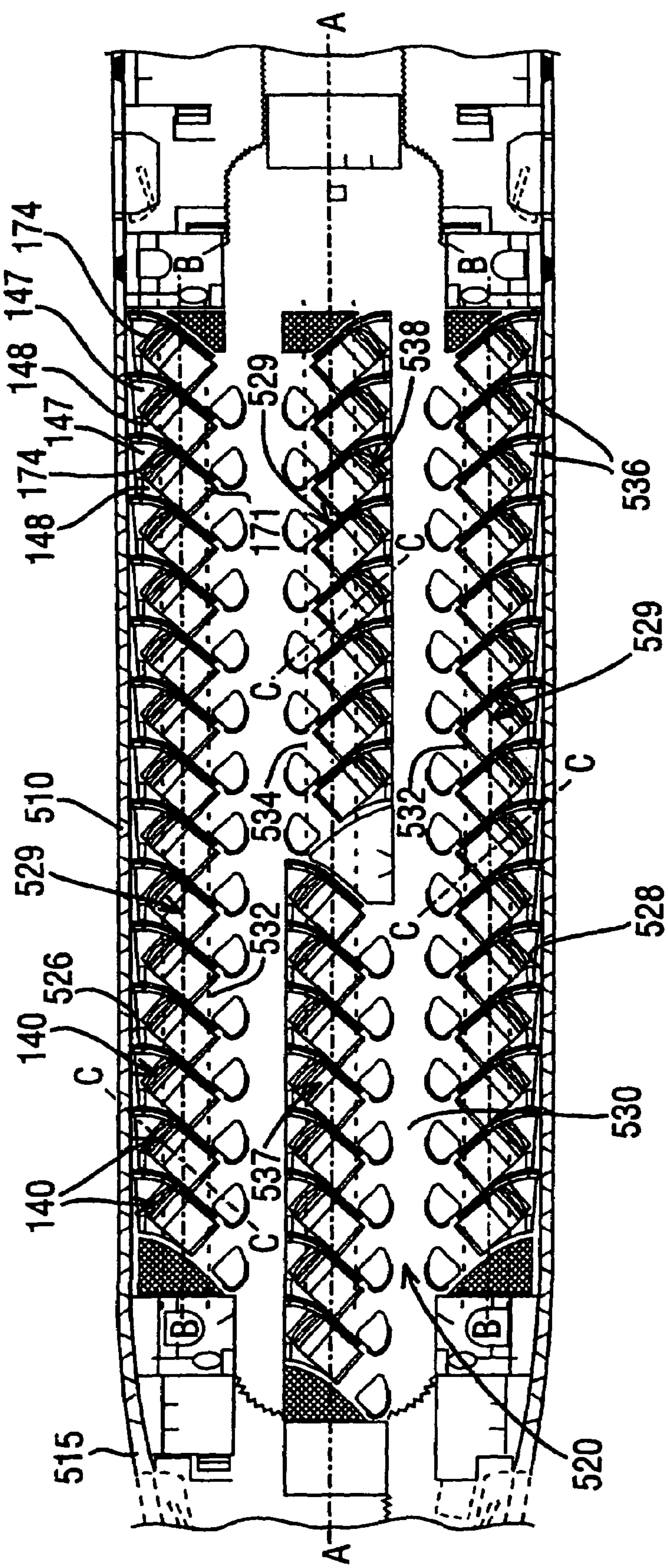
FIG. 17 is a sectional, schematic plan view of another seating system in accordance with the present invention.

FIG. 17 shows another seating system in accordance with the present invention comprising a plurality of first passenger seat assemblies 140 of the kind hereinbefore described with reference to FIGS. 3 to 16. In FIG. 17, an aircraft fuselage 510 encloses a passenger accommodation cabin 520 at a position rearwardly of a nose portion 515 of the fuselage 510. As in the case of the seating system of FIG. 1, the accommodation cabin 520 of FIG. 17 is defined by two opposing interior surface portions 526, 528 of the fuselage 510, a floor surface or deck 530 supported within the fuselage 510 on suitable supporting infrastructure (not shown) and a ceiling (also not shown). The infrastructure includes a plurality of pairs of seat tracks 532, 534 which are embedded in the floor surface 530. The cabin 520 of FIG. 17 includes two outer pairs of seat tracks 532, each extending juxtaposed a respective one of the opposing surface portions 526, 528 of the fuselage 510 and a single, central seat track pair 534. Each of the seat track pairs 532, 534 extends substantially parallel to a longitudinal aircraft axis defined by the fuselage 510 and indicated in FIG. 17 by the chain dot line A-A.

The seat assemblies 140 are attached to the seat tracks 532, 534 to form a plurality of columns 529. Each column 529 is fixedly secured to a respective one of the seat track pairs 532, 534 and defines a notional, longitudinal column axis indicated by lines B-B in FIG. 17. Each seat assembly 140 defines a notional, longitudinal seat axis, indicated by lines C-C in FIG. 17, which subtends an angle of about 49° to the notional column axis B-B. The seat assemblies 140 attached to the outer seat track pairs 532 face forwardly and inwardly within the cabin 520. The seat assemblies 140 attached to the central pair of seat tracks 534 form two groups 537, 538. A forward group 537 of seat assemblies 140 attached to the centre seat track pair 534 face forwardly and to one side of the cabin 520, whilst a rear group 538 face forwardly and to the other side of the cabin 520.

As in FIG. 1, within each column 529, the seat assemblies of FIG. 17 are arranged side-by-side in a longitudinal off-set relation to one another so as to define a generally triangular or trapezoidal space 536 to the rear of each seat assembly 140, behind the back-rest component 172 when the seat assembly 140 is in the seat configuration. As described above, each seat assembly 140 is self-contained, capable of providing an individual, extended flat bed having a length of at least 80" (2.02 is meters) for a passenger, and the arrangement of seat assemblies 140 in accordance the seating system of FIG. 17 allows the seat assemblies 140 to be accommodated within the cabin 520 at a pitch of about 50 to 60" (1.27-1.52 meters). Thus, a plurality of seat assemblies 140 in accordance with the present invention, each providing an individual bed of at least 80" (2.032 meters) length, can be accommodated within a typical business class cabin of a passenger aircraft.

The interior surface of an aircraft fuselage 510 is concave in vertical cross-section, and thus within the cabin 520 of FIG. 17, each of the opposing interior surface portions 526, 528 of the fuselage 510 defines a lateral recess at each side of the cabin 520. Advantageously, this lateral recess is occupied by the first and second passenger-supporting auxiliary surfaces 147, 148 of each seat assembly 140 attached to one of the outer seat track pairs 532. The first and second supporting surfaces 147, 148 form part of the extended flat bed surface provided by each seat assembly 140 in the bed configuration and, whilst the lateral recess has insufficient head room to accommodate the full height of the seat in an upright or reclined seating configuration, its use to accommodate part of the extended bed surface for which the headroom requirement is less represents an efficient use of the space available within the cabin.

In accordance with the present invention, the upholstery used to dress the seat-pan element 171 and cushioning 408 provided on the back-rest elements 374, 394 of each seat assembly 140 may be selected such that when all or a majority of the seat assemblies 140 of the seating system of FIG. 17 are arranged in a seating configuration, the cabin has a first particular appearance and/or ambience which is suitable for dining and/or lounging. The bedding materials provided for dressing the cushions provided in the lower and upper rear recesses 386, 406 on the back-rest component 172 may have patterns and/or colourways which are particularly appropriate for a sleeping environment. In particular, the style of the bedding materials may be selected such that when all or a majority of the seat assemblies 140 of the seating system of FIG. 17 are in the bed configuration, the cabin 520 may have a different second appearance or ambience which is more "restful" than the first appearance and is more appropriate for a sleeping environment.

Figure 18:
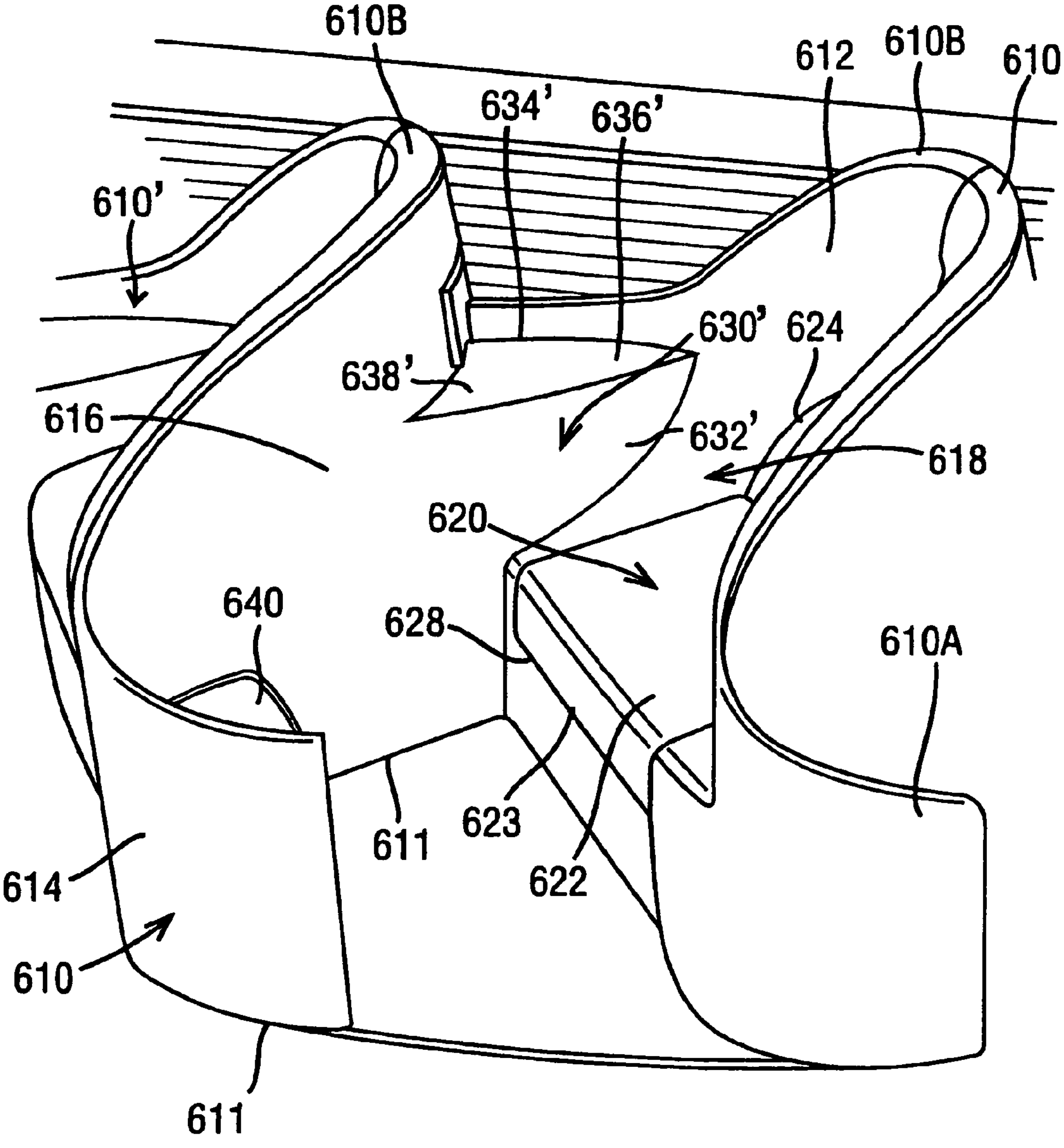
FIG. 18 is an isometric view of a passenger accommodation unit in accordance with the present invention, shown in a seat mode.
Figure 19:
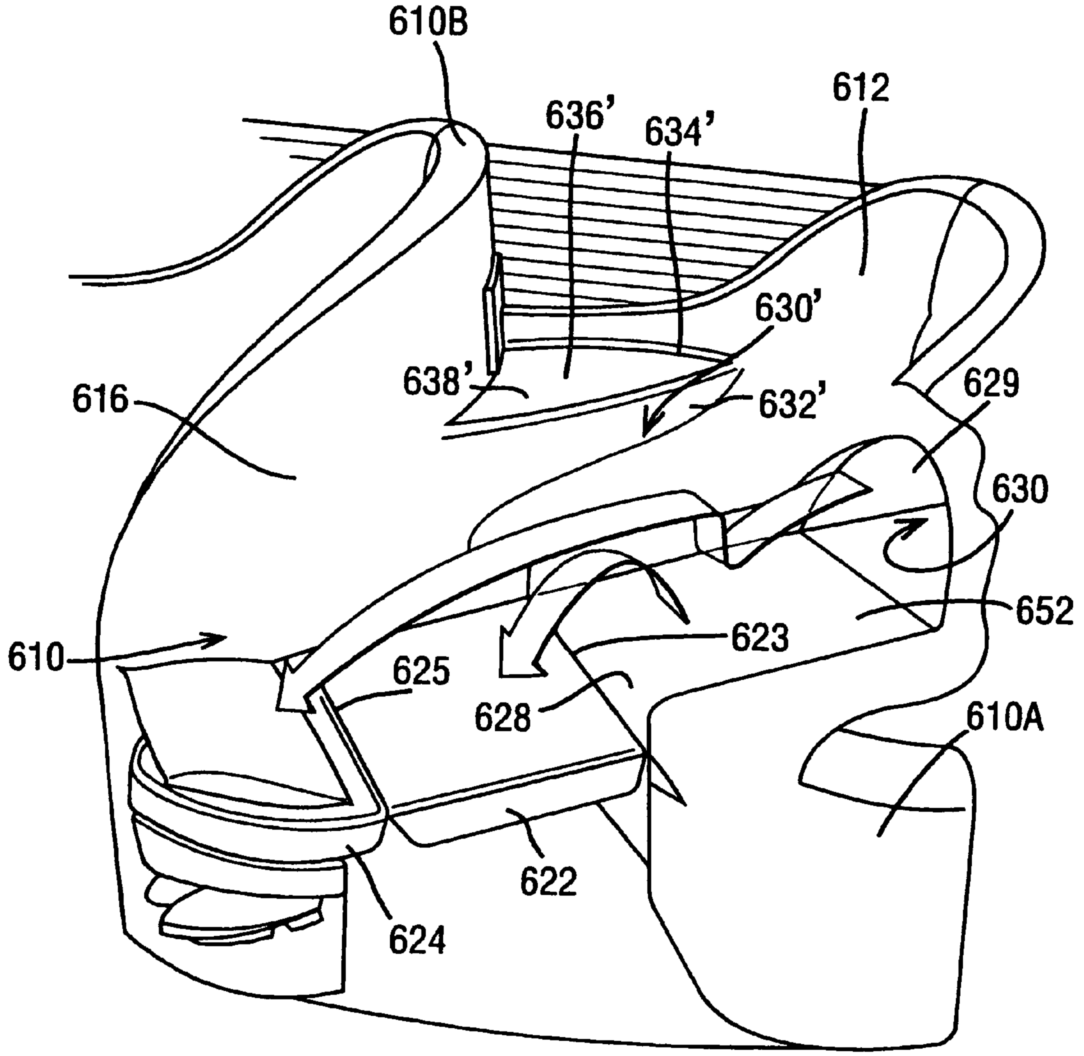
FIG. 19 is an isometric view of the passenger accommodation unit of FIG. 18 in a bed mode.

With reference to FIGS. 18 and 19 of the accompanying drawings, a passenger accommodation unit in accordance with another embodiment of the present invention comprises a shell assembly 610 that is assembled from two half-shells 610*a*, 610*b*. The accommodation unit is adapted to be positioned in a passenger cabin of an aircraft in juxtaposition with at least one neighbouring seat 610', and the two half-shells 610*a*, 610*b* are similar to one another such that each forms a part of two adjacent seats. Each half-shell 610*a*, 610*b* is manufactured as a single piece from a suitable aircraft-grade, light-weight structural material.

The shell 610 of each accommodation unit comprises a curved, upright rear screen 612 and an opposing, upright, curved front screen 614 which are interconnected by a generally linear side wall 616 to form an enclosed passenger space 618.

Said shell 610 comprises a bottom edge 611 which defines a plane and is provided with a plurality of suitable fixings (not shown) for attaching the accommodation unit to the seat tracks in the aircraft cabin. In some embodiments the unit may be adequately secured to the seat tracks using three such fixings.

Figure 20A:
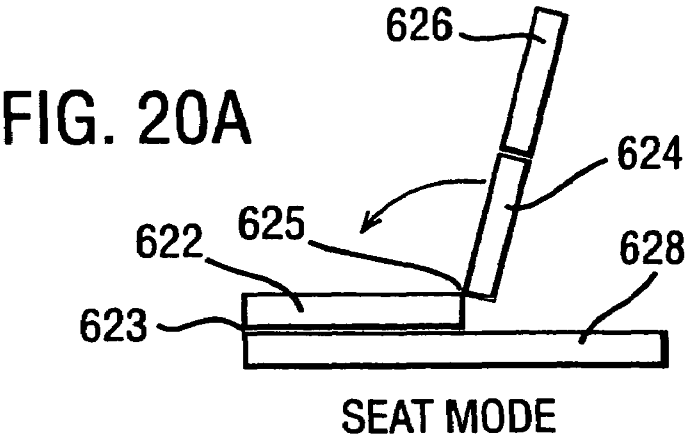
FIGS. 20A-20C show schematically in side elevation the interconversion of the passenger accommodation unit of FIGS. 18 and 19 between the bed mode and the seat mode.
Figure 20B:
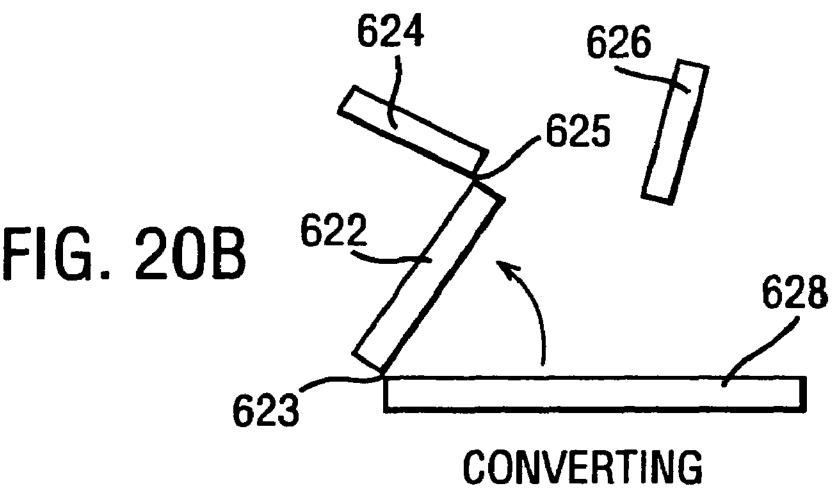
Figure 20C:
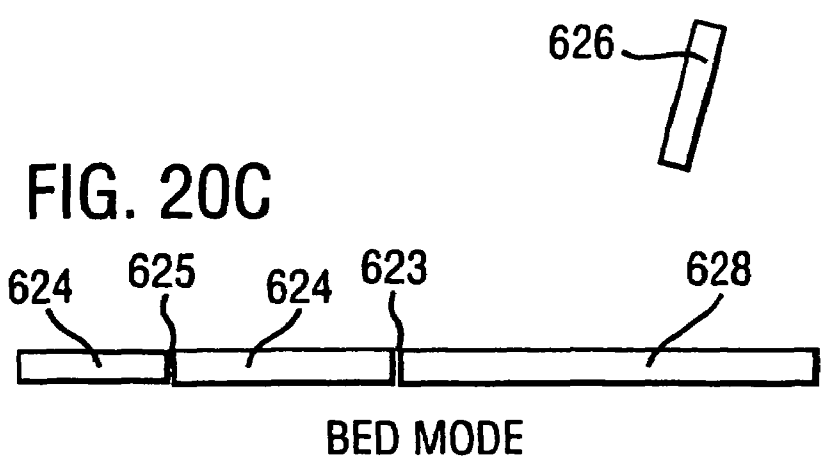

Said shell 610 provides a suitable supporting structure for a seat 620 which comprises a seat-pan 622, a back-rest 624 and a backrest extension 626 (see FIGS. 20A-20C). In particular, the shell 610 of the accommodation unit comprises an under-seat-pan 628 (see FIG. 19) that is disposed adjacent to the rear screen 612 and has a generally flat, horizontal upper surface that serves to support the seat-pan 622. Said seat-pan 622 is pivoted to the under-seat-pan 628 at its forward edge 623, and the backrest, which normally rests in a generally upright position against the internal surface of the rear screen 612, is pivoted at its lower end 625 to the rear end of the seat-pan. Said backrest extension 626 is permanently fixed to the internal surface of the rear screen 612 at a position above and substantially contiguous to the upper edge of the backrest 624 in its normal position as described above.

Said enclosed passenger space 618 further comprises a pedestal 640 that is supported above the cabin floor on the shell 610 adjacent the front screen 614. Optionally, said pedestal 640 may be height-adjustable in any convenient manner known to those skilled in the art.

Figure 21A:
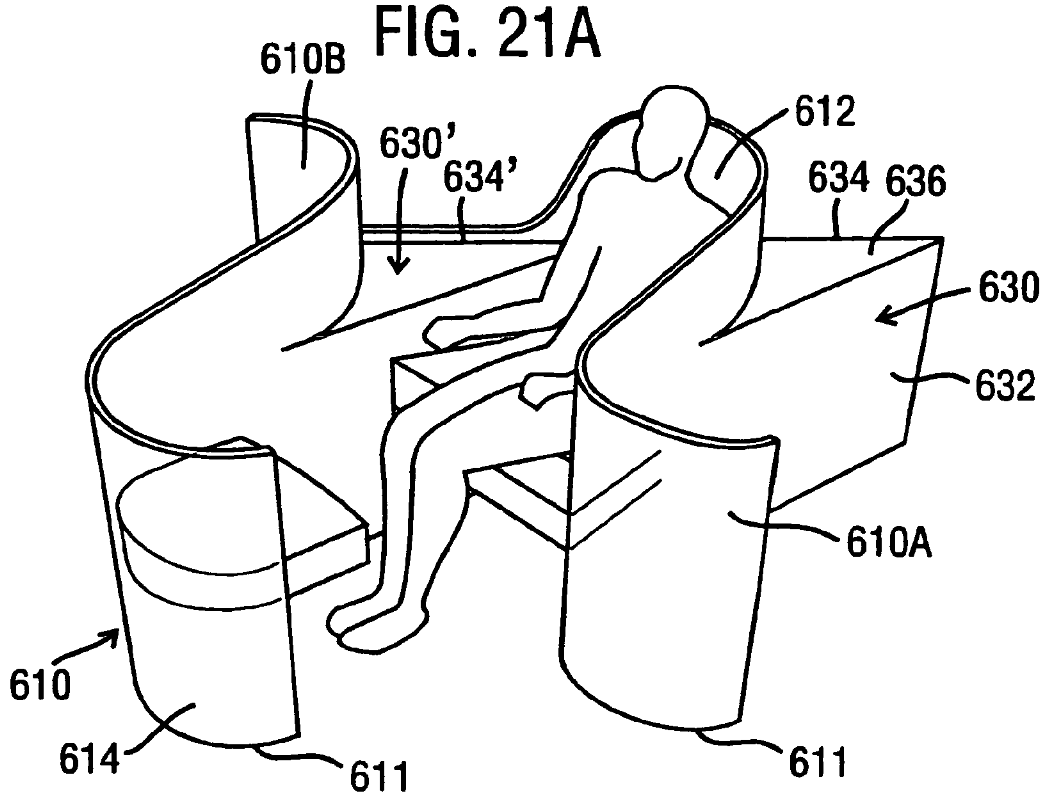
FIG. 21A is a schematic, isometric view of the passenger accommodation unit of FIGS. 18 and 19, showing a passenger using the seat in the seat mode.
Figure 21B:
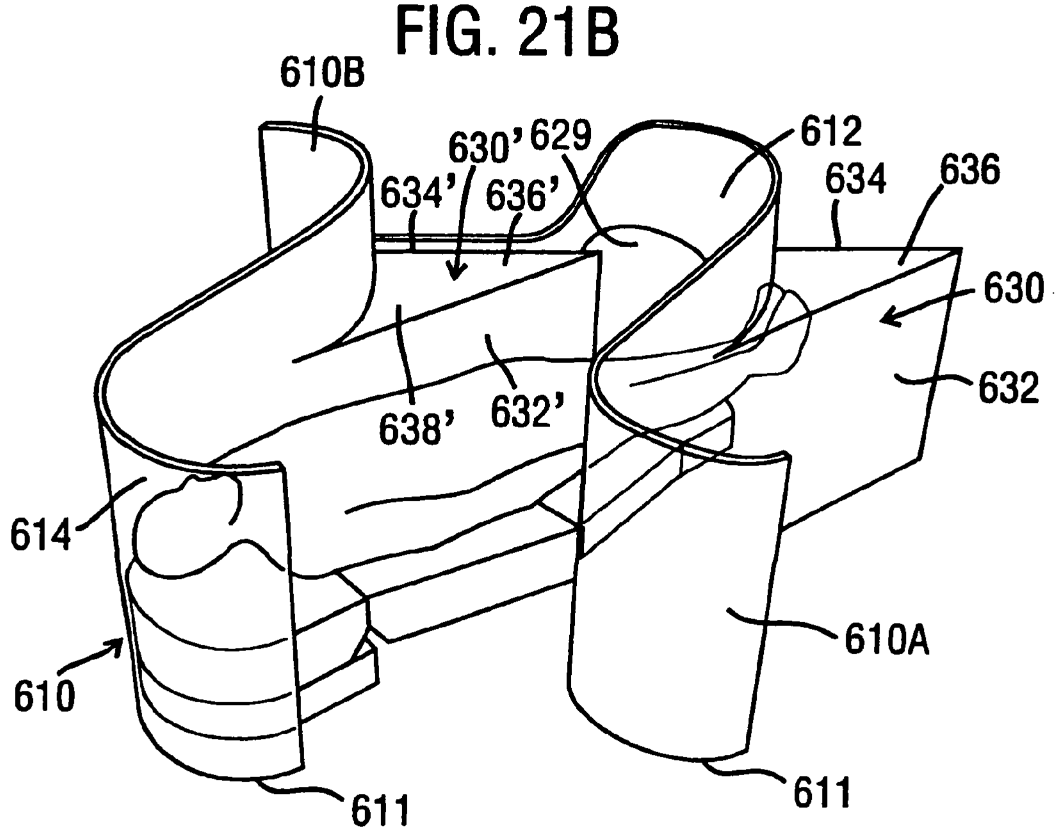
FIG. 21B is a schematic, isometric view of the passenger accommodation unit of FIGS. 18 and 19, showing a passenger using the seat in the bed mode.

Behind the rear screen 612, the shell 610 of the seating unit is shaped to define a hollow foot-box 630 (see FIGS. 21A and 21B). In FIGS. 18 and 19, the foot-box 630' of the neighbouring seat is shown. Said foot-box 630 includes an internal, generally horizontal shelf which is positioned at substantially the same vertical level as the under-seat-pan 628, and an aperture 629 is formed in the rear screen 612 of the shell 610 immediately behind the backrest 624 in its normal position to allow access to the interior of the foot-box 630.

Said foot-box comprises a first side wall 632 which forms part of the interconnecting side wall 616 of the shell 610 of the neighbouring unit and is oriented substantially parallel to the notional longitudinal axis of the unit. The foot-box 630 further comprises a second opposing side wall 634 that subtends an acute angle with the notional, longitudinal axis of the unit, such that the foot-box has a generally triangular or trapezoid shape in plan view. In FIGS. 18-21 of the drawings, the foot-box of the accommodation unit has a generally triangular shape, but the foot-box could be truncated with an end wall between the two side walls 632, 634 to form a trapezoidal shape. Alternatively, where the seat is intended to be positioned juxtaposed a wall, the first side wall 632 may be omitted such that the first lateral side of the foot-box is open. The foot-box 630 terminates below the upper edge of the rear screen 612 with a generally flat top wall 636. Said top wall 636 is formed with a generally triangular, flat portion 638 which serves as a drinks side-table for the neighbouring unit.

As shown in FIG. 19, the upper surfaces of the shelf within the foot-box 630 and the under-seat-pan 628 are cushioned with thick padding or support a mattress portion 652. Similarly, the underside of the seat-pan 622 and the rear side of the backrest 624 are cushioned.

In a "seat mode" the seat-pan 622 and backrest 624 are positioned normally as shown in FIGS. 18, 20A and 21A, such that a passenger may sit on the seat. However, when the passenger wishes to go to sleep, he or she may get up from the seat and manually pull the back-rest 624 away from the rear screen 612. The back-rest 624 will pivot relative to the seat-pan 622, and continued pulling of the back-rest 624 will cause the rear end of the seat-pan 622 to lift upwardly away from the under-seat-pan and pivot about its front edge 623 as shown in FIG. 20B. The seat-pan 622 and back-rest 624 can be manipulated as shown in FIGS. 20C and 21B to provide a substantially flat and continuous sleeping surface in which the front side of the back-rest 624 is supported on an upper surface of the pedestal 640, the joints between the back-rest 624, seat-pan 622 and under-seat-pan 628 locking in the flat position as shown in FIG. 20C to form a "bed mode". The passenger may then lie down on the flat surface with his or her head towards the front screen 614. By removing the back-rest 624 from the rear screen 612, the aperture 629 through the shell 610 is exposed, allowing the passenger to extend his or her lower legs through the aperture into the foot-box 630. In the bed mode, the cushioned upper surfaces of the shelf and under-seat-pan 628 and the underside of the seat-pan 622 and rear-side of the back-rest 624 may be fitted with suitable bed linen such as sheets and blankets, and a pillow for the passenger may be placed on the rear of the back-rest 624. The surfaces of the unit used in the bed mode may be upholstered and dressed differently from those used in the seat mode. When all of a majority of the units in the a cabin are in one or other of the modes, a particular ambience can be created within the cabin.

By positioning the accommodation unit at an angle of about 40-50 degrees, preferably about 45 degrees, to the direction of travel of the aircraft, a full bed length of up to 7 ft (2.13 meters) may be provided for the passenger, and at the same time, a side-table 638 is also provided of generous proportions, of the kind normally associated with first-class accommodation. As with the seat units 40 of FIGS. 1-2 and the seat assembly of FIGS. 3-5, the accommodation unit of FIGS. 18-21 is configured to compensate for the bed mode, the accommodation unit in accordance with the present invention provides a substantially horizontal sleeping surface.

Another passenger accommodation unit in accordance with the present invention is illustrated in FIGS. 22-27. Many of the elements of the unit of FIGS. 22-27 are similar to corresponding elements of the unit of FIGS. 18-21 described above. Accordingly, for clarity, such elements are referred to by the same reference numerals plus 100. Thus, by way of example, whilst the rear screen of the unit of FIGS. 18-21 is referred to by numeral 612, the rear screen of the unit of FIGS. 22-27 is referred to by numeral 712.

Figure 22:
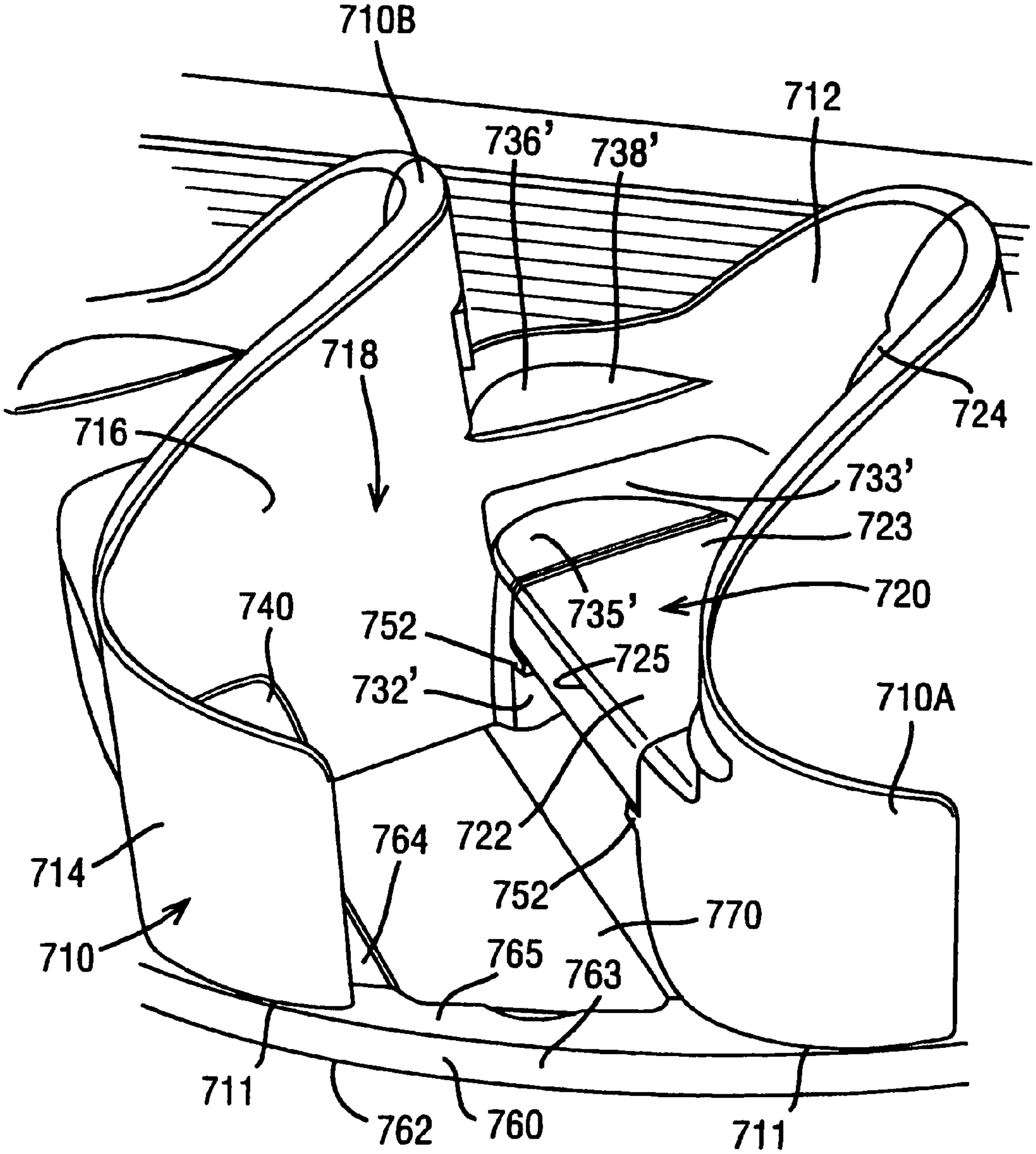
FIG. 22 is an isometric view of an another accommodation unit in accordance with the present invention shown in a seat mode.

Thus, as shown in FIG. 22, the other passenger accommodation unit comprises a shell 710 which is formed from two half shells 710*a* and 710*b*. Said shell 710 comprises a rear screen 712 and a front screen 714 that are interconnected by an interconnecting side wall 716. Behind the rear screen 712, the shell comprises a hollow foot-box 730 having opposing side walls 732 and a top wall 736 which includes a substantially flat, horizontal portion 738 that serves as a drinks side-table for a neighbouring seat.

The shell 710 of FIGS. 22-27 is mounted on a plinth 760. Said plinth 760 is manufactured from a suitable aircraft grade, light-weight, structural material, typically the same material as the shell 710, and has a planar bottom wall 762 which is fitted with suitable fixings (not shown) for fixing the plinth substantially to the seat tracks.

Figure 24A:
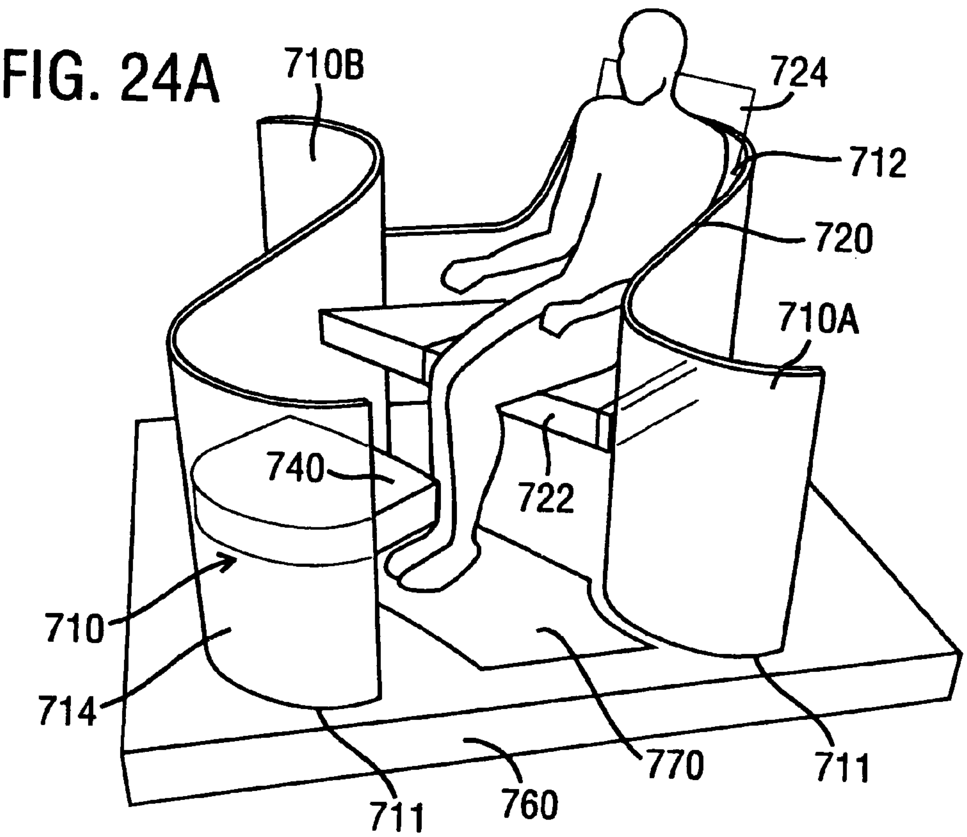
FIG. 24A is a schematic, isometric view of the passenger accommodation unit of FIGS. 22 and 23, showing a passenger using the seat in the seat mode.
Figure 24B:
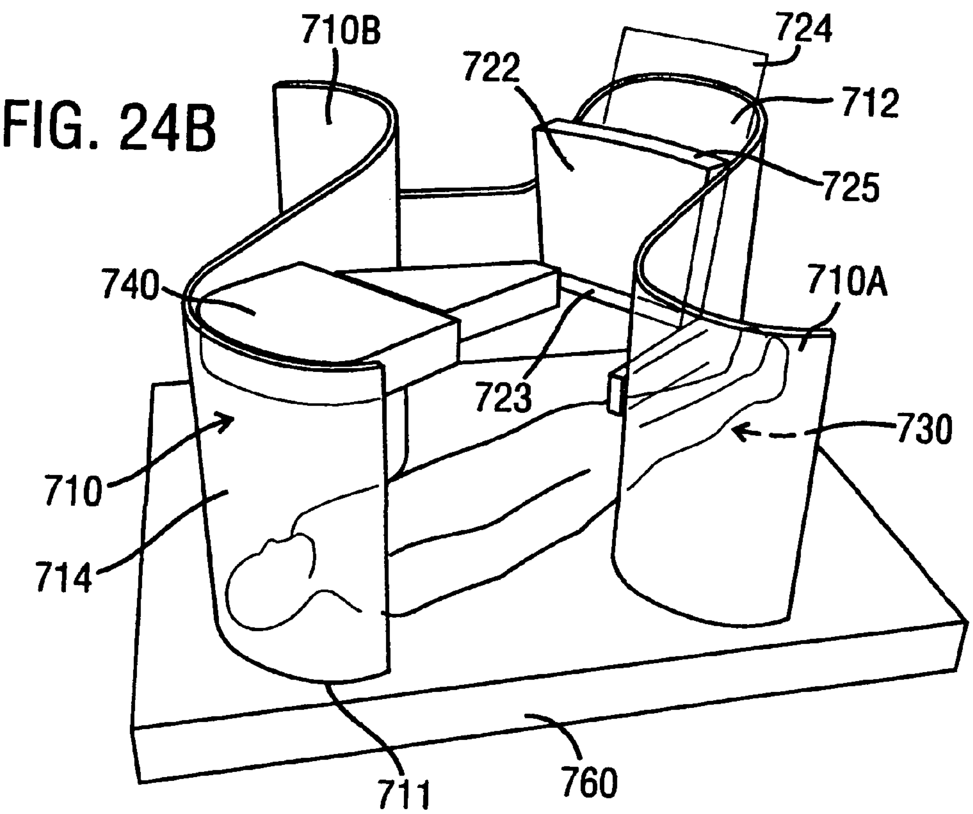
FIG. 24B is a schematic, isometric view of the passenger accommodation unit of FIGS. 22 and 23, showing a passenger using the seat in the bed mode.

Said plinth 760 is formed with a recess 764 which is defined by an upstanding side wall 763 having an inwardly directed, upper rim 765. Said recess 764 extends from the front screen 714 under the entire seat into the foot-box 730 which is positioned at floor level. The recess 764 accommodates a mattress or similar cushioning or padding suitable for forming a bed for a passenger. Said recess is shaped to compensate for the slight incline of the aircraft in flight such that said mattress is substantially horizontal. Juxtaposed the front screen 714, the shell 710 carries a movable pedestal 740 which is movable on a substantially vertical axis between a lower deployed position as shown in FIGS. 22 and 24A and a raised, stowed position as shown in FIG. 24B. Whilst various mechanisms for achieving such movement of the pedestal will be apparent to those skilled in the art, an example of a suitable mechanism would be inter-engaging runners fitted on the inner surface of the front screen 714 and on the pedestal 740. Suitable means are provided for locking the pedestal 740 in the upper and lower positions.

Figure 23:
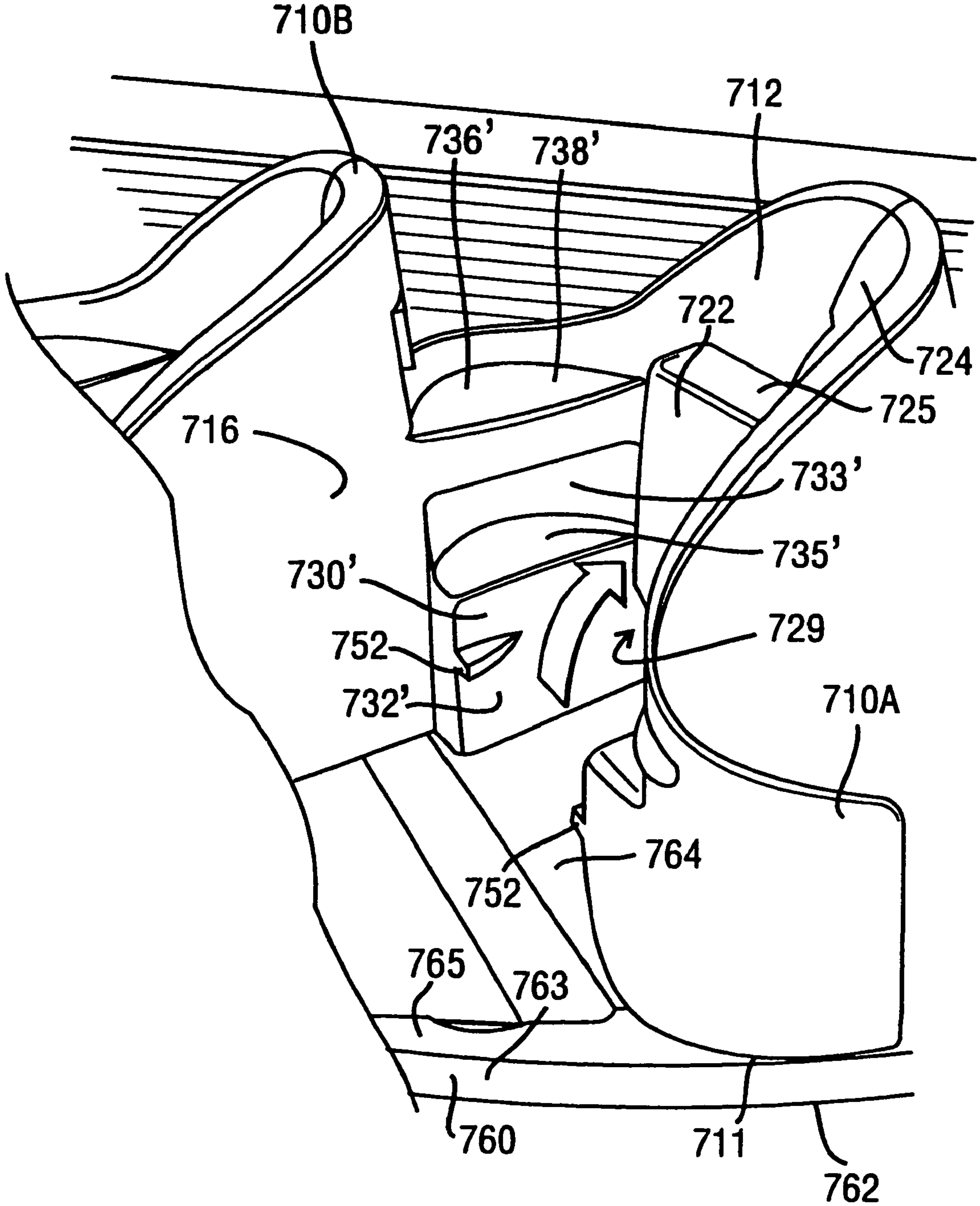
FIG. 23 is an isometric view of the passenger accommodation unit of FIG. 22, shown in a bed mode.

Said shell 710 defines a personal passenger space 718 which accommodates a seat 720 comprising a seat-pan 722 and a backrest 724. Said backrest 724 is permanently fixed to the inner surface of the rear screen 712, whilst the seat-pan is pivoted at its rear edge 723 to the inner surface of the rear screen 712 for movement between a deployed position as shown in FIGS. 22 and 24A and a stowed position as shown in FIGS. 23 and 24B. In the deployed position the front edge 725 of the seat-pan 722 is supported by inwardly directed protrusions 752 formed on the shell 710 which constitutes supporting structure for the seat assembly 720.

Beneath the seat-pan 722, the rear screen 712 of the shell 710 is formed with an aperture 729 to allow access from the passenger space 718 into the interior of the foot-box 730. Said mattress extends beneath the seat assembly 720 through the aperture 729 into the foot-box 730.

Intermediate the seat-pan 722 and pedestal 740, the recess 764 is covered by a removable false floor panel 770 which is made from a suitable aviation standard, load-bearing material. Said false floor panel 770 is preferably connected to said interconnecting side wall 716 for movement between a deployed position as shown in FIG. 22 and a stowed position in which the panel 770 extends substantially vertically and lies contiguous the side wall 716. Securing means are provided for securing the panel in the stowed position.

Juxtaposed the seat-pan of a neighbouring unit, the first side wall 732' of the foot-box is formed with an external recess 733' which is provided with an upholstered shelf 735' at the same level as the seat-pan 722 of the neighbouring unit to provide a lateral extension of said seat-pan 722.

The accommodation unit 720 can thus be selectively manipulated between a "seat mode" as shown in FIGS. 22 and 24A in which the seat-pan 722 is deployed and a "bed mode" as shown in FIGS. 23 and 24B in which the seat-pan 722 is pivoted upwardly about its rear edge 723 to lie flat against the inner surface of the backrest 724 in the stowed position. In the bed mode, the removable false floor panel 770 can be moved to the stowed position, and the pedestal 740 raised from its lower position to its raised position thereby to expose the mattress within the recess 764 of the pedestal 760. Raising the seat-pan 722 to its stowed position facilitates access to the foot-box 730 and provides a more spacious personal space 718 within the shell 710 in the bed mode.

Thus, in the seat mode as shown in FIG. 24A, a passenger may sit on the seat provided by the unit 720 and, if desired, may rest his or her feet on the pedestal 740 in its lower position. If the passenger desires to go to bed, then he or she may stand up and lift the seat-pan 722 to its stowed position as shown in FIG. 24B. The pedestal 740 may be raised to its elevated position and the false floor panel 770 may be removed. The passenger may then lie down on the mattress within the recess 764 with his or her head towards the front panel 714 and his or her lower legs extending into the foot-box 730. By orienting the unit at an angle of about 40-50 degrees, for example about 45 degrees to the direction of travel of the vehicle, an overall bed length of up to about 7 ft (2.13 meters) may be provided. The front screen 714 serves to protect the passengers' head whilst asleep, and the pedestal 760 provides a step-up into the passenger's personal space which many passengers find attractive. The shell above the foot-box may be shaped to provide a lateral seat extension 735 for the seat-pan 722 of a neighbouring seat and a generously proportioned occasional side-table 738 for use by the neighbouring seat.

Figure 25:
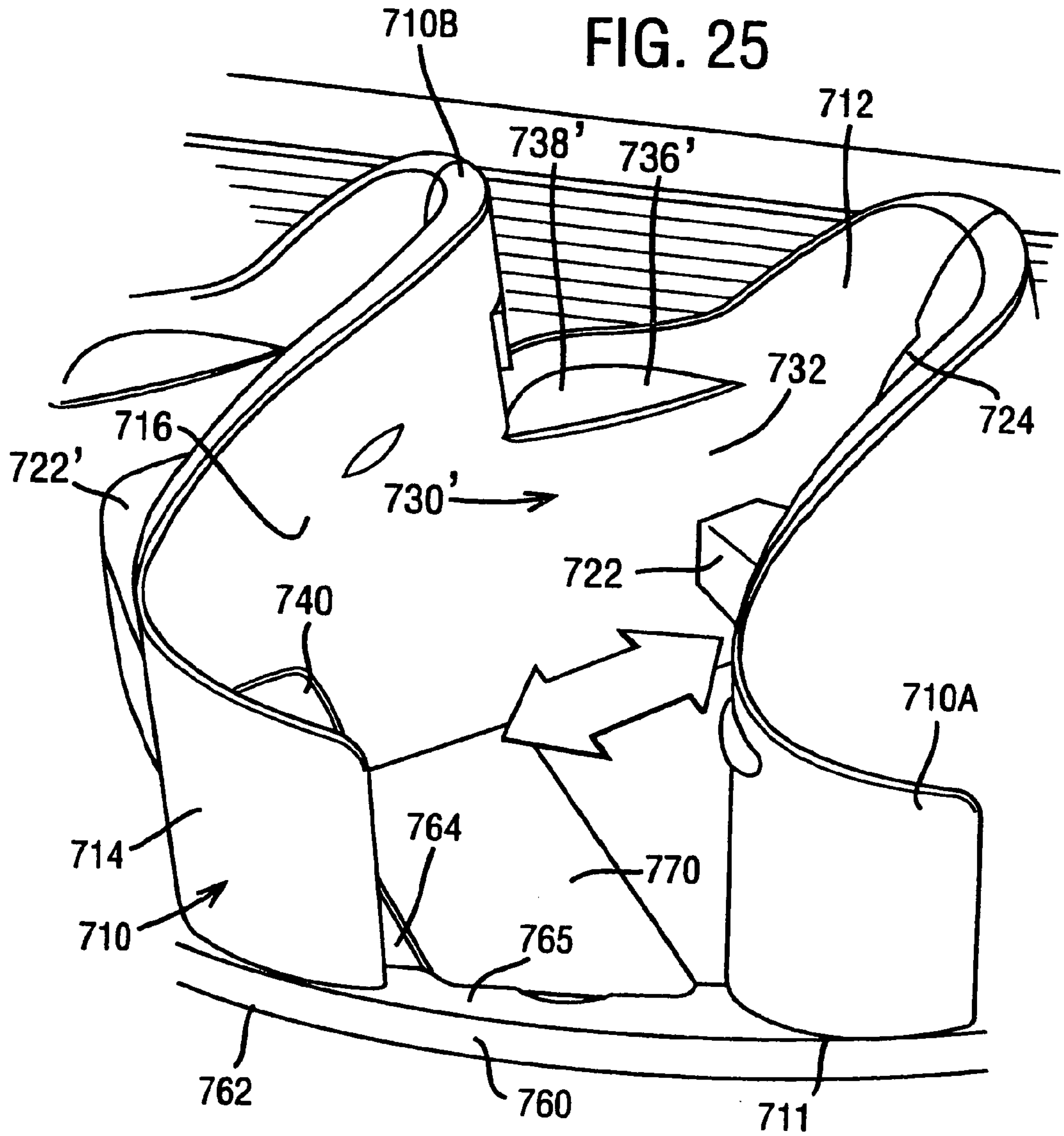
FIG. 25 is an isometric view of a variant of the passenger accommodation unit of FIGS. 22 and 23, which comprises a sliding seat-pan.
Figure 26A:
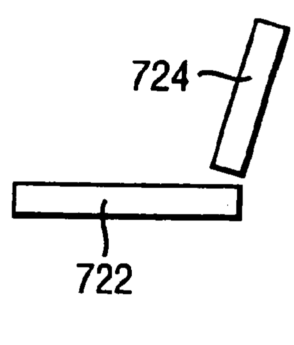
FIGS. 26A-26C show schematically in side elevation different positions of the sliding seat-pan.
Figure 26B:
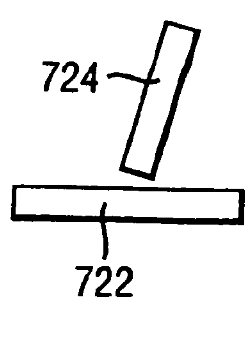
Figure 26C:
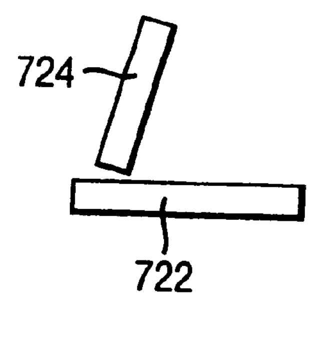

In a variant of the other accommodation unit of FIGS. 22-24, the seat-pan 722, instead of pivoting about its rear edge 723 to lie flat, in its stowed position, against the front surface of the backrest 724 may be arranged to slide relative to the shell 710 between a forward position as shown schematically in FIG. 26A and a retracted position as shown in FIGS. 25 and 26C. In the retracted position, the seat-pan 722, or at least a major proportion of the seat-pan 722 may be accommodated within the foot-box 730 at a position vertically spaced above the mattress. Various mechanisms suitable for achieving such sliding movement of the seat-pan 722 will be self-evident for those skilled in the art, for example linear bearings provided on the interior surfaces of the shell 710 adjacent to the seat-pan 722. Advantageously, the sliding mechanism may be provided with one or more detents (not shown) for selectively halting movement of the seat-pan 722 in at least one intermediate position such as that shown in FIG. 26B. Thus, in the fully extended position, as shown in FIG. 26A, the unit may be configured ergonomically for relaxing, whilst in the intermediate position as shown in FIG. 26B, the unit may be configured to provide a more upright passenger position which is suitable, for example, for dining or working. In the fully retracted position, the seat-pan 722 is substantially stowed to allow access to the foot-box 730 when the seat is in bed mode.

Figure 27:
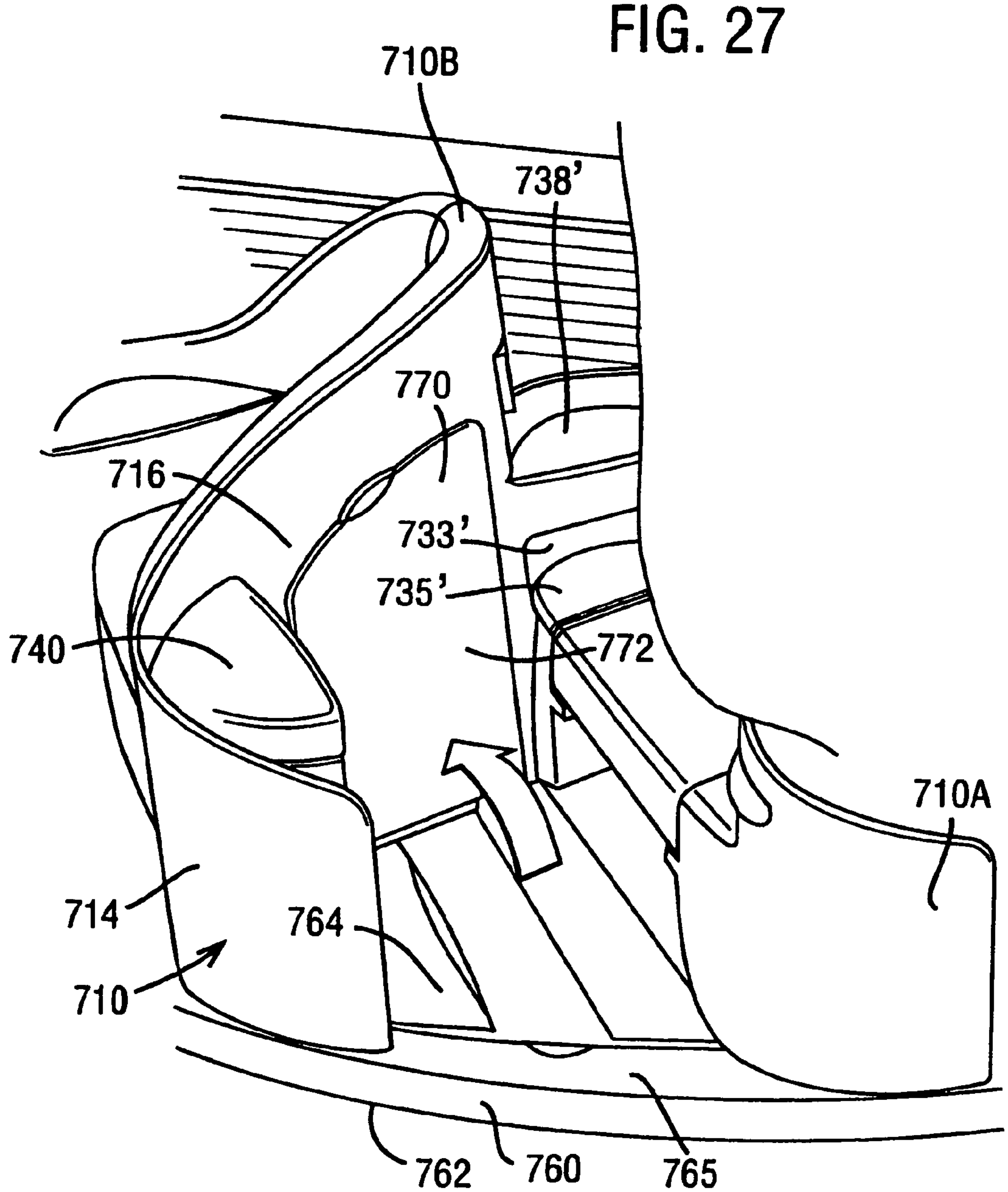
FIG. 27 is an isometric view showing a further variant of the passenger accommodation unit of FIGS. 22 and 23.

Another variant of the accommodation unit of FIGS. 22-24 is shown in FIG. 27 in which the removable false floor panel 770 is hinged to the interconnecting side wall 716 for movement between a deployed position in which it lies generally horizontally over the recess 764 to protect the mattress and a stowed position as shown in FIG. 27 in which it lies flat in a substantially vertical orientation against the interconnecting side wall 716. The underside 772 of the false floor panel 770 may be upholstered with suitable cushioning, such that together with the mattress 764, it provides a sofa-like arrangement; a passenger may sit sideways on the mattress 764 in the bed mode with his or her back-resting against the underside 772 of the panel 770.

Figure 28:
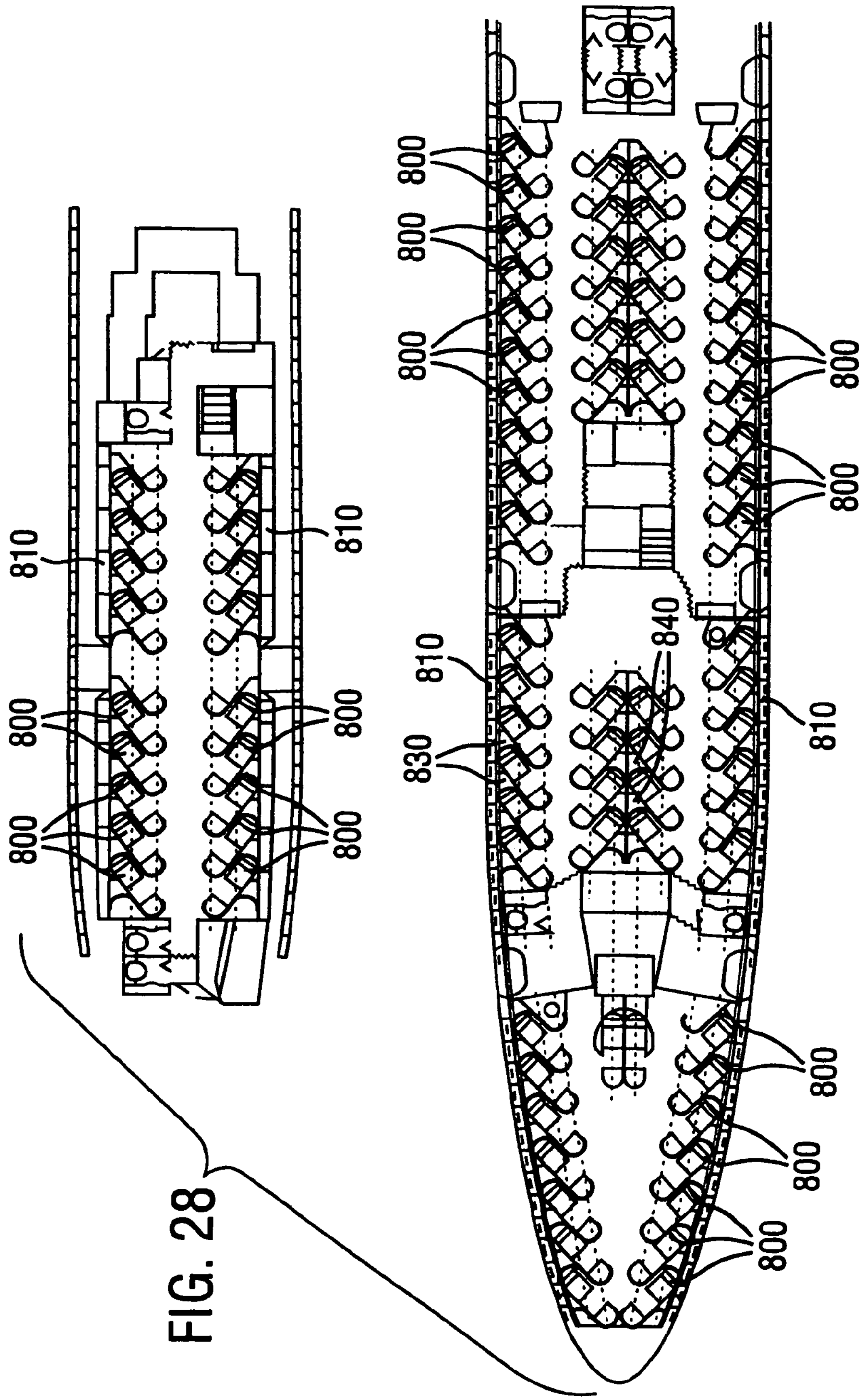
FIG. 28 is a schematic, sectional plan view of the upper and lower decks of a front portion of an aircraft fuselage, showing yet another seating system in accordance with the present invention as applied to the upper and main decks of a Boeing® 747-400 aircraft.

Yet another seating system in accordance with the present invention is illustrated in FIG. 28. The particular system of FIG. 28 is designed specifically for use on the upper and lower decks of a Boeing 747-400® aircraft, but the system may be adapted for use on any passenger aircraft, particularly in a business class cabin. The seating system of FIG. 28, on each of the upper and lower decks, comprises a plurality of passenger accommodation units 800 in accordance with the present invention, for example the accommodation units of FIGS. 18-21 or FIGS. 22-27. Each of said units 800 is positioned juxtaposed a cabin side wall 810 and is oriented at an angle of about 40-50 degrees, preferably about 45 degrees, to the longitudinal direction of the juxtaposed side wall 810, with the rear of the unit towards the wall 810, such that the seat faces generally inwardly of the cabin. By orienting units 800 to face inwardly, the cabin is given a less crowded appearance as compared with a cabin in which seats are aligned substantially fore-and-aft. Each unit has a generally triangular or trapezoidal extension box or space 830 between the rear of the unit and the juxtaposed cabin side wall 810. Generally, the walls of an aircraft cabin are concave on the interior, and accordingly the extension box or space 830 of each unit 800 extends into the concave recess defined by the wall to optimise the use of space in the cabin. Each unit 800 comprises means adapted to provide a bed as described above which extends into the extension box or space to maximise the available bed length.

In some aircraft floor plans, there may also be sufficient space to dispose one or more units towards the centre of the cabin, as shown for the lower deck of the Boeing® 747-400 in FIG. 28. In that embodiment, two central lines of units are provided in which each unit is oriented at an angle of about 45 degrees to the direction of travel of the aircraft. The central units 800 are arranged in pairs, with each seat facing generally forwardly and outwardly of the cabin, such that the two units of each pair diverge from one another in the forwards direction and define a generally quadrilateral space behind the units in front of the pair of units behind. Said quadrilateral space 840 accommodates an extension box or space associated with each unit 800 in order to provide an extended bed length for each unit. Where each unit 800 comprises a hollow foot-box of the kind described above with reference to FIGS. 18-21 and FIGS. 22-27, the top wall of each foot-box may be adapted to provide a convenient side-table or other furniture means for another unit.

Figure 29A:
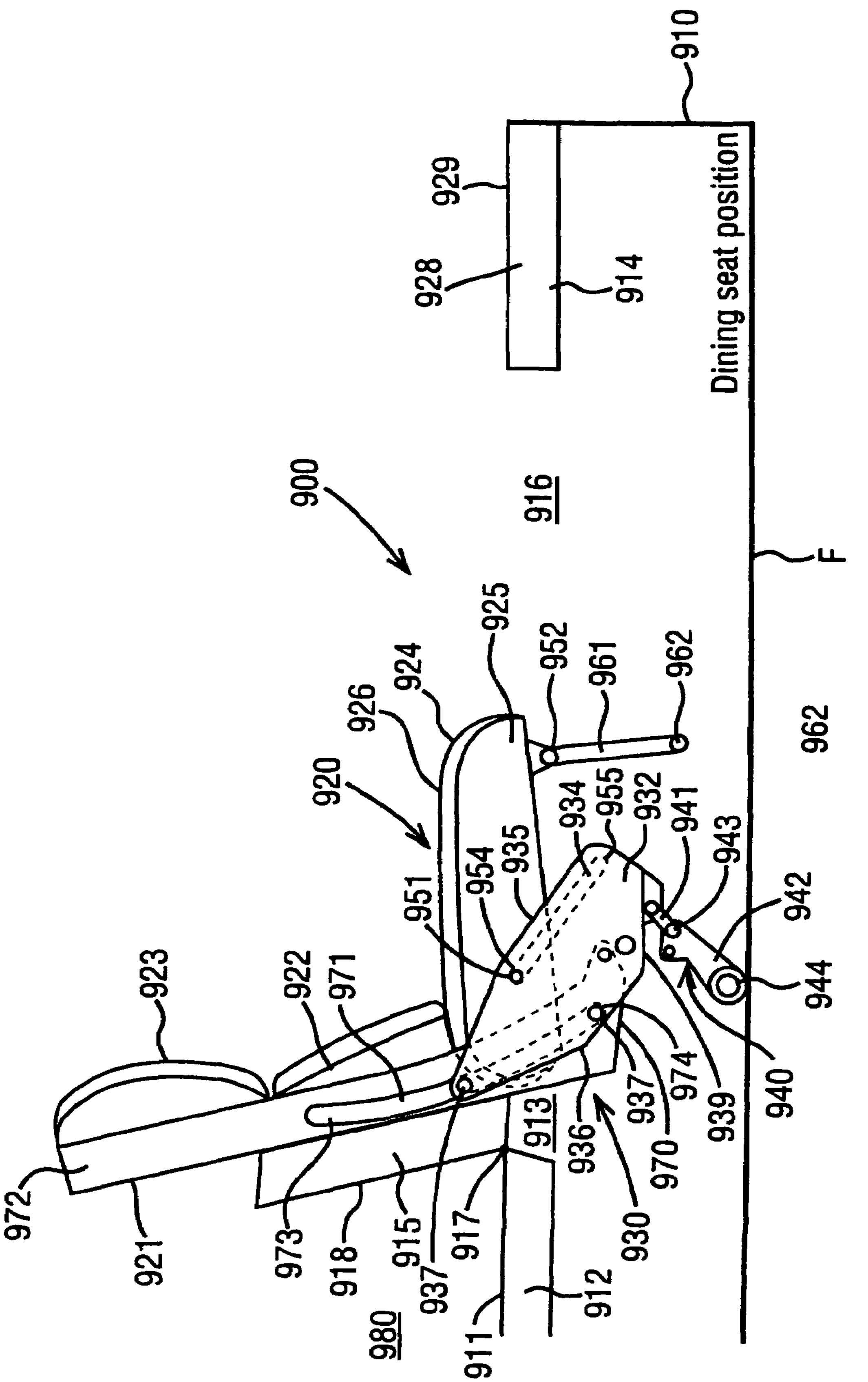
FIG. 29A is a schematic side elevation of a second passenger seat assembly according to the present invention, which seat assembly is shown in a dining position.
Figure 29B:
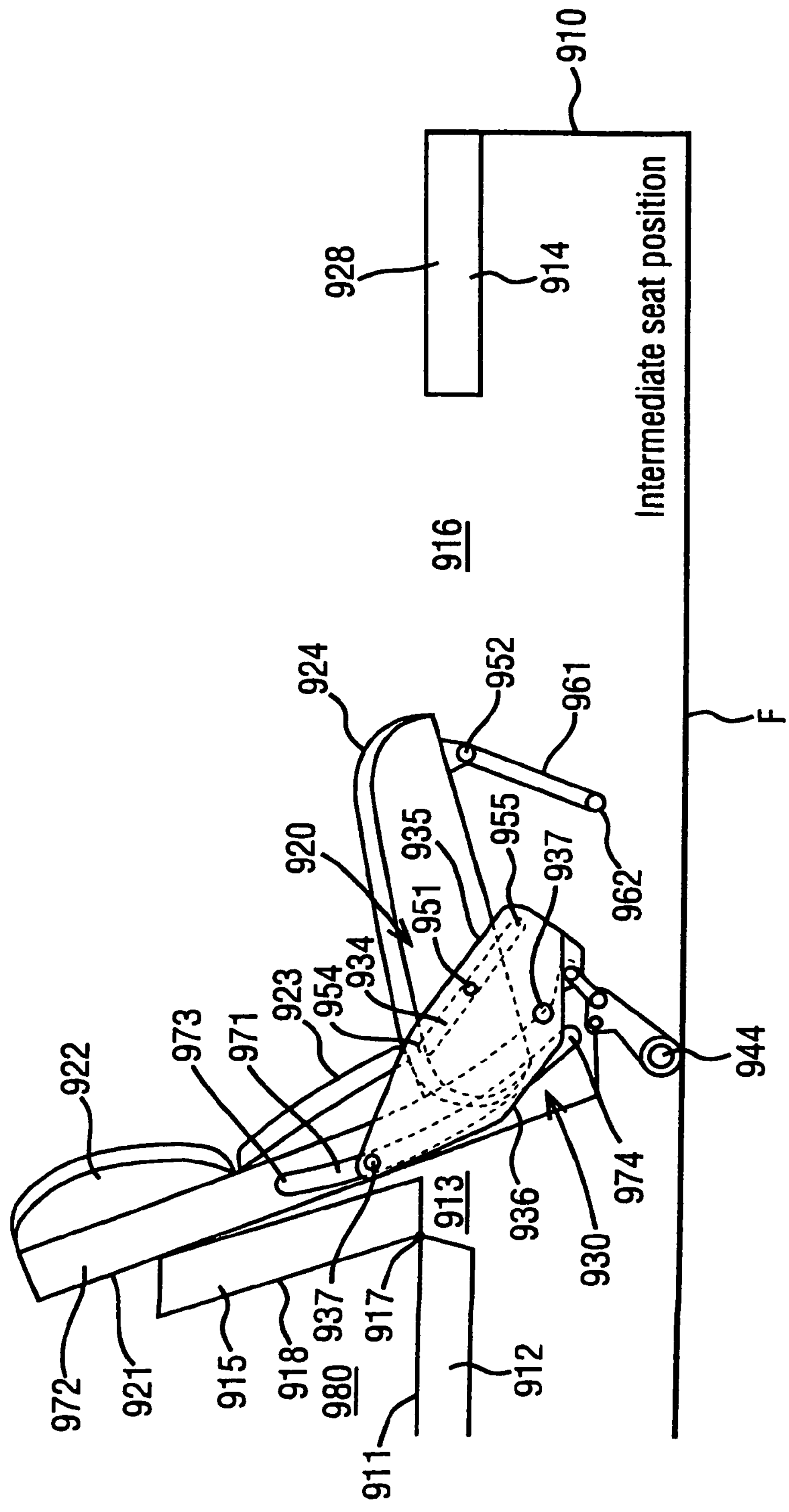
FIG. 29B is a schematic side elevation of the second passenger seat assembly of FIG. 29A, shown in an intermediate reclined position.
Figure 29C:
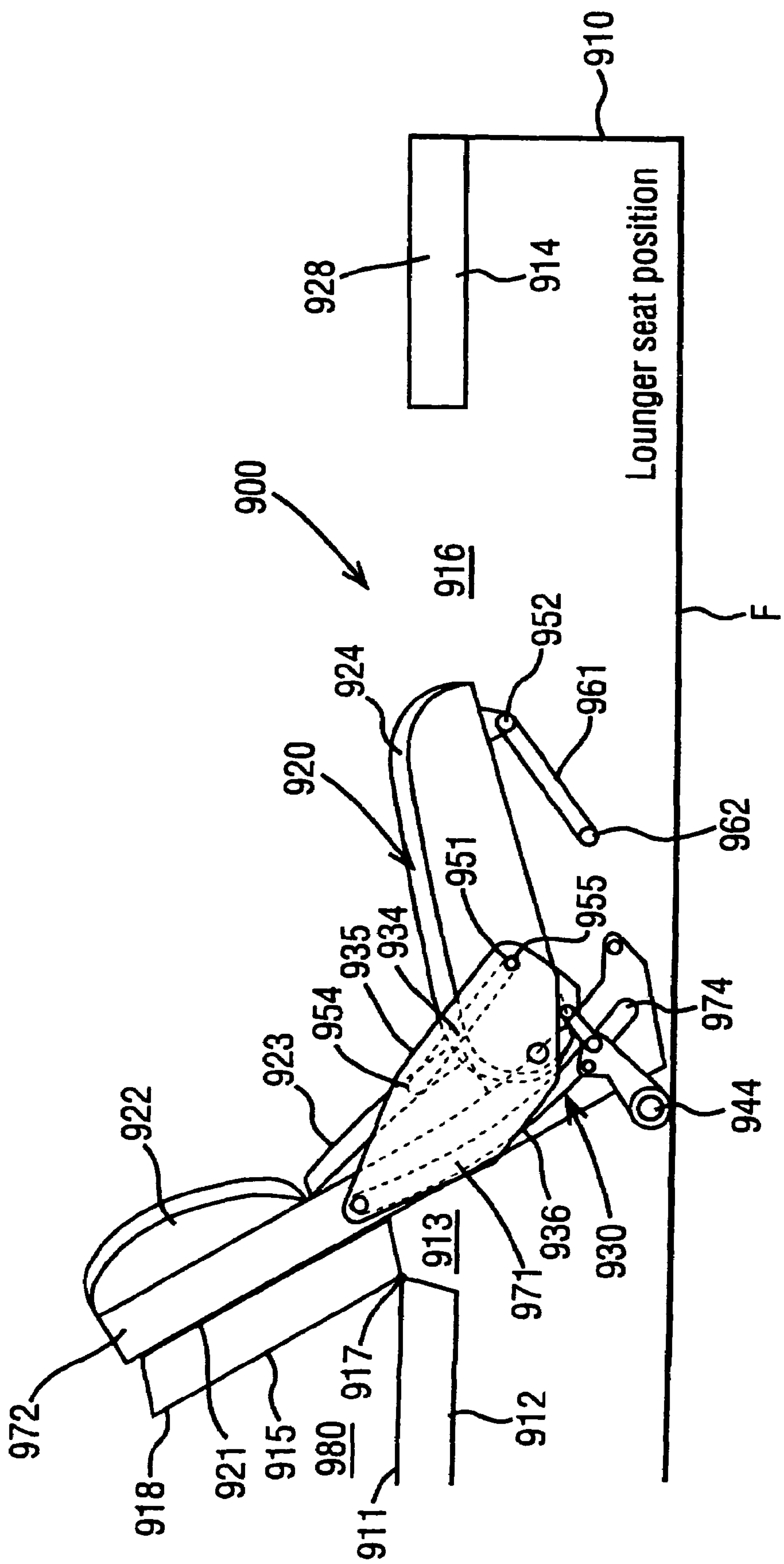
FIG. 29C is a schematic side elevation of the second passenger seat assembly of FIGS. 29A and 29B in a fully reclined position.

With reference to FIGS. 29A to 29C, a second passenger seat assembly 900 for a passenger vehicle such, for example, as an aircraft, in accordance with the present invention comprises a fixed, supporting structure, generally indicated by reference numeral 910 for supporting the seat assembly of the floor F of the vehicle. Said supporting structure 910 comprises means suitable for attaching the seat assembly to the floor. For instance, where the seat assembly 900 is to be installed on aircraft, said supporting structure 910 typically comprises one or more fixings for attaching the seat assembly to seat tracks of the kind commonly found in the floor of an aircraft cabin. As with the seat units 40 of FIGS. 1-2 or the first seat assembly of FIGS. 3-5, the supporting structure of the second seat assembly 900 may comprise a plinth or palette (not shown) for attachment to said seat tracks. Said supporting structure 910 further comprises two elevated, passenger-supporting members 912, 914, each of which has a generally flat, substantially horizontal upper surface (subject to compensation for the slight incline of the aircraft in flight). Said passenger supporting members 912, 914 are spaced apart to define a cavity 916 within the supporting structure.

Said supporting structure 910 can be made of any suitable, aircraft grade structural materials known to those skilled in the art. Said supporting structure may be generally skeletal or may comprise one or more solid walls. Typically, said supporting structure is made from a light-weight composite material, but the aforementioned fixings for securing the supporting structure to seat tracks in an aircraft or other floor may comprise one or more reinforcing beams or plinths of light steel or aluminium.

Said cavity 916 accommodates a passenger seat, generally indicated by reference numeral 920. Said passenger seat 920 is generally supported by the supporting structure 910 and comprises a back-rest element 922 and a seat-pan element 924. Said back-rest and seat-pan elements 922 and 924 are connected to the supporting structure 910 by a seat movement mechanism, generally indicated by reference numeral 930.

Said seat movement mechanism 930 comprises two similar, irregularly shaped, polygonal plates 932 that are mounted to either side of the seat 920. It will be appreciated that as FIGS. 29A to 29C are side elevations, only one of said plates 932 can be seen. Each polygonal plate 932 is formed with a generally linear, elongate slot 934 juxtaposed one edge 935 of the plate. Juxtaposed an opposing edge 936, said plate 932 carries two spaced, inwardly directed lugs 937. A straight line between lugs 937 subtends an acute angle with said linear slot 934. Juxtaposed a further edge 939 of said plate 932, which further edge extends generally transversely between said one and opposing edges 935, 936, said plate 932 is connected to one end of a two part linkage device 940. Said linkage device 940 comprises a first member 941 that is pivotally connected to said plate 932 and a second member 942 that is pivotally connected at one end to first member 941 to form a "knee" joint 943 and is connected at another end to a fixed pivot point 944 on said supporting structure 910.

Said seat movement mechanism comprises means for linking the seat-pan to the back-rest such that the lower end of the back-rest remains contiguous to the rear end of the seat-pan, whilst allowing said seat-pan and back-rest to pivot relative to each other.

Said linear slot 934 has upper and lower extremities 954, 955 and accommodates slidingly a lug member 951 that protrudes from the respective side of the seat-pan 924. Juxtaposed its forward end 925, said seat-pan 924 is pivotally connected to each side, at pivot point 952, to one end of a linear strut 961. Said linear strut 961 is pivotally connected at its other end 962 to a carriage member (not shown) that is connected to the supporting structure 910 beneath the seat-pan 924.

Figure 30A:
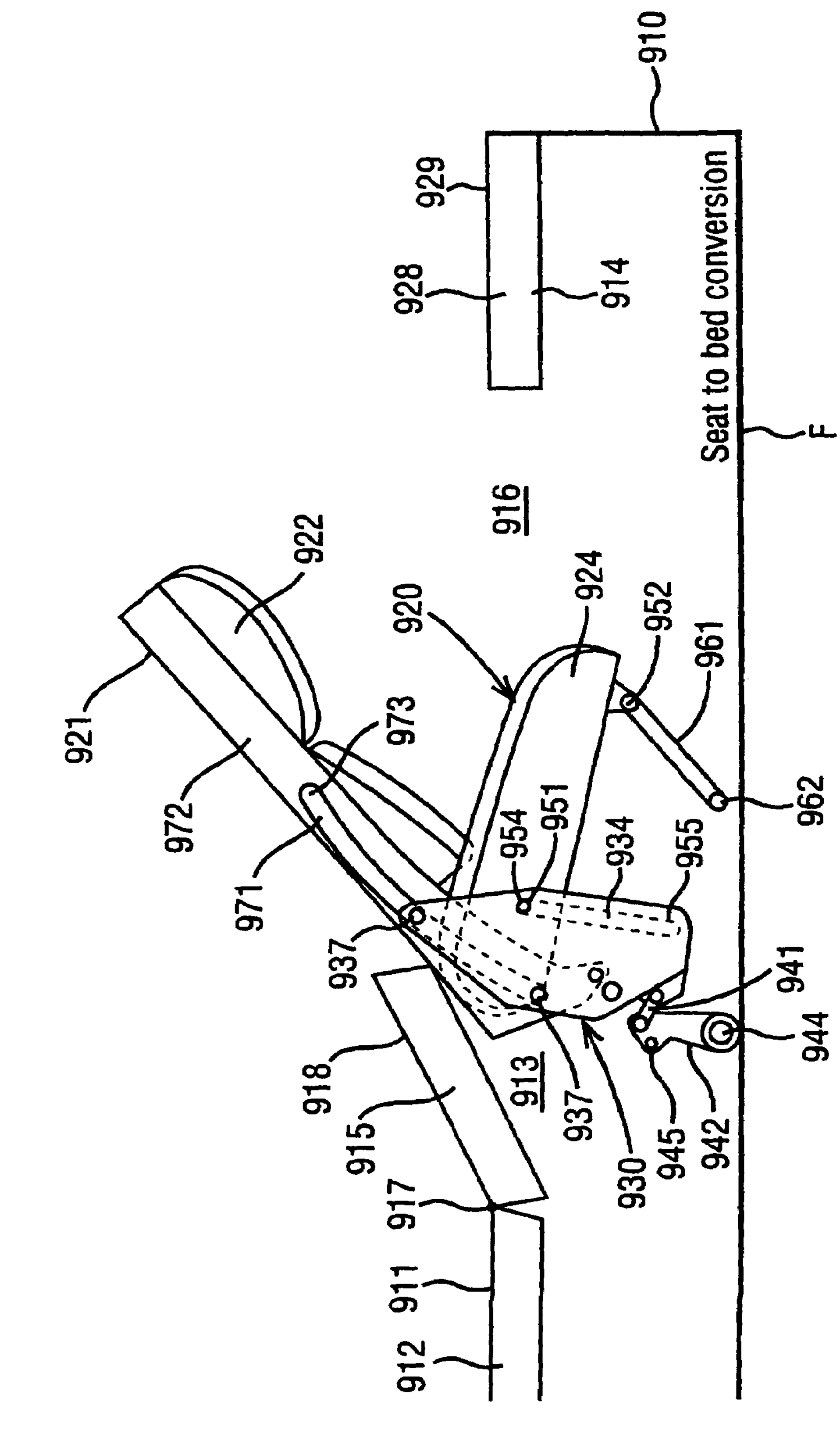
FIG. 30A is a schematic side elevation of the second passenger seat assembly of FIGS. 29A to 29C in another intermediate conversion position.
Figure 30B:
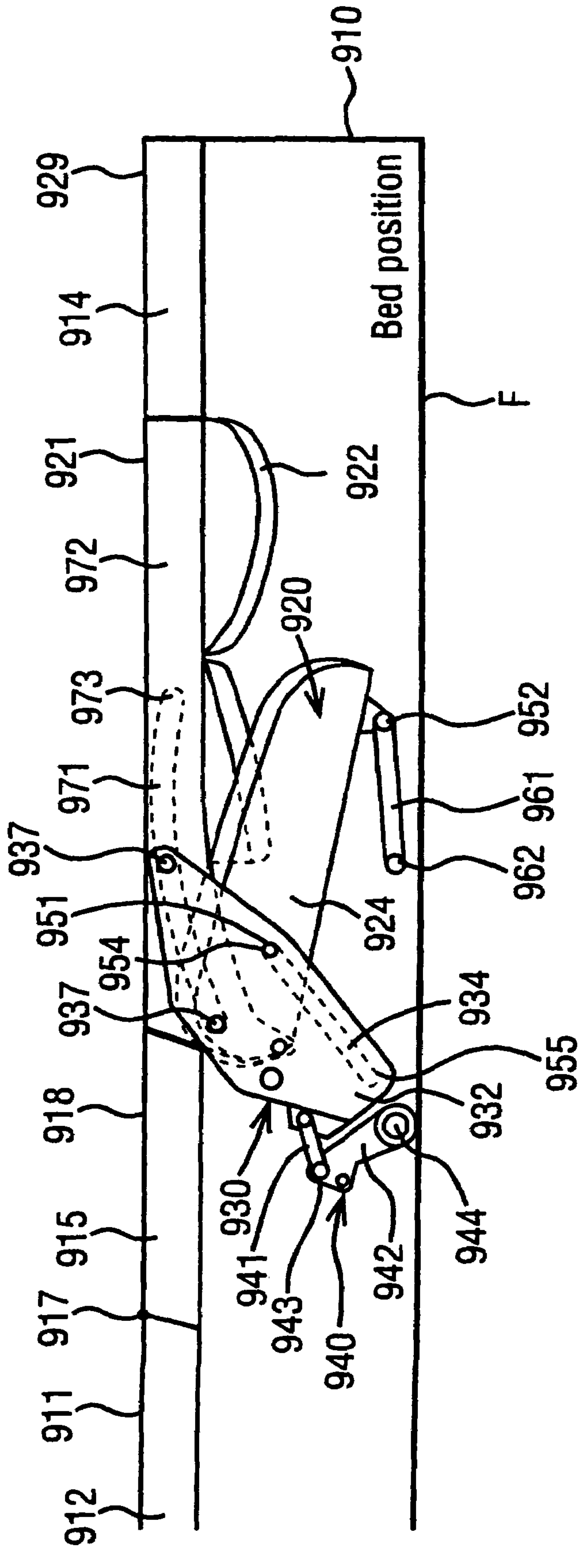
FIG. 30B is a schematic side elevation of the seat assembly of FIGS. 29A to 29C and FIG. 30A in a bed configuration.

Said carriage member is movably mounted to the supporting structure 910 such that the carriage member can move between an upper position corresponding to FIGS. 29A to 29C and lower position corresponding to FIGS. 30A and 30B. Suitable biasing means such, for example, as springs, gas struts or the like, are provided for biasing the carriage member into the upper position. Selectively releasable mechanical locking means are also usually provided for locking the carriage means member in its upper position.

Said linear strut 961 is rockably mounted to the carriage member such that it can rock between a generally upright position as shown in FIG. 29A and a forwardly reclined position as shown in FIG. 29C.

Said spaced lugs 937 on the polygonal plate 932 engage in a curvilinear track 971 that is fixedly secured to the respective side of the backrest 922. As can be seen from FIGS. 29A to 29C and 30A to 30B, said curvilinear track 971 is conveniently formed in an elongate plate member 972 that is attached to the side of the back-rest. Said curvilinear track 971 has upper and lower extremities 973, 974 respectively.

With reference to FIG. 29A, when said seat 920 is disposed in an upright or "dining" position, the two-part linkage device 940 is an extended configuration such that the first and second members 941, 942 are generally co-linear with one another, and both of said first and second members 941, 942 extend generally upwardly and forwardly from said pivot point 944. Said plate 932 extends rearwardly of its point of attachment to the first link member 941 and is oriented such that said linear slot 934 extends upwardly and rearwardly. The back-rest portion 922 is in an upright position, and the spaced lugs 937 are disposed at the lower extremity of the curvilinear track 971. The seat-pan is oriented substantially horizontally, (in flight) and the lug 951 is disposed at the upper extremity 954 of the linear slot 934. The carriage member (not shown) is disposed in its upper position as described above, and the rockable linear strut 961 is oriented generally vertically. The seat-pan 924 is thus positioned rearwardly within the cavity 916 between the two passenger supporting members 912, 914.

Said seat-pan 924 has an upper surface 926 that is suitably upholstered for use as a seating component. Similarly, said back-rest element 922 has a front surface 923 that is suitably upholstered as a seating component. Preferably, the forward surface 923 of the back-rest element is dressed to match the upper surface 926 of the seat-pan element 924. One of said passenger supporting members 914 is positioned forwardly of the seat 920 and serves as a fixed leg-rest portion 928. Said leg-rest portion 928 has an upper surface 929.

Said linear strut 961 is operably connected to a selectively operable locking motor drive (not shown) which is capable of driving the strut 961 to rock about its upper end 962, as described above, between the upright position of FIG. 29A and the forwardly inclined position of FIG. 29C. Suitable user controls (not shown) are provided in the seat assembly to enable a passenger using the seat to operate said locking drive.

Said back-rest portion 922 has a rear surface 921 that is generally planar. Said rear surface 921 is spaced from the passenger supporting member 912 by a small gap 913 when the seat is upright as shown in FIG. 29A. Said rear surface 921 carries a mattress portion (not shown) for use as part of a bed, which mattress portion is attached to the rear surface 921 of the backrest portion 922 such that when the back-rest is upright, the mattress portion does not detach. Said passenger supporting member 912 also has an upper surface 911 which carries a mattress portion. A movable infill passenger supporting member 915 is pivotally connected to a forward, transverse edge 917 of said passenger supporting member 912. Said infill member 915 is generally rectilinear and has an upper surface 918 which has a generally flat upper surface 918 which carries a mattress portion (not shown). Said infill member 915 is slidably connected to the rear surface 921 of the back-rest element 922. As seen in FIG. 29A, in the upright position, the infill member 915 extends generally upright between the fixed passenger supporting member 912 and the back-rest element 922 of the seat 920 in said gap 913.

In addition to the locking drive motor for driving the linear strut 961, a further selectively operable motorised drive is provided for rocking the second link member 942 of said two-part linkage device 940 rearwardly about the fixed pivot point 944. Said second link member 942 comprises a rearwardly extending knuckle portion 945 (see FIG. 30A) for connection to said other drive motor (not shown).

Said user controls may also be adapted to operate said mechanical locking means to release the seat-pan from its upper position simultaneously with operation of said second drive.

When the seat is upright as shown in FIG. 29A, the seat may be reclined by operating the locking drive motor to rock the linear strut 961 forwardly about its other end 962, whilst the carriage member (not shown) supporting the linear strut 961 is retained in its upper position. By rocking the linear strut 961 forwardly, the seat-pan element 924 of the seat is pulled forwardly within the cavity 916, and the lug 951 slides along said slot 934 from said upper extremity 954 towards said lower extremity 955. Forward movement of the seat-pan also causes the lower end of the back-rest 922 to move forwardly. The back-rest portion is constrained to move along a predetermined path by the engagement of the lugs 937 within the curvilinear track 971. The track 971 is shaped to cause the back-rest 922 to recline rearwardly progressively as the seat-pan moves forward.

As the seat is reclined, the lugs 937 move along said curvilinear track 971 through an intermediate position as shown in FIG. 29B and two of the lugs 937 abut the upper extremity 973 of the curvilinear track 971, at which point no further movement of the seat is possible, and the seat is in a reclined or "lounge" position as shown in FIG. 29C. It will be appreciated that the locking action of the locking drive motor allows the seat to be stopped and locked at any desired intermediate position between the two extreme positions represented by FIGS. 29A and 29C.

When a passenger using the second seat assembly 900 in accordance with the present invention wishes to go to sleep, the seat assembly can be converted into a bed. The passenger operates the user controls to release the seat-pan from its upper position and to cause the second motorised actuator to rock the second link member 942 of the linkage device 940 rearwardly about said pivot point 944 as shown in FIG. 30A. As the second link member 942 is rocked rearwardly, the knee joint between the first and second link members 941, 942 is broken allowing the first link member 941 to rock forwardly and downwardly about the knee joint 943 which, in turn, causes the polygonal plates 932 to rock forwardly and downwardly, thereby causing the back-rest element of the seat 920 to move forwardly within the cavity 916 and to pivot forwardly from its upright position. As the back-rest element 922 pivots forwardly, it pushes downwardly on the seat-pan portion 924 which is thus caused to move downwardly on said carriage member (not shown) against the action of the biasing means. Continued rearward movement of the second linkage member 942 causes the polygonal plates 932 and back-rest element 922 to move downwardly towards the floor F of the vehicle until, as shown in FIG. 30B, the rear surface 921 of the back-rest element 922 is disposed substantially horizontally (in flight) and co-planarly with the passenger supporting members 912, 914. The linkage member 940, polygonal plate 932, curvilinear tracks 971 and lugs 937 are arranged such that in the bed configuration as shown in FIG. 30B, the upper end of the back-rest element 922 abuts the rear edge of the forward passenger supporting member 914 to form a continuous surface therewith. Suitable, releasable locking means are provided for locking the back-rest 922 in the end position.

Furthermore, as seen most clearly in FIG. 30A, as the back-rest element 922 rocks forwardly and moves translationally forwards within the cavity 916, the infill and member 915 slides along the rear surface 921 of the back-rest element and is caused or allowed to pivot forwardly until, as shown in FIG. 30B, when the back-rest element is disposed substantially horizontally, the infill member 915 forms a bridge between the passenger supporting member 912 and the rear surface 921 of the back-rest element 922, such that the upper surfaces 911, 918, 921 of the passenger supporting member 912, infill member 915 and back-rest element 922 are substantially co-planar and form a continuous surface. It will be appreciated that the mattress portions carried by the passenger supporting member 912, infill member 915 and rear surface 921 of said back-rest 922 form an elongate mattress for the passenger to sleep on. Furthermore, the upper surface 929 of the passenger supporting member 914 forwardly of the seat 920 may also carry a mattress portion which further extends the bed formed by the seat in the bed configuration of FIG. 30B. The seat assembly in accordance with the present invention allows a continuous bed surface to be formed having a length of at least 78-80 inches (1.98-2.032 meters). In some cases, the bed formed by the upper surfaces 911, 918, 921, 929 of the passenger supporting members 912, 914, infill member 915 and rear surface 921 of the back-rest element 922 may have a length in excess of 85 inches (2.16 meters).

In order to return the seat assembly 900 to a seat configuration, the second motor drive is actuated to rock the second link member 942 of the two part linkage device 940 forwardly about said fixed pivot point 944, thereby causing the first link member 941 to rock rearwardly which, in turn, causes the polygonal plates 932 to rock rearwardly and move upwardly, restoring the back-rest element 922 progressively to its upright position. As the back-rest element 922 returns to the upright position, the seat-pan element 924 is allowed to return to its upper position on the carriage member (not shown) under the influence of said biasing means (also not shown). When the seat-pan is returned to its upper seat position, the mechanical locking means are automatically re-engaged to retain the seat in its upper position.

As will be appreciated from inspection of FIGS. 29A to 29C, the upper surface 911 of said passenger supporting member 912 and upper surface 918 of said infill member 915, when the seat assembly is configured in a seat configuration, form a convenient recess 980 to the rear of the seat 920. Said recess 980 is at least partially concealed from view by the back-rest portion 922 of the seat 920. Thus, said recess 980 may be used for a storage, for example of bedding materials such as pillows, duvets, and the like. When the seat assembly is moved to the bed configuration of FIG. 30B, the bedding materials can be easily accessed by a passenger and deployed upon the bed surface that is formed by the components of the seat assembly as described above.

A further advantage of the passenger seat assembly 900 as hereinbefore described is that the front surface 923 of said back-rest element 922 and upper surface 926 of the seat-pan element 924 can be upholstered and covered specifically for use as seating components. Thus, for example, the back-rest element and seat-pan element 922, 924 may carry foam padding layers that are sculpted particularly for use as seating members. The texture, patterns and/or colourways of the upholstery and dressing materials used for covering the front surface 923 of the back-rest element and upper surface 926 of the seat-pan element may be selected specifically for use as seating materials. Conversely, the mattress portions carried by the passenger supporting member 912, infill member 915 and rear surface 921 of back-rest element 922 may be specifically adapted for use as bedding materials. Thus, interior sprung mattress portions or foam padding layers may be used which are specifically shaped for maximum passenger comfort when the seat is used as a bed. In particular, the materials and fabrics used to dress the mattress portions may have textures, colours, etc. that are particularly suitable for use as bedding materials. The bedding materials used to dress the mattress portions and the materials used to dress the seating portions of the seat assembly may have quite different appearances from one another. However, as will be appreciated, when the seat is configured for use as a seat, the bedding materials are largely concealed by the back-rest element 922, leaving visible only those parts of the seat that are used actually form part of the seat. Similarly, when the seat is reconfigured for use as a bed, the front surface of the back-rest element and upper surface of the seat-pan element are substantially concealed from view, leaving visible only the bedding materials comprising the mattress portions on the passenger supporting component 912, infill member 915 and rear surface 921 of the back-rest element 922.

Where a plurality of passenger seat assemblies in accordance with the present invention are installed in a vehicle cabin, for example, on an aircraft, they can be used to give the aircraft cabin two different visual appearances or ambiances according to whether a majority of the seat assemblies are disposed in a bed configuration or a seat configuration. Thus, during a daytime flight, or during a daytime portion of a long haul flight, a majority of passenger seat assemblies may be arranged in a seat configuration as per one of FIGS. 29A to 29C. The bedding materials will be substantially concealed, leaving visible only the seating surfaces of the assemblies. The seat assemblies may, of course, be dressed in any desired design, but, for example, seat assemblies may be upholstered and dressed to give the cabin the appearance of a private members club environment. For instance, the upper surface 926 of the seat-pan element 924 and front surface 923 of the back-rest element 922 may be upholstered in leather. During a night-time flight or during the night-time portion of a long haul flight, a majority, or all, of the seat assemblies may be configured in a bed configuration as per FIG. 30B, in which case, the seating portions of the assemblies will be substantially concealed, leaving visible only the bedding materials carried by the upper surfaces 911, 918, 921, 929 of the passenger supporting members 912, 914, infill member 915 and back-rest element 922. The materials used to dress the mattress portions may have a significantly "softer" appearance than the materials used to dress the reverse seating side of the back-rest element 922, in order to give the passenger cabin an attractive, restful ambiance that is appropriate for sleeping.

Figure 31:
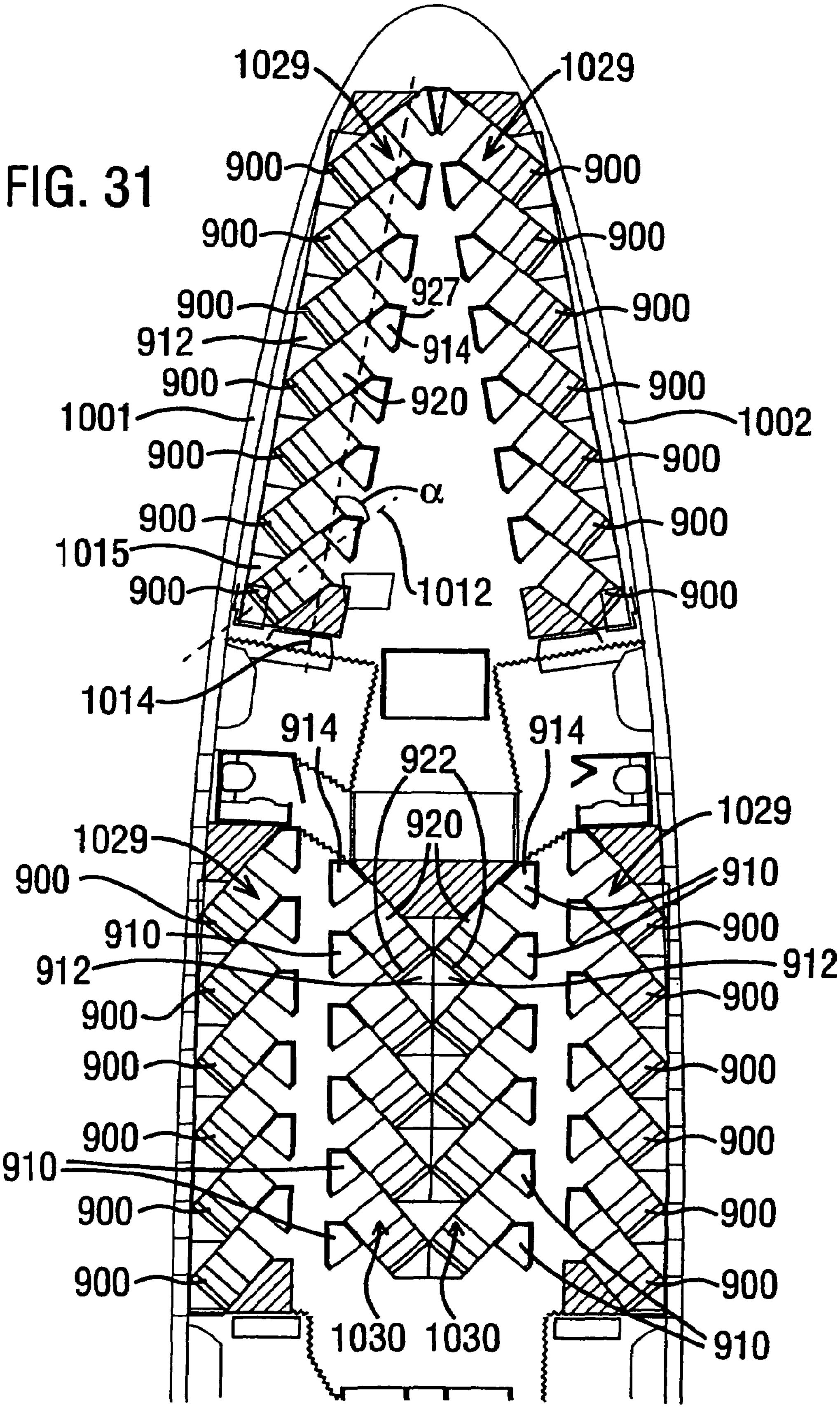
FIG. 31 is a schematic plan view of yet another seating system comprising a plurality of passenger assemblies in accordance with the present invention.
Figure 32:
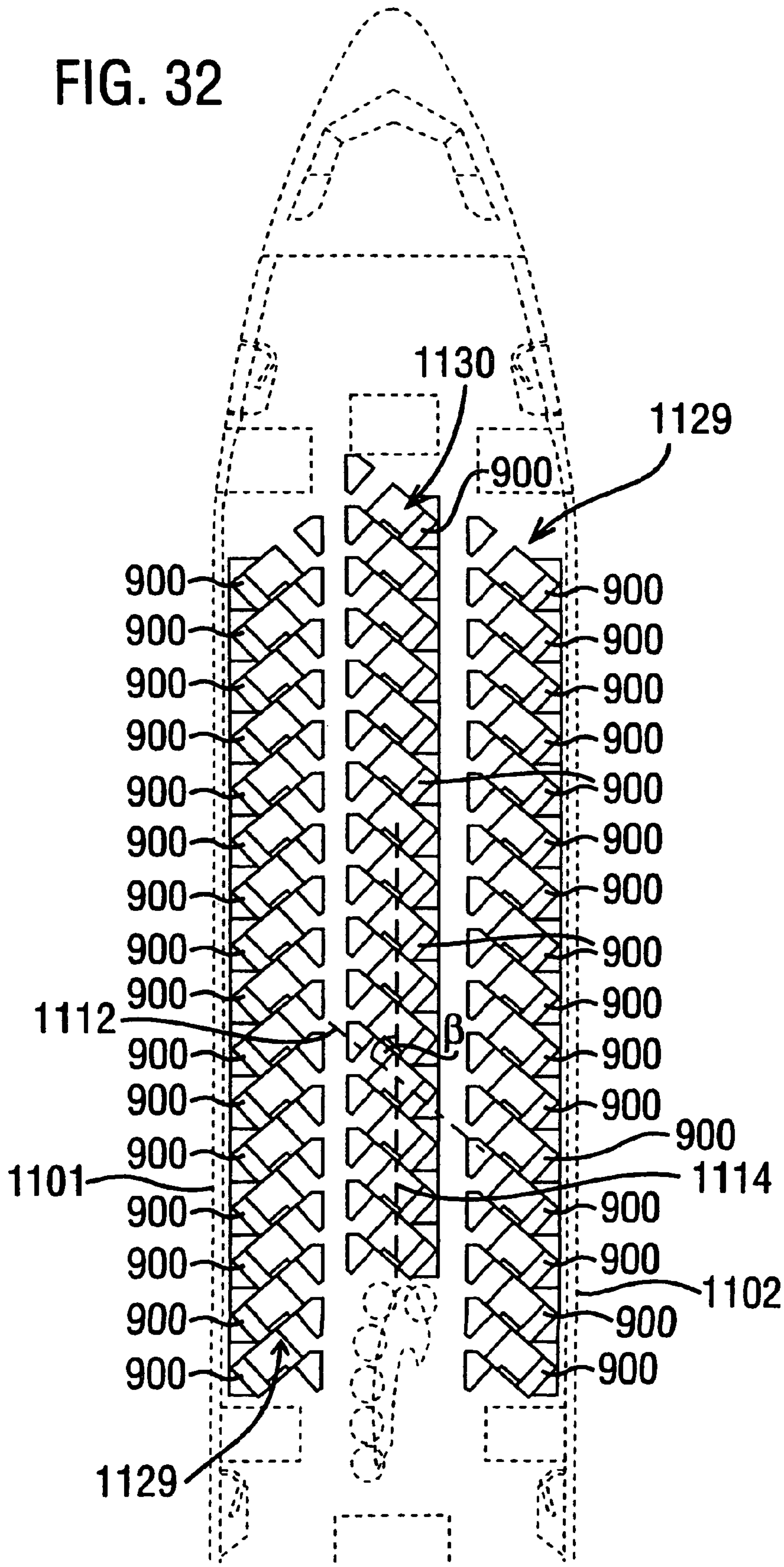
FIG. 32 is a schematic plan view of yet another seating system comprising a plurality of passenger seat assemblies according to the present invention.

FIGS. 31 and 32 show respectively two different seating systems, each comprising a plurality of seat assemblies of the kind hereinbefore described with reference to FIGS. 29-30. In FIG. 31, an aircraft cabin is defined inter alia by two opposing curvilinear walls 1001, 1002. As is well known to those skilled in the art, each of said walls 1001, 1002 is generally concave on its internal surface. Juxtaposed each of said walls 1001, 1002 is provided a column 1029 of passenger seat assemblies 900 in accordance with the present invention. Each seat assembly 900 defines a notional longitudinal axis indicated by reference numeral 1012 in respect of a representative one of the seat assemblies 900. The seat assemblies 900 are oriented at an acute angle with respect to the adjacent cabin wall 1001, 1002. FIG. 31 also shows, in juxtaposition with wall 1001, a notional "forwards" axis 1014. It will be appreciated that towards the front of the aircraft, the "forwards" axis 1014 may not, in fact, be oriented precisely forwards with respect to the direction of travel of the aircraft, but is oriented substantially parallel to the fore-aft direction of the adjacent side wall 1001, ignoring the slight curvature of that side wall 1001. Each of said passenger seat assemblies 900 is oriented to define an angle α of about 40° between the notional, longitudinal axis 1012 of the seat assembly and the notional "forwards" axis 1014 of the aircraft cabin. Each seat assembly is positioned such that the passenger supporting member 912 is disposed adjacent the juxtaposed cabin wall 1001, 1002, such that the passenger supporting member 912 extends into the recess defined by the concave nature of said side wall 1001, 1002. The seat 920 is positioned facing forwardly and inwardly with respect of the cabin, and a low privacy screen 927 is formed around the forward end of the passenger supporting member 914, so as to define a personal passenger space around each seat assembly. By positioning each seat assembly such that the passenger supporting member 912 extends into the recess defined by the concave side wall 1001, 1002, maximum use is made of the space available in the aircraft cabin. As will be appreciated, the passenger supporting member 912 is only used by a passenger when the seat is arranged in a bed configuration, and thus, full-height head room is not required above passenger supporting member 912.

Suitable privacy screens may be provided between adjacent seats, and as shown in FIG. 31, a space 1015 adjacent each seat assembly and behind the passenger supporting member 912 of the neighbouring seat assembly may be used to provide a seat-height surface for use as a cocktail table or the like.

Where cabin space permits, one or more central columns 1030 of seat assemblies 900 may be installed in addition to columns of seat assemblies 900 juxtaposed the cabin walls 1001, 1002. FIG. 31 shows a cabin installation in which two central columns of seat assemblies 1030 are installed. Within each central column 1030, the seat assemblies 900 are arranged, as described above, at an acute angle to the fore-aft axis of the aircraft cabin. The seat assemblies 900 are also arranged in rows of two and, within each row, the seat assemblies are arranged back-to-back so that the passenger supporting members 912 of adjacent seats within the same row are disposed contiguously to one another and, when the seats are in a seating configuration, are substantially concealed from view by the juxtaposed back-rest elements of the seat 920.

FIG. 32 shows a seating system suitable for a different aircraft comprising three columns 1129, 1130 of seat assemblies 900, comprising two columns 1129 that are disposed respectively juxtaposed the two longitudinal walls 1101, 1102 of the cabin and a single, central column. As with the installation shown in FIG. 31, the seat assemblies 900 in each column 1129, juxtaposed one of the cabin walls 1101, 1102 are oriented such that the seats face forwards and inwards with respect to the cabin. The seat assemblies within the central column 1130 are also arranged to face forwards and to one side. Each seat assembly defines an acute angle β of about 49° between the notional longitudinal axis 1112 of the seat assembly 900 and the fore-aft axis 1114 of the cabin.

Figure 33A:
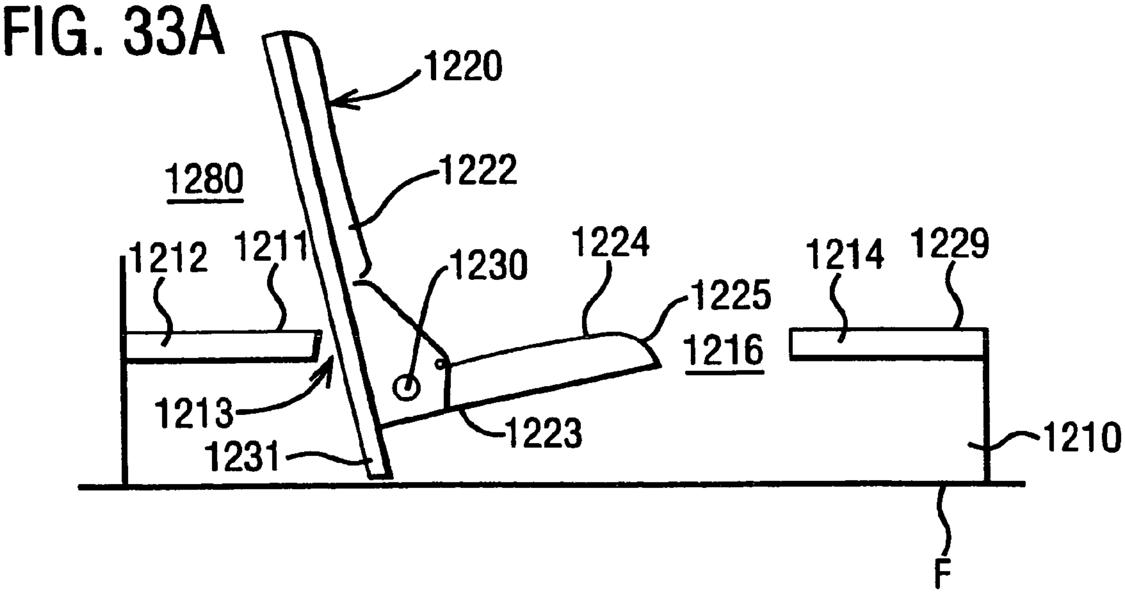
FIG. 33A is a schematic side elevation of a third passenger seat according to the present invention, which seat assembly is shown in a seat configuration.
Figure 33B:
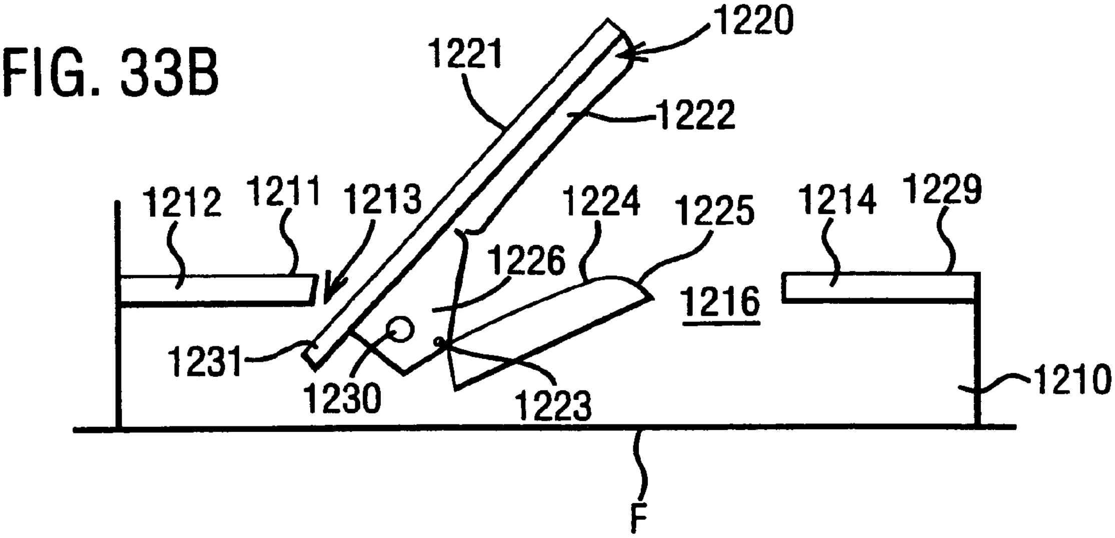
FIG. 33B is a schematic side elevation of the third seat assembly of FIG. 33A, shown in an intermediate position.
Figure 33C:
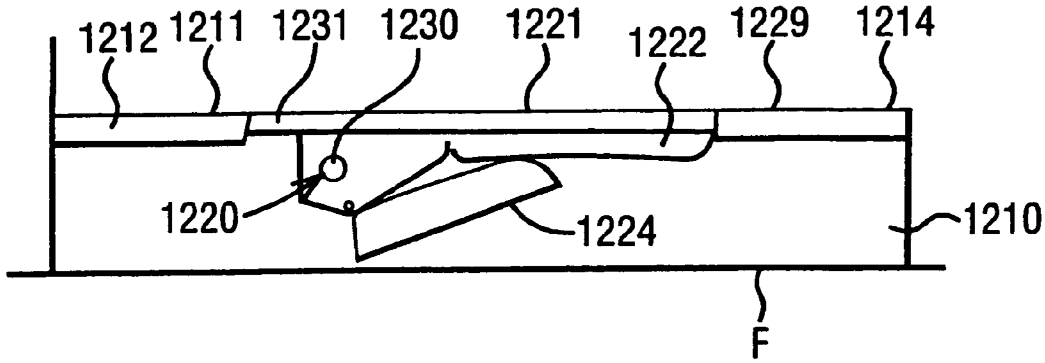
FIG. 33C is a schematic elevation of the third assembly of FIGS. 33A and 33B in a bed configuration.

FIGS. 33A to 33C show a third passenger seat assembly according to the present invention. For components of the third seat assembly of FIGS. 33A to 33C that are similar to corresponding components of the assembly of FIGS. 29A to 29C and FIGS. 30A and 30B, corresponding reference numerals are used, but with the prefix "12" instead of "9". Thus, the supporting structure 1210 of the third seat assembly of FIGS. 33A to 33C corresponds to supporting structure 910 of the second seat assembly of FIGS. 29A to 29C.

The third seat assembly according to FIGS. 33A to 33C comprises a supporting structure generally indicated by reference numeral 1210, for supporting the assembly off the floor F of a vehicle floor such, for example, as the floor of an aircraft cabin. Similar to the second seat assembly of FIGS. 29 and 30 described above, the third seat assembly of FIGS. 33A to 33C comprises two elevated, auxiliary passenger-supporting elements 1212, 1214 that are spaced apart and oppose one another to form a cavity 1216 within the supporting structure. Said cavity 1216 accommodates a seat generally indicated by reference numeral 1220, which seat comprises a back-rest element 1222 and a seat-pan element 1224. Said seat-pan element 1224 has a forward end 1225 and a rear end 1223 and is pivoted at its rear end 1223 to a lower end 1226 of the back-rest element 1222. Said seat-pan element 1224 is movably connected to the supporting structure 1210 by a seat movement mechanism (not shown) which allows the seat-pan element 1224 to move substantially vertically within the cavity 1216 between an upper position as shown in FIG. 33A and a lower position as shown in FIG. 33C. Suitable biasing means are provided (not shown) for biasing the seat-pan element 1224 into the upper position and selectively operable locking means are provided for locking the seat-pan 1224 in the upper position.

Said back-rest element 1222 is pivoted to said supporting structure 1210 at a fixed pivot point 1230. Said back-rest element 1222 has a rear surface 1221 which comprises an extension portion 1231 at the lower end 1226 of the back-rest element 1222, which extension portion 1231 extends downwardly beyond the fixed pivot point 1230 when the back-rest element 1222 is in an upright position.

The upper surface of the seat-pan element 1224 and front surface of the back-rest element 1222 are upholstered and covered with materials that are specifically designed for use as seating materials. The passenger-supporting element 1214 is spaced forwardly of the seat 1220 and can be used as a foot-rest element 1228 when the seat 1220 is in an upright position as shown in FIG. 33A. The passenger-supporting element 1212 is disposed behind the back-rest element 1222 and separated therefrom by a small gap 1213.

Said rear surface 1221 of the back-rest element 1222 is generally flat and carries a first mattress portion (not shown) which is designed and dressed specifically for use as a bedding component. Said passenger-supporting element 1212 has an upper surface 1211 which also carries a mattress portion. The back-rest 1222 and passenger-supporting element 1212 define a recess 1280 behind the back-rest 1222 which can be used for storage of bedding materials such as pillows, duvets, rugs, blankets and the like. An advantage of the third passenger seat assembly according to the present invention is that when the back-rest is in the upright position as shown in FIG. 33A, the recess 1280 is concealed from view, thus tidily hiding any bedding materials stored in the recess.

Said back-rest element 1222 is pivotable from an upright position in FIG. 33A about said fixed pivot point 1230 to a bed position as shown in FIG. 33C. Said back-rest element 1222 and said pivot point 1230 are designed, with the passenger-supporting elements 1212, 1214, such that, in the bed position, the rear surface 1221 of the back-rest element 1222 is disposed contiguously to both of said passenger-supporting elements 1212, 1214 to form a generally flat, substantially continuous surface therewith. In the bed configuration of FIG. 33C, the second mattress portion carried by the upper surface 1211 of the passenger-supporting element 1212 and the first mattress portion carried by the rear surface 1221 of the back-rest element 1222 abut or nearly abut one another to form an elongated bed on which a passenger using the seat may sleep. The upper surface 1229 of the passenger-supporting element 1214 also forms an extension surface to be bed. As with the first and second seat assemblies described above, in accordance with the third seating assembly, it is possible to form a bed having a total "point-to-point" length of at least 78-80" (1.98-2.032 cm) and, in some cases, at least 85" (2.16 cm).

Movement of the back-rest element 1222 between the upright and bed positions of FIGS. 33A and 33C may be motorised (not shown) and suitable user-operable controls (also not shown) may be provided adjacent the seat 1220 to enable a passenger to control operation of the seat. When the seat is in the upright position as shown in FIG. 33A, the locking mechanism may be removed thereby releasing the seat-pan from its upper position, and operation of the motor drive causes the back-rest element 1222 to rock forwardly about said fixed pivot point 1230. As the back-rest element 1222 rocks forwardly, it abuts on the seat-pan element 1224, pushing the seat-pan element 1224 downwardly in the cavity 1216, against the action of the aforementioned biasing means.

In the bed position as shown in FIG. 33C, the seat-pan element 1224 is completely concealed by back-rest element 1222. Thus, as with the first and second seat assemblies described above, the front surface of the back-rest element 1222 and upper surface of the seat-pan element 1224 may be covered with materials to give a completely different visual appearance and cabin ambience from those materials used to dress the bedding parts carried by the rear surface 1221 of the back-rest element 1222 and upper surface 1211 of the passenger-supporting element 1212. When the back-rest element 1222 is upright, the seating surfaces of the back-rest element 1222 and seat-pan element 1224 are visible, whilst the bedding surfaces of the rear surface 1221 of the back-rest element 1222 and upper surface 1211 of the passenger-supporting element 1212 are concealed. On the other hand, when the seat is in the bed configuration of FIG. 33C, the seat surfaces of the back-rest element 1222 and seat-pan element 1224 are concealed, whilst the bedding surfaces 1221 and 1211 are visible.

In accordance with a particular aspect of the second and third seat assemblies of the first described above, therefore, the back-rest element 922; 1222 has a first seating surface 923; which forms part of a seat with the upper surface 926; of the seat-pan 924; 1224 and an opposite bed surface 921; 1221 which is adapted to form part of the bed with one or more other auxiliary passenger-supporting elements 912, 914; 1212, 1214.

The passenger seat assembly in accordance with the present invention is thus particularly advantageous because it allows a long bed to be provided for a passenger in an aircraft cabin or other vehicle which capable of accommodating comfortably even very tall passengers having a height greater than 78-80" (1.98-2.032 cm) at a minimal seat pitch. By positioning a seat assembly, in accordance with the present invention, juxtaposed a concave cabin wall, with the rear passenger supporting element 912; 1212 disposed adjacent said cabin wall, it is possible to use efficiently the available space within the cabin. In a seat configuration, the back-rest element 922; 1222 forms a recess 980; 1280 with the rear passenger-supporting element 912; 1212 which can used to conceal tidily bedding materials such as rugs, blankets, pillows, etc. The seat and bedding surfaces of the back-rest element 922; 1222 can be given respectively different visual appearances such that in a cabin installation comprising a plurality of seat assemblies according to the present invention, a first cabin ambience can be obtained when all or a majority of the seat assemblies are disposed in the seat configuration, and a second, different, ambience can be obtained when all or a majority of the seats are disposed in the bed configuration. Furthermore, the seat and bedding surfaces can be respectively adapted specifically for use for their given purposes. Thus, for example, the seating surface of the back-rest element 922; 1222 may be provided with foam padding or the like which is sculpted particularly for use as a seating component, whilst the bedding surface of the back-rest portion can be equipped with a mattress portion or other comfortable, resilient layer that is shaped specifically for use as a bed component. Another advantage of the seat assembly in accordance with the present invention is that, in the bed configuration, the seat-pan element 924; 1224 is completely or substantially concealed by the back-rest element 922; 1222, such that the appearance of the materials used to cover the seat-pan element does not spoil the appearance and ambience afforded by the bedding materials. Preferably, the seat assembly in accordance with the present invention comprises a leg-rest portion 928; 1228 spaced forwardly of the seat 920; 1220 and, in the bed configuration, the leg-rest element forms part of an extended bed surface.

What is claimed:

1. A seating system for use in an airplane having a longitudinal airplane axis with at least one aisle extending in a same general direction as the longitudinal airplane axis, comprising:

a plurality of seats arranged in a column adjacent to the aisle to define a longitudinal column axis, each seat having a front end and a back end and further including a foot-rest at the front end of the seat, a reclinable back rest at the back end of the seat and a seat pan positioned between the foot-rest and the back rest, each seat having a seat axis extending from the front end to the back end and having a first sitting position and a second sleeping position wherein a substantially flat bed is formed;

each of the plurality of seats being positioned with the seat axis at a fixed angle of between 30 and 60 degrees with respect to the longitudinal column axis for accommodating a passenger with the passenger's feet directed towards the aisle;

each of the plurality of seats having an associated rear wall substantially parallel to the aisle and being positioned behind its associated seat;

a plurality of screens, wherein each of the plurality of seats is associated with at least one screen, the at least one screen having a first end positioned adjacent to the rear wall of the associated seat to form a wall-screen corner and a second end positioned adjacent to the aisle to separate the associated seat from an adjacent seat;

each of the plurality of seats having a substantially horizontal surface positioned behind the back end of the seat, the substantially horizontal surface being at a fixed height above a floor and extending from the wall-screen corner towards the back end of the seat;

each seat having a space that is defined by a portion of its associated rear wall, a portion of its associated screen and the back end of the seat when in the sitting position; and wherein, in the second sleeping position, the substantially flat bed is formed with the foot-rest defining a first bed end and having an opposite second bed end that extends into the space, the substantially horizontal surface being about the same height as an upper sleeping surface of the substantially flat bed to provide usable space to a passenger when in the sleeping position.

2. The seating system of claim 1, wherein for each seat, its associated screen extends continuously from the rear wall to the aisle and adjacent the seat pan.

3. The seating system of claim 1, wherein each foot-rest is spaced apart from its associated seat pan.

4. The seating system of claim 1, wherein for each seat, its associated foot-rest is formed in the screen associated with the seat or the screen associated with the adjacent seat.

5. The seating system of claim 1, wherein the airplane includes a cabin formed by two opposing side walls and wherein the rear wall associated with a seat is a portion of one of the side walls of the airplane.

6. The seating system of claim 1, wherein each of the plurality of seats is positioned with the seat axis at an angle of about 45 degrees with respect to the longitudinal column axis.

7. The seating system of claim 1, wherein each screen extends substantially parallel to the seat axis along a majority of a length of the screen.

8. The seating system of claim 1, wherein each of the plurality of seats is at the same fixed angle.

9. The seating system of claim 1, wherein the substantially horizontal surface behind the back end of each seat is generally triangular or trapezoidal shaped.

10. The seating system of claim 1, wherein the plurality of seats is a subset of all seats on the airplane.

11. The seating system of claim 1, wherein the airplane includes a plurality of cabins separated by dividing walls that extend a majority of a width of the airplane, and wherein the plurality of seats includes a majority of seats in a cabin.

12. The seating system of claim 1, wherein each of the plurality of seats is positioned with the seat axis at an angle of between 40 and 50 degrees with respect to the longitudinal column axis.

13. A seating system for use in an airplane having a longitudinal airplane axis with at least one aisle extending in a same general direction as the longitudinal airplane axis, comprising:

a plurality of seats arranged in a column adjacent to the aisle to define a longitudinal column axis, each seat having a forward end and a rearward end, a back rest at the rearward end of the seat and a seat pan positioned between the forward end and the rearward end, each seat having a seat axis extending from the forward end to the rearward end and having a first sitting position and a second sleeping position wherein a substantially flat bed is formed;

each of the plurality of seats being positioned with the seat axis at a fixed angle of between 30 and 60 degrees with respect to the longitudinal column axis;

each of the plurality of seats having an associated rear wall substantially parallel to the aisle and being positioned behind its associated seat;

a plurality of screens, wherein each of the plurality of seats is associated with at least one screen, the at least one screen having a first end positioned adjacent to the rear wall of the associated seat to form a wall-screen corner and a second end positioned adjacent to the aisle to separate the associated seat from an adjacent seat;

each of the plurality of seats having a substantially horizontal surface positioned behind the rearward end of the seat, the substantially horizontal surface being at a fixed height above a floor and extending from the wall-screen corner towards the rearward end of the seat;

each seat having a space that is defined by a portion of its associated rear wall, a portion of its associated screen and the rearward end of the seat when in the sitting position; and wherein, in the second sleeping position, the substantially flat bed is formed having a first bed end and having an opposite second bed end that extends into the space, the substantially horizontal surface being about the same height as an upper sleeping surface of the substantially flat bed to provide usable space to a passenger when in the sleeping position.

14. The seating system of claim 13, wherein for each seat, its associated screen extends continuously from the rear wall to the aisle and adjacent the seat pan.

15. The seating system of claim 13, further including a foot-rest at the forward end of the seat.

16. The seating system of claim 13, wherein for each seat, its associated foot-rest is formed in the screen associated with the seat or the screen associated with the adjacent seat.

17. The seating system of claim 13, wherein the airplane includes a cabin formed by two opposing side walls and wherein the rear wall associated with a seat is a portion of one of the side walls of the airplane.

18. The seating system of claim 13, wherein each of the plurality of seats is positioned with the seat axis at an angle of about 45 degrees with respect to the longitudinal column axis.

19. The seating system of claim 13, wherein each screen extends substantially parallel to the seat axis along a majority of a length of the screen.

20. The seating system of claim 13, wherein each of the plurality of seats is at the same fixed angle.

21. The seating system of claim 13, wherein the space behind the rearward end of each seat is generally triangular shaped.

22. The seating system of claim 13, wherein the plurality of seats is a subset of all seats on the airplane.

23. The seating system of claim 13, wherein the airplane includes a plurality of cabins separated by dividing walls that extend a majority of a width of the airplane, and wherein the plurality of seats includes a majority of seats in a cabin.

24. The seating system of claim 13, wherein each of the plurality of seats is positioned with the seat axis at an angle of between 40 and 50 degrees with respect to the longitudinal column axis.

* * * * *